(12) United States Patent
Miloushev et al.

(10) Patent No.: US 7,788,335 B2
(45) Date of Patent: Aug. 31, 2010

(54) AGGREGATED OPPORTUNISTIC LOCK AND AGGREGATED IMPLICIT LOCK MANAGEMENT FOR LOCKING AGGREGATED FILES IN A SWITCHED FILE SYSTEM

(75) Inventors: Vladimir Miloushev, Dana Point, CA (US); Peter Nickolov, Laguna Niguel, CA (US)

(73) Assignee: F5 Networks, Inc., Seattle, WA (US)

( * ) Notice: Subject to any disclaimer, the term of this patent is extended or adjusted under 35 U.S.C. 154(b) by 1370 days.

(21) Appl. No.: 10/336,784

(22) Filed: Jan. 2, 2003

(65) Prior Publication Data

US 2004/0133652 A1 Jul. 8, 2004

Related U.S. Application Data

(63) Continuation-in-part of application No. 10/043,413, filed on Jan. 10, 2002, now abandoned.

(60) Provisional application No. 60/261,153, filed on Jan. 11, 2001.

(51) Int. Cl.
*G06F 15/16* (2006.01)

(52) U.S. Cl. .................. 709/213; 709/214; 709/226; 709/229; 709/231; 707/8; 707/9; 707/10

(58) Field of Classification Search ................ 709/213, 709/214, 226, 229, 231; 707/8, 9, 10
See application file for complete search history.

(56) References Cited

U.S. PATENT DOCUMENTS 4,993,030 A 2/1991 Krakauer .................... 371/401

5,218,695 A 6/1993 Noveck ...................... 395/600

(Continued)

FOREIGN PATENT DOCUMENTS

AU 2003300350 A1 7/2004

(Continued)

OTHER PUBLICATIONS

International Search Report from International Application No. PCT/US03/41202, mailed Sep. 15, 2005.

(Continued)

*Primary Examiner*—Jinsong Hu
(74) *Attorney, Agent, or Firm*—Nixon Peabody LLP

(57) ABSTRACT

A switched file system, also termed a file switch, is logically positioned between client computers and file servers in a computer network. The file switch distributes user files among multiple file servers using aggregated file, transaction and directory mechanisms. The file switch supports caching of a particular aggregated data file either locally in a client computer or in the file switch in accordance with the exclusivity level of an opportunistic lock granted to the entity that requested caching. The opportunistic lock can be obtained either on the individual data files stored in the file servers or on the metadata files that contain the location of each individual data files in the file servers. The opportunistic lock can be broken if another client tries to access the aggregated data file. Opportunistic locks allows client-side caching while preserving data integrity and consistency, hence the performance of the switched file system is increased.

26 Claims, 25 Drawing Sheets

U.S. PATENT DOCUMENTS

| | | | | |
|---|---|---|---|---|
| 5,473,362 | A | 12/1995 | Fitzgerald | 348/7 |
| 5,537,585 | A | 7/1996 | Blickenstaff et al. | 707/205 |
| 5,548,724 | A | 8/1996 | Akizawa et al. | 395/200.03 |
| 5,550,965 | A | 8/1996 | Gabbe et al. | 715/209 |
| 5,583,995 | A | 12/1996 | Gardner | 348/7 |
| 5,586,260 | A | 12/1996 | Hu | |
| 5,590,320 | A | 12/1996 | Maxey | 395/619 |
| 5,649,194 | A | 7/1997 | Miller | 395/616 |
| 5,649,200 | A | 7/1997 | Leblang et al. | 395/703 |
| 5,692,180 | A | 11/1997 | Lee | 395/610 |
| 5,721,779 | A | 2/1998 | Funk | |
| 5,724,512 | A | 3/1998 | Winterbottom | |
| 5,806,061 | A | 9/1998 | Chaudhuri et al. | 707/3 |
| 5,832,496 | A | 11/1998 | Anand et al. | 707/102 |
| 5,832,522 | A | 11/1998 | Blickenstaff et al. | 707/204 |
| 5,838,970 | A | 11/1998 | Thomas | 395/683 |
| 5,862,325 | A | 1/1999 | Reed et al. | 709/201 |
| 5,893,086 | A | 4/1999 | Schmuck et al. | 707/1 |
| 5,897,638 | A | 4/1999 | Lasser et al. | |
| 5,905,990 | A | 5/1999 | Inglett | 707/200 |
| 5,917,998 | A | 6/1999 | Cabrera et al. | |
| 5,920,873 | A | 7/1999 | Van Huben et al. | 707/202 |
| 5,999,664 | A | 12/1999 | Mahoney et al. | 382/305 |
| 6,012,083 | A | 1/2000 | Savitsky et al. | |
| 6,029,168 | A | 2/2000 | Frey | |
| 6,044,367 | A | 3/2000 | Wolff | 707/2 |
| 6,047,129 | A | 4/2000 | Frye | 395/712 |
| 6,078,929 | A | 6/2000 | Rao | 707/200 |
| 6,085,234 | A | 7/2000 | Pitts et al. | |
| 6,128,627 | A | 10/2000 | Mattis | 707/202 |
| 6,128,717 | A | 10/2000 | Harrison | 711/202 |
| 6,161,145 | A | 12/2000 | Bainbridge et al. | 709/246 |
| 6,161,185 | A | 12/2000 | Guthrie et al. | |
| 6,181,336 | B1 | 1/2001 | Chiu et al. | |
| 6,223,206 | B1 | 4/2001 | Dan et al. | 709/105 |
| 6,233,648 | B1 | 5/2001 | Tomita | 711/4 |
| 6,256,031 | B1 | 7/2001 | Meijer | 345/357 |
| 6,289,345 | B1 | 9/2001 | Yasue | |
| 6,308,162 | B1 | 10/2001 | Ouimet et al. | |
| 6,324,581 | B1 * | 11/2001 | Xu et al. | 709/229 |
| 6,339,785 | B1 * | 1/2002 | Feigenbaum | 709/213 |
| 6,349,343 | B1 | 2/2002 | Foody | 709/316 |
| 6,389,433 | B1 | 5/2002 | Bolosky et al. | 707/205 |
| 6,393,581 | B1 | 5/2002 | Friedman et al. | 714/4 |
| 6,397,246 | B1 | 5/2002 | Wolfe | 709/217 |
| 6,438,595 | B1 * | 8/2002 | Blumenau et al. | 709/226 |
| 6,477,544 | B1 | 11/2002 | Bolosky et al. | 707/200 |
| 6,493,804 | B1 | 12/2002 | Soltis | 711/152 |
| 6,516,350 | B1 * | 2/2003 | Lumelsky et al. | 709/226 |
| 6,516,351 | B2 * | 2/2003 | Borr | 709/229 |
| 6,553,352 | B2 | 4/2003 | Delurgio et al. | |
| 6,556,997 | B1 | 4/2003 | Levy | |
| 6,556,998 | B1 | 4/2003 | Mukherjee et al. | 707/10 |
| 6,601,101 | B1 | 7/2003 | Lee | 709/227 |
| 6,612,490 | B1 | 9/2003 | Herrendoerfer | 235/407 |
| 6,721,794 | B2 * | 4/2004 | Taylor et al. | 709/231 |
| 6,757,706 | B1 | 6/2004 | Dong | 709/203 |
| 6,775,679 | B2 | 8/2004 | Gupta | 707/102 |
| 6,782,450 | B2 | 8/2004 | Arnott et al. | 711/114 |
| 6,801,960 | B1 | 10/2004 | Ericson | 710/33 |
| 6,826,613 | B1 | 11/2004 | Wang | 709/227 |
| 6,839,761 | B2 | 1/2005 | Kadyk et al. | |
| 6,847,959 | B1 | 1/2005 | Arrouye et al. | |
| 6,847,970 | B2 | 1/2005 | Keller et al. | 707/100 |
| 6,889,249 | B2 | 5/2005 | Miloushev | 709/213 |
| 6,922,688 | B1 | 7/2005 | Frey | 707/2 |
| 6,938,059 | B2 | 8/2005 | Tamer et al. | |
| 6,959,373 | B2 | 10/2005 | Testardi | |
| 6,973,549 | B1 | 12/2005 | Testardi | |
| 6,985,936 | B2 | 1/2006 | Agarwalla | 709/221 |
| 6,985,956 | B2 | 1/2006 | Luke et al. | 709/229 |
| 6,986,015 | B2 | 1/2006 | Testardi | |
| 6,990,547 | B2 | 1/2006 | Ulrich et al. | 710/304 |
| 6,990,667 | B2 | 1/2006 | Ulrich et al. | 718/105 |
| 6,996,841 | B2 | 2/2006 | Kadyk et al. | |
| 7,013,379 | B1 | 3/2006 | Testardi | |
| 7,051,112 | B2 | 5/2006 | Dawson | 709/232 |
| 7,072,917 | B2 | 7/2006 | Wong et al. | 707/205 |
| 7,127,556 | B2 | 10/2006 | Blumenau et al. | |
| 7,146,524 | B2 | 12/2006 | Patel et al. | 714/6 |
| 7,155,466 | B2 | 12/2006 | Rodriguez et al. | |
| 7,173,929 | B1 | 2/2007 | Testardi | |
| 7,194,579 | B2 | 3/2007 | Robinson | 711/114 |
| 7,280,536 | B2 | 10/2007 | Testardi | |
| 7,284,150 | B2 | 10/2007 | Ma et al. | 714/6 |
| 7,293,099 | B1 | 11/2007 | Kalajan | |
| 7,293,133 | B1 | 11/2007 | Colgrove et al. | |
| 7,406,484 | B1 | 7/2008 | Srinivasan et al. | |
| 7,624,109 | B2 | 11/2009 | Testardi | |
| 2001/0047293 | A1 | 11/2001 | Waller et al. | |
| 2001/0051955 | A1 | 12/2001 | Wong | |
| 2002/0035537 | A1 | 3/2002 | Waller et al. | |
| 2002/0120763 | A1 | 8/2002 | Miloushev et al. | 709/230 |
| 2002/0133491 | A1 | 9/2002 | Sim et al. | |
| 2002/0138502 | A1 | 9/2002 | Gupta | |
| 2002/0147630 | A1 | 10/2002 | Rose et al. | |
| 2002/0161911 | A1 | 10/2002 | Pinckney et al. | 709/231 |
| 2003/0009429 | A1 | 1/2003 | Jameson | 706/45 |
| 2003/0028514 | A1 | 2/2003 | Lord et al. | 707/1 |
| 2003/0033308 | A1 | 2/2003 | Patel et al. | 707/10 |
| 2003/0135514 | A1 | 7/2003 | Patel et al. | 707/102 |
| 2003/0171978 | A1 | 9/2003 | Jenkins et al. | |
| 2004/0006575 | A1 | 1/2004 | Visharam et al. | 707/104.1 |
| 2004/0025013 | A1 | 2/2004 | Parker et al. | 713/163 |
| 2004/0028043 | A1 | 2/2004 | Maveli et al. | 370/392 |
| 2004/0028063 | A1 | 2/2004 | Roy et al. | 370/402 |
| 2004/0030857 | A1 | 2/2004 | Krakirian et al. | 711/206 |
| 2004/0051777 | A1 | 3/2004 | Ackaouy et al. | |
| 2004/0098383 | A1 | 5/2004 | Tabellion et al. | 707/3 |
| 2004/0133573 | A1 | 7/2004 | Miloushev et al. | |
| 2004/0133577 | A1 | 7/2004 | Miloushev et al. | 707/10 |
| 2004/0133606 | A1 | 7/2004 | Miloushev et al. | |
| 2004/0133607 | A1 | 7/2004 | Miloushev et al. | 707/200 |
| 2004/0133650 | A1 | 7/2004 | Miloushev et al. | |
| 2004/0133652 | A1 | 7/2004 | Miloushev et al. | |
| 2004/0236798 | A1 | 11/2004 | Srinivasan et al. | 707/200 |
| 2005/0021615 | A1 | 1/2005 | Arnott et al. | 709/203 |
| 2005/0050107 | A1 | 3/2005 | Mane et al. | 707/200 |
| 2005/0289109 | A1 | 12/2005 | Arrouye et al. | |
| 2006/0080353 | A1 | 4/2006 | Miloushev et al. | |
| 2006/0161518 | A1 | 7/2006 | Lacapra | |
| 2006/0167838 | A1 | 7/2006 | Lacapra | |
| 2006/0200470 | A1 | 9/2006 | Lacapra et al. | |
| 2006/0230265 | A1 | 10/2006 | Krishna | |
| 2007/0024919 | A1 | 2/2007 | Wong et al. | |

FOREIGN PATENT DOCUMENTS

| | | |
|---|---|---|
| CA | 2512312 A1 | 7/2004 |
| EP | 0738970 | 10/1996 |
| EP | 0738970 A1 | 10/1996 |
| JP | 63010250 A | 1/1988 |
| JP | 08-328760 | 12/1996 |
| JP | 08-339355 | 12/1996 |
| JP | 9016510 A | 1/1997 |
| JP | 11282741 A | 10/1999 |
| JP | 11282741 A1 | 10/1999 |
| JP | 2009016510 A | 1/2009 |
| WO | WO 02/56181 | 7/2002 |
| WO | WO 02/056181 | 7/2002 |
| WO | WO 2004/061605 | 7/2004 |
| WO | WO 2008/130983 A1 | 10/2008 |

WO WO 2008/147973 A2 12/2008

OTHER PUBLICATIONS

Noghani et al., "A Novel Approach to reduce Latency on the Internet: 'Component-Based Download'," Proceedings of the Int'l Conf. on Internet Computing, Las Vegas, NV, Jun. 2000, pp. 1-6.

Fan, et al., "Summary Cache: A Scalable Wide -Area Web Cache Sharing Protocol," Computer Communications Review, Association for Computing Machinery, New York, USA, Oct. 1998, vol. 28, No. 4, pp. 254-265.

CSA Persistent File System Technology, Colorado Software Architecture, Inc. White Paper, Jan. 1999, p. 1-3.

Karamanolis, C., An Architecture for Scalable and Manageable File Services, A1., HPL-2001-173, Jul. 26, 2001. p. 1-114.

Kimball, C.E. et al., Automated Client-Side Integration of Distributed Application Servers, $13^{TH}$ LISA Conf., 1999.

English Translation of Notification of Reason(s) for Refusal for JP 2002-556371.

English Translation of paragraph 17, 32, and 40-52 of JP 08-328760.

English Translation of Abstract of JP 08-328760 from Patent Abstracts of Japan.

English language Abstracts of JP 08-339355 from Patent Abstracts of Japan.

Cavale, M. R., "Introducing Microsoft Cluster Service (MSCS) in the Windows Server 2003," Microsoft Corporation, Nov. 2002.

Pearson, P.K., "Fast Hashing of Variable-Length Text Strings", Comm. Of the ACM, vol. 33, No. 6, Jun. 1990.

Sorenson, K.M., "Installation and Administration: Kimberlite Cluster Version 1.1.0, Rev. D." Mission Critical Linux, http://oss.missioncriticallinux.com/kimberlite/kimberlite.pdf.

Wilkes, J., et al., "The HP AutoRAID Hierarchical Storage System," ACM Transactions on Computer Systems, vol. 14, No. 1, Feb. 1996.

Savage, et al., "AFRAID—A Frequently Redundant Array of Inexpensive Disks," 1996 USENIX Technical Conf., San Diego, California, Jan. 22-26, 1996.

Rodriguez et al., "Parallel-access for mirror sites in the Internet", InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph—p. 868, col. 1, paragraph 1.

Callaghan et. al., "NFS Version 3 Protocol Specification" (RFC 1813), 1995, The Internet Engineering Task Force (IETF), www.ietf.org, last accessed on Dec. 30, 2002.

Norton et. al., "CIFS Protocol Version CIFS-Spec 0.9", 2001, Storage Networking Industry Association (SNIA), www.snia.org, last accessed on Mar. 26, 2001.

Stakutis, C., "Benefits of SAN-based file system sharing", Jul. 2000, *InfoStor*, www.infostor.com, last accessed on Dec. 30, 2002.

Haskin et. al., "The Tiger Shark File System", 1996, in proceedings of IEEE, Spring COMPCON, Santa Clara, CA, www.research.ibm.com, last accessed on Dec. 30, 2002.

Peterson, M., "Introducing Storage Area Networks", Feb. 1998, *InfoStor*, www.infostor.com, last accessed on Dec. 20, 2002.

Patterson et. al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Farley, M., "Building Storage Networks", Jan. 2000, McGraw-Hill, ISBN 0072120509.

"Auspex Storage Architecture Guide", Second Edition, 2001, Auspex Systems, Inc., www.auspex.com, last accessed on Dec. 30, 2002.

"Windows Clustering Technologies—An Overview", Nov. 2000, Microsoft Corp., www.microsoft.com, last accessed on Dec. 30, 2002.

"The Global File System", Steven Soltis, et. al., in Proceedings of the Fifth NASA Goddard Space Flight Center Conference on Mass Storage Systems and Technologies, Sep. 17-19, 1996, College Park, Maryland.

Preslan et. al., "Scalability and Failure Recovery in a Linux Cluster File System", in Proceedings of the 4th Annual Linux Showcase & Conference, Atlanta, Georgia, Oct. 10-14, 2000, www.usenix.org, last accessed on Dec. 20, 2002.

Zayas, E., "AFS-3 Programmer's Reference: Architectural Overview", Transarc Corp., version 1.0 of Sep. 2, 1991, doc. No. FS-00-D160.

"The AFS File System in Distributed Computing Environment", May 1996, Transarc Corp., www.transarc.ibm.com, last accessed on Dec. 20, 2002.

"VERITAS SANPoint Foundation Suite(tm) and SANPoint Foundation(tm) Suite HA : New VERITAS Volume Management and File System Technology for Cluster Environments", Sep. 2001, VERITAS Software Corp.

"Distributed File System: A Logical View of Physical Storage : White Paper", 1999, Microsoft Corp., www.microsoft.com, last accessed on Dec. 20, 2002.

Anderson et. al., "Serverless Network File System", in the 15th Symposium on Operating Systems Principles, Dec. 1995, Association for Computing Machinery, Inc.

Gibson et. al., "NASD Scalable Storage Systems", Jun. 1999, USENIX99, Extreme Linux Workshop, Monterey, California.

Gibson et. al., "File Server Scaling with Network-Attached Secure Disks", in Proceedings of the ACM International Conference on Measurement and Modeling of Computer Systems (Sigmetrics '97), 1997, Association for Computing Machinery, Inc.

Cabrera et al., "Swift: A Storage Architecture for Large Objects", In Proceedings of the Eleventh IEEE Symposium on Mass Storage Systems, pp. 123-128, Oct. 1991.

Cabrera et al., "Swift: Using Distributed Disk Striping to Provide High I/O Data Rates", Computing Systems 4, 4 (Fall 1991), pp. 405-436.

Cabrera et al., "Using Data Striping in a Local Area Network", 1992, technical report No. UCSC-CRL-92-09 of the Computer & Information Sciences Department of University of California at Santa Cruz.

Long et. al., "Swift/RAID: A distributed RAID system", Computing Systems, vol. 7, pp. 333-359, Summer 1994.

Hartman, J., "The Zebra Striped Network File System", 1994, Ph.D. dissertation submitted in the Graduate Division of the University of California at Berkeley.

Carns et. al., "PVFS: A Parallel File System for Linux Clusters", in Proceedings of the 4th Annual Linux Showcase and Conference, pp. 317-327, Atlanta, Georgia, Oct. 2000, USENIX Association.

"Scaling Next Generation Web Infrastructure with Content-Intelligent Switching : White Paper", Apr. 2000, Alteon WebSystems, Inc., (now Nortel Networks).

"NERSC Tutorials: I/O on the Cray T3E", chapter 8, "Disk Striping", National Energy Research Scientific Computing Center (NERSC), http://hpcf.nersc.gov, last accessed on Dec. 27, 2002.

Soltis et. al., "The Design and Performance of a Shared Disk File System for IRIX", in Sixth NASA Goddard Space Flight Center Conference on Mass Storage and Technologies in cooperation with the Fifteenth IEEE Symposium on Mass Storage Systems, Mar. 23-26, 1998.

Thekkath et. al., "Frangipani: A Scalable Distributed File System", in Proceedings of the 16th ACM Symposium on Operating Systems Principles, Oct. 1997, Association for Computing Machinery, Inc.

Hwang et. al., Designing SSI Clusters with Hierarchical Checkpointing and Single I/O Space, IEEE Concurrency, pp. 60-69, Jan.-Mar. 1999.

Aguilera, Marcos K. et al., Improving recoverability in multi-tier storage systems, International Conference on Dependable Systems and Networks (DSN-2007), Edinburgh, Scotland, Jun. 2007, 10 pages.

Anderson, Darrell C. et al., Interposed Request Routing for Scalable Network Storage, ACM Transactions on Computer Systems, vol. 20, No. 1, Feb. 2002, pp. 1-24.

Katsurashima, W. et al., NAS Switch: A Novel CIFS Server Virtualization, Proceedings. 20th IEEE/11th NASA Goddard Conference on Mass Storage Systems and Technologies, 2003 (MSST 2003), Apr. 2003.

U.S. Appl. No. 10/043,413, filed Jan. 10, 2002, File Switch and Switched File System, Miloushev, Nickolov.

U.S. Appl. No. 10/336,704, filed Jan. 2, 2003, Transaction Aggregation in a Switched File System, Miloushev, Nickolov.
U.S. Appl. No. 10/336,833, filed Jan. 2, 2003, Directory Aggregation for Files Distributed Over a Plurality of Servers in a Switched File System, Miloushev, Nickolov.
U.S. Appl. No. 10/336,835, filed Jan. 2, 2003, Metadata Based File Switch and Switched File System, Miloushev, Nickolov.
U.S. Appl. No. 10/336,832, filed Jan. 2, 2003, Rule Based Aggregation of Files and Transactions in a Switched File System, Miloushev, Nickolov.
U.S. Appl. No. 10/336,834, filed Jan. 2, 2003, Aggregated Lock Management for Locking Aggregate Files in a Switched File System, Miloushev, Nickolov.
U.S. Appl. No. 10/336,784, filed Jan. 2, 2003, Aggregated Opportunistic Lock and Aggregated Implicit Lock Management for Locking Aggregated Files in a Switched File System, Miloushev, Nickolov.
U.S. Appl. No. 11/337,190, filed Jan. 20, 2006, Scalable System for Partitioning and Accessing Metadata Over Multiple Servers, Lacapra.
U.S. Appl. No. 11/041,147, filed Jan. 21, 2005, File-based Hybrid File Storage Scheme Supporting Multiple File Switches, Lacapra.
U.S. Appl. No. 11/072,892, filed Mar. 3, 2005, System and Method for Managing Small-Size Files in an Aggregated File System, Lacapra, Duvvuri.
U.S. Appl. No. 11/285,677, filed Nov. 21, 2005, Directory Aggregation for Files Distributed Over a Plurality of Servers in a Switched File System, Miloushev, Nickolov.
U.S. Appl. No. 11/724,107, Mar. 14, 2007, Transaction aggregation in a switched file system, Miloushev, Nickolov.
Noghani et al., "A Novel Approach to Reduce Latency on the Internet: 'Component-Based Download'," Proceedings of the Int'l Conf on Internet Computing, Las Vegas, NV, Jun. 2000, pp. 1-6.
Fan ct al., "Summary Cache: A Scalable Wide —Area Web Cache Sharing Protocol," Computer Communications Review, Association for Computing Machinery, New York, USA, 28(4):254-65 (1998).
Karamanolis, "An Architecture for Scalable and Manageable File Services," AI., HPL-2001-173, Jul. 26, 2001 . p. 1-114.
Kimball et al., "Automated Client-Side Integration of Distributed Application Servers," 13th LISA Conf, 1999.
Cavale, "Introducing Microsoft Cluster Service (MSCS) in the Windows Server 2003," Microsoft Corporation, Nov. 2002.
Pearson, "Fast Hashing of Variable-Length Text Strings", Comm. Of the ACM, vol. 33, No. 6, Jun. 1990.
Sorenson, "Installation and Administration: Kimberlite Cluster Version 1.1.0, Rev. D.," Mission Critical Linux, http://oss.missioncriticallinux.com/kimberlite/kimberlite.pdf (Dec. 2000).
Wilkes et al., "The HP AutoRAID Hierarchical Storage System," ACM Transactions on Computer Systems, vol. 14, No. 1, Feb. 1996.
Savage et al., "AFRAID—A Frequently Redundant Array of Inexpensive Disks," 1996 USENIX Technical Conf., San Diego, California, Jan. 22-26, 1996.
Aguilera et al., "Improving Recoverability in Multi-tier Storage Systems," International Conference on Dependable Systems and Networks (DSN-2007), Edinburgh, Scotland, Jun. 2007, 10 pages.
Anderson et al., Interposed Request Routing for Scalable Network Storage, ACM Transactions on Computer Systems, 20(1):1-24 (2002).
Katsurashima et al., "NAS Switch: A Novel CJFS Server Virtualization," Proceedings. 20th IEEE/i Ith NASA Goddard Conference on Mass Storage Systems and Technologies, 2003 (MSST 2003), Apr. 2003.
Rodriguez ct al., "Parallel-access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.
Callaghan et al., "NFS Version 3 Protocol Specification," (RFC 1813), 1995, The Internet Engineering Task Force (IE'TF), wvvw.ietforg, last accessed on Dec. 30, 2002.
Norton et al., "CIFS Protocol Version CIFS-Spec 0.9," 2001, Storage Networking Industry Association (SNIA), www.snia.org, last accessed on Mar. 26, 2001.
Stakutis, "Benefits of SAN-based File System Sharing," Jul. 2000 *InfoStor*, www.infostor.com, last accessed on Dec. 30, 2002.
Haskin et al., "The Tiger Shark File System," 1996, in proceedings of IEEE, Spring COMPCON, Santa Clara, CA, www.rcscarch.ibm.com last accessed on Dec. 30, 2002.
Peterson, "Introducing Storage Area Networks," Feb. 1998, *InfoStor*, www.Infostor.com, last accessed on Dec. 20, 2002.
Patterson et al., "A Case for Redundant Arrays of Inexpensive Disks (RAID)," Chicago, Illinois, Jun. 1-3, 1998, in Proceedings of ACM SIGMOD conference on the Management of Data, pp. 109-116, Association for Computing Machinery, Inc., www.acmorg, last accessed on Dec. 20, 2002.
Farley, "Building Storage Networks," Jan. 2000, McGraw-Hill, ISBN 0072120509.
"Auspex Storage Architecture Guide," Second Edition, 2001, Auspex Systems, Inc., www.auspex.com, last accessed on Dec. 30, 2002.
"Windows Clustering Technologies - An Overview," Nov. 2000, Microsoft Corp., www.microsgft.com, last accessed on Dec. 30, 2002.
Soltis et al., "The Global File System," in Proceedings of the Fifth NASA Goddard Space Flight Center Conference on Mass Storage Systems and Technologies. Sep. 17-19, 1996, College Park, Maryland.
Preslan et al., "Scalability and Failure Recovery In a Linux Cluster File System," in Proceedings of the 4th Annual Linux Showcase & Conference, Atlanta, Georgia, Oct. 10-14, 2000, www usenix.org, last accessed on Dec. 20, 2002.
Zayas, "AFS-3 Programmer's Reference: Architectural Overview," 'Transarc Corp., version 1.0 of Sep. 2, 1991, doc. number FS-00-D160.
English Translation of Notification of Reason(s) for Refusal for JP 2002-556371 (Dispatch Date: Jan. 22, 2007).
International Search Report for International Patent Application No. PCT/US02/00720 (Jul. 8, 2004).
Anderson, Darrell C. et al., "Interposed Request Routing for Scalable Network Storage," ACM Transactions on Computer Systems 20(1):1-24 (Feb. 2002).
Apple, Inc. "Mac OS X Tiger Keynote Intro. Part 2" Jun. 2004, www.youtube.com <http://www.youtube.com/watch?v=zSBJwEmRJbY>, p. 1.
Apple, Inc. "Tiger Developer Overview Series: Working with Spotlight" Nov. 23, 2004, www.apple.com using www.archive.org <http://web.archive.org/web/20041123005335/developer.apple.com/macosx/tiger/spotlight.html>, pgs. 1-6.
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US 2008/083117 (Jun. 23, 2009).
Kohl et al., "The Kerberos Network Authentication Service (V5)," RFC 1510, Sep. 1993. (http://www.ietf.org/rfc/r1c1510.txt?number=1510.
"How DFS Works: Remote File Systems," Distributed File System (DFS) Technical Reference, retrieved from the Internet on Feb. 13, 2009: URL:http://technetmicrosoft.com/en-us/library/cc782417.aspx> (Mar. 2003).

* cited by examiner

SYNTAX

EXAMPLES

AGGREGATED OPPORTUNISTIC LOCK AND AGGREGATED IMPLICIT LOCK MANAGEMENT FOR LOCKING AGGREGATED FILES IN A SWITCHED FILE SYSTEM

CROSS-REFERENCE TO RELATED APPLICATIONS

This application is a continuation-in-part of U.S. patent application Ser. No. 10/043,413, entitled File Switch and Switched File System, filed Jan. 10, 2002 now abandoned, which claims the benefit of U.S. Provisional Patent Application No. 60/261,153, entitled File Switch and Switched File System and filed Jan. 11, 2001, both of which are incorporated herein by reference.

This application is furthermore related to the following applications, each of which is hereby incorporated by reference in its entirety: U.S. patent application Ser. No. 10/336,70, filed Jan. 2, 2003, now U.S. Pat. No. 6,889,249, issued May 3, 2005, entitled Transaction Aggregation in a Switched File System; U.S. patent application Ser. No. 10/336,833, filed Jan. 2, 2003, entitled Directory Aggregation for Files Distributed Over A Plurality of Servers in a Switched File System; U.S. patent application Ser. No. 10/336,035, filed Jan. 2, 2003, entitled Metadata Based File Switch And Switched File; U.S. patent application Ser. No. 10/336,832, filed Jan. 2, 2003, entitled Rule Based Aggregation of Files and Transactions in a Switched File System; and U.S. patent application Ser. No. 10/336,834, filed Jan. 2, 2003, entitled Aggregated Lock Management for Locking Aggregated Files in a Switched File System.

FIELD OF THE INVENTION

The present invention relates generally to the field of storage networks, and more specifically to file switching and switched file systems.

DESCRIPTION OF THE RELATED ART

Since the birth of computer networking, access to storage has remained among the most important network applications. The reason is simple: the purpose of networks was and is to share data and content, and most of the data worth sharing resides on some form of storage.

Despite the importance of storage applications in networks, their usefulness has, until recently, been greatly limited by the insufficient bandwidth provided by networks. Even at 100 Megabits/second (Mbps) (the most common maximum speed in existing local area networks, also known as Fast Ethernet), accessing data through a network is several times slower than reading it from a hard disk attached locally to a computer. For this reason, historically most of the data accessed by a networked computer (workstation or application server—often referred to as a "client") has resided on local storage and only data that has to be shared has resided on network servers.

The introduction of gigabit and multi-gigabit network technology, however, is changing the rules of the game. A single Gigabit Ethernet or FibreChannel connection is capable of transporting data at aggregate rates of up to 240 Megabytes/second (MB/s), which is much greater than the performance of most locally attached storage devices. This means that in new high speed networks, data can be accessed through the network faster than from local storage. As a result, we have now reached the beginning of a fundamental trend in which the majority of useful data is being moved to the network.

Storage Networks

The ability to store terabytes of data on the network and make that data accessible to tens and hundreds of thousands of users is extremely attractive. At the same time, creating storage and network systems capable of adequately handling such amounts of information and usage loads is not a simple task. As a result, storage networking—the discipline that deals with designing, building and managing such systems—is rapidly becoming recognized as a separate, specialized field of computer networking.

The key promise of storage networking is in delivering network systems that enable the sharing of huge amounts of information and content among geographically dispersed users. To deliver on this promise, the storage network systems have to be extremely scalable while providing a high degree of availability comparable to that of the public telephone system. In addition, any system of this scale has to be designed so that it can be managed effectively.

Available Approaches to Scaling File Systems

The primary function of every file system is to enable shared access to storage resources. In fact, file systems were originally created to facilitate sharing of then-expensive storage between multiple applications and multiple users. As a result, when exposed as a network service, file systems provide a complete and mature solution to the problem of sharing data.

The flip side is that file systems are complex and very processing-intensive, which increases substantially the performance requirements to any computer that provides file services over a fast network. To serve files to hundreds and thousands of users simultaneously requires tremendous amounts of processing power, memory and bus bandwidth.

FIG. 1 illustrates a typical application of presently available, commonly used network file systems. The system consists of a local area network 104, which connects a large number of client workstations and application servers 102, connected to various file servers. The file servers typically include standalone servers such as 105 and 106, as well as file servers, such as 107 and 108, configured as a cluster 110 with shared storage 118. The servers 107 and 108 are connected together through a high-speed, low-latency intra-cluster connection 112, and are also connected to the shared storage 118 through a SAN (storage area network), typically using optical (FibreChannel) interconnect 114 and 116. In addition, clients and application servers 102 and file servers 105 through 108 may be configured to be part of a distributed file system with the appropriate software services installed on all of those machines.

Single Box Solutions

Single box solutions provide a simple and straightforward approach to the problem of increasing the performance of file servers. Traditionally, the fastest available computers were used to serve files; when even these became insufficient, specialized architectures were built to extend the capabilities of the server. Where one processor was not enough, more processors were added; where the bandwidth of a standard bus was not sufficient, additional busses or even custom-designed wider busses were introduced, and so on.

The result of this approach is that high-end file servers are essentially massively multiprocessing supercomputers, with all the associated costs and complexity. Examples of single box solutions are the EMC Celera/Symmetrix, SGI Origin, HP Superdome, Intel Paragon and IBM SP, the trademarks of which are hereby acknowledged. However, high-performance multiprocessing file servers quickly run into the performance limits of their storage subsystems. The approach to resolving this bottleneck is to spread the load among multiple hard disks and data paths operating in parallel.

Single-box solutions are subject to several serious problems. First, because of the extremely high complexity and the need to develop custom silicon in order to satisfy performance requirements, single box solutions are very expensive. Second, their development cycles are exceedingly long, virtually guaranteeing that they will be "behind the curve" in many important aspects, such as software technologies, protocols, etc., by the time they are generally commercially available. Since storage requirements effectively double every year or so, these boxes often become obsolete long before the customers manage to depreciate their high cost.

Cluster File Systems

An alternative to scaling the server architecture within the box is to put together multiple servers accessing the same pool of storage over a fast interconnect such as HIPPI or FibreChannel. The result is a "cluster" of computers that acts in many aspects similarly to a multiprocessing supercomputer but can be assembled from generally available components.

Since all computers in a cluster access the same set of hard disks, the file system software in each of them has to cooperate with the other members of the cluster in coordinating the access and allocation of the storage space. The simplest way to approach this problem is to section the storage pool and divide it among the different computers in the cluster; this approach is implemented in Windows clustering described in "Windows Clustering Technologies—An Overview", November 2000, Microsoft Corp. The main challenge in the above-mentioned file system comes from the need to frequently synchronize and coordinate access to the storage among all members of the cluster. This requires a centralized lock manager and/or a file manager that controls the allocation of disk space to different files and controls access to those files. These components quickly become a major bottleneck that prevents the scaling of cluster file systems beyond about sixteen nodes.

The reliance on centralized resource coordination is the primary weak point of cluster file systems that limits severely their scalability. Solutions that partially relieve this problem introduce other problems, including custom functionality in storage subsystems and specialized client-side software. If any of these approaches is commercialized, the requirement for using proprietary storage subsystems will have substantial negative effect on both adoption and price, while the need to rely on proprietary client-side software that has to be installed in every client accessing the system make the system fragile, prone to security breaches and hard to deploy and support.

Distributed File Systems

Both single box solutions and cluster file systems are tightly coupled systems that exhibit serious scalability limitations. Creating distributed file systems is an approach attempting to combine hundreds of file servers in a unified system that can be accessed and managed as a single file system. Examples of distributed file systems are the Andrew File System, and its derivatives AFS and Coda, Tricord, as well as the Microsoft Distributed File System DFS.

Distributed file systems are loosely coupled collections of file servers that can be located in diverse geographical locations. They provide a unified view of the file namespace, allowing clients to access files without regard to where in the system those files reside. In addition, the system administrator can move files from one server to another in a transparent fashion and replicate files across multiple servers for increased availability in case of partial system failure.

Distributed file systems exhibit excellent scalability in terms of storage capacity. It is easy to add new servers to an existing system without bringing it off-line. In addition, distributed file systems make it possible to connect storage residing in different geographical locations into a single cohesive system.

The main problem with available distributed file systems is that they do not scale in performance nearly as well as they scale in storage capacity. No matter how large the number of servers in the system, each individual file resides on exactly one server. Thus, the performance the distributed file system can deliver to a single client (workstation or application server) is limited by the performance of the utilized individual file servers, which, considering the large number of servers involved, is not likely to be a very high performance machine.

Another problem that has great impact in commercial environments is the fact that most distributed file systems require specialized client-side software that has to be installed and configured properly on each and every client that is to access the file system. This tends to create massive versioning and support problems.

Moreover, distributed file systems are very prone to "hotspotting". Hotspotting occurs when the demand for an individual file or a small set of files residing on a single server increases dramatically over short period of time, resulting in severe degradation of performance experienced by a large number of users.

Yet another problem with distributed file systems is in their low manageability. Although most aspects of the distributed file systems can be managed while the system is on-line, the heterogeneous and distributed nature of these systems effectively precludes any serious automation of the management tasks. As a result, managing distributed file systems requires large amount of highly qualified labor.

Summary

Although many approaches to scaling network file systems have been taken over the last fifteen years, none has succeeded in delivering on the high performance, high scalability and simple management promise of storage networking. Analysis of the systems described above shows that all of their limitations can be traced to a small set of fundamental flaws, namely, all available systems suffer from at least one of the following problems:

1. One file, one server. The inability to utilize multiple file servers in handling requests for a single file limits severely the throughput available to any single client and does not allow the system to balance the load across all available processing resources.
2. Centralized arbitration and metadata management. The need to arbitrate access to storage and the shared data structures used to manage it creates a bottleneck that severely limits the scalability of the system.
3. Proprietary client-side software. The need to buy, install, configure and support a non-trivial piece of software across all client machines running multiple different operating systems creates serious barrier for adoption.

Conclusions

With the mass adoption of gigabit and multi-gigabit network infrastructure, storage networking is rapidly becoming key to delivering and managing content on the network. To achieve this, storage networks have to facilitate sharing of data among thousands (or even larger numbers) of users, be able to scale in storage capacity, performance and access bandwidth extremely well, provide a very high degree of availability, and be easy to manage. Increasingly, new applications, such as e-mail, streaming video content, document repositories, and other soft-structured data, require these characteristics to be achieved by a network service that provides access to files.

The existing approaches to scaling network file systems are successful in solving one or another aspect of these requirements. However, there is no currently available system that can deliver all characteristics needed for storage networking to achieve its promise.

SUMMARY OF THE INVENTION

A switched file system, also termed a file switch, is logically positioned between client computers and file servers in a computer network. The file switch distributes user files among multiple file servers using aggregated file, transaction and directory mechanisms. The file switch supports caching of a particular aggregated data file either locally in a client computer or in the file switch in accordance with the exclusivity level of an opportunistic lock granted to the entity that requested caching. The opportunistic lock can be obtained either on the individual data files stored in the file servers or on the metadata files that contain the location of each individual data files in the file servers. The opportunistic lock can be broken if another client tries to access the aggregated data file. Opportunistic locks allows client-side caching while preserving data integrity and consistency, hence the performance of the switched file system is increased.

BRIEF DESCRIPTION OF THE DRAWINGS

The aforementioned features and advantages of the invention as well as additional features and advantages thereof will be more clearly understood hereinafter as a result of a detailed description of a preferred embodiment of the invention when taken in conjunction with the following drawings in which.

DETAILED DESCRIPTION

Figure 1:
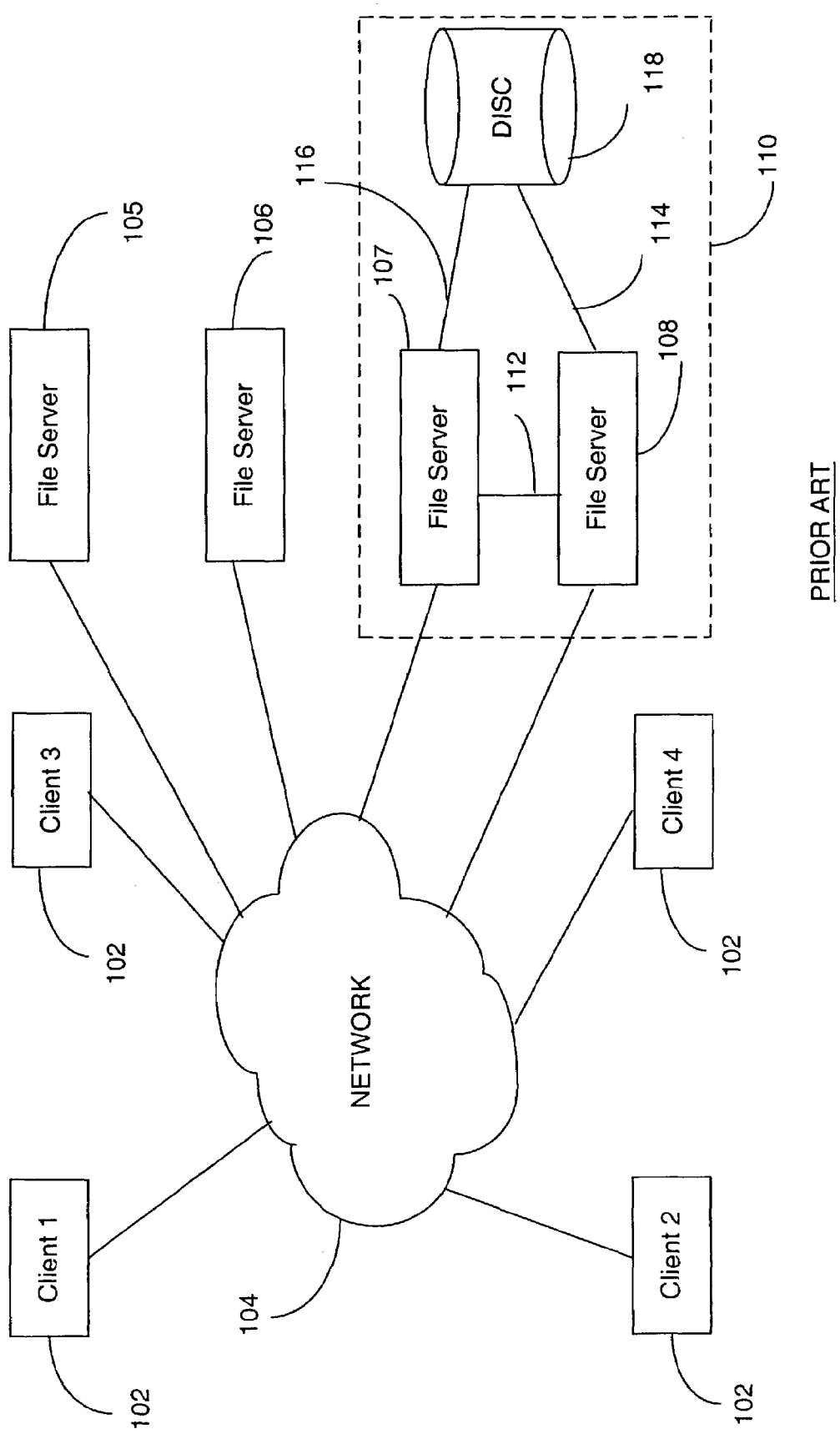
FIG. 1 illustrates a prior art storage network including a distributed file system and a clustered file system.

The following description is provided to enable any person skilled in the art to which the invention pertains to make and use the invention and sets forth the best modes presently contemplated by the inventor for carrying out the invention. Various modifications, however, will remain readily apparent to those skilled in the art, since the basic principles of the present invention have been defined herein specifically to provide a file switch, a switched file system and their mechanisms of operation. Any and all such modifications, equivalents and alternatives are intended to fall within the spirit and scope of the presently claimed invention.

Definitions

Aggregator. An "aggregator" is a file switch that performs the function of directory, data or namespace aggregation of a client data file over a file array.

Data Stream. A "data stream" is a segment of a stripe-mirror instance of a user file. If a data file has no spillover, the first data stream is the stripe-mirror instance of the data file. But if a data file has spillovers, the stripe-mirror instance consists of multiple data streams, each data stream having metadata containing a pointer pointing to the next data stream. The metadata file for a user file contains an array of pointers pointing to a descriptor of each stripe-mirror instance; and the descriptor of each stripe-mirror instance in turn contains a pointer pointing to the first element of an array of data streams.

File Array. A "file array" consists of a subset of servers of a NAS array that are used to store a particular data file.

File Switch. A "file switch" performs file aggregation, transaction aggregation and directory aggregation functions, and is logically positioned between a client and a set of file servers. To client devices, the file switch appears to be a file server having enormous storage capabilities and high throughput. To the file servers, the file switch appears to be a client. The file switch directs the storage of individual user files over multiple file servers, using striping to improve throughput and using mirroring to improve fault tolerance as well as throughput. The aggregation functions of the file switch are done in a manner that is transparent to client devices.

Switched File System. A "switched file system" is defined as a network including one or more file switches and one or more file servers. The switched file system is a file system since it exposes files as a method for sharing disk storage. The switched file system is a network file system, since it provides network file system services through a network file protocol—the file switches act as network file servers and the group of file switches may appear to the client computers as a single file server.

Data File. In the present invention, a file has two distinct sections, namely a "metadata file" and a "data file". The "data file" is the actual data that is read and written by the clients of a file switch. A file is the main component of a file system. A file is a collection of information that is used by a computer. There are many different types of files that are used for many different purposes, mostly for storing vast amounts of data (i.e., database files, music files, MPEGs, videos). There are also types of files that contain applications and programs used by computer operators as well as specific file formats used by different applications. Files range in size from a few bytes to many gigabytes and may contain any type of data. Formally, a file is a called a stream of bytes (or a data stream) residing on a file system. A file is always referred to by its name within a file system.

Metadata File. A "metadata file", also referred as the "metafile", is a file that contains the metadata, or at least a portion of the metadata, for a specific file. The properties and state information about a specific file is called metadata. In the present invention, ordinary clients cannot read or write the content of the metadata files, but still have access to ordinary directory information. In fact, the existence of the metadata files is transparent to the clients, who need not have any knowledge of the metadata files.

Mirror. A "mirror" is a copy of a file. When a file is configured to have two mirrors, that means there are two copies of the file.

Network Attached Storage Array. A "Network Attached Storage (NAS) array" is a group of storage servers that are connected to each other via a computer network. A file server or storage server is a network server that provides file storage services to client computers. The services provided by the file servers typically includes a full set of services (such as file creation, file deletion, file access control (lock management services), etc.) provided using a predefined industry standard network file protocol, such as NFS, CIFS or the like.

Oplock. An oplock, also called an "opportunistic lock" is a mechanism for allowing the data in a file to be cached, typically by the user (or client) of the file. Unlike a regular lock on a file, an oplock on behalf of a first client is automatically broken whenever a second client attempts to access the file in a manner inconsistent with the oplock obtained by the first client. Thus, an oplock does not actually provide exclusive access to a file; rather it provides a mechanism for detecting when access to a file changes from exclusive to shared, and for writing cached data back to the file (if necessary) before enabling shared access to the file.

Spillover. A "spillover" file is a data file (also called a data stream file) that is created when the data file being used to store a stripe overflows the available storage on a first file server. In this situation, a spillover file is created on a second file server to store the remainder of the stripe. In the unlikely case that a spillover file overflows the available storage of the second file server, yet another spillover file is created on a third file server to store the remainder of the stripe. Thus, the content of a stripe may be stored in a series of data files, and the second through the last of these data files are called spillover files.

Strip. A "strip" is a portion or a fragment of the data in a user file, and typically has a specified maximum size, such as 32 Kbytes, or even 32 Mbytes. Each strip is contained within a stripe, which is a data file containing one or more strips of the user file. When the amount of data to be stored in a strip exceeds the strip's maximum size, an additional strip is created. The new strip is typically stored in a different stripe than the preceding stripe, unless the user file is configured (by a corresponding aggregation rule) not to be striped.

Stripe. A "stripe" is a portion of a user file. In some cases an entire file will be contained in a single stripe. Each stripe is (or is stored in) a separate data file, and is stored separately from the other stripes of a data file. As described elsewhere in this document, if the data file (also called a "data stream file") for a stripe overflows the available storage on a file server, a "spillover" file is created to store the remainder of the stripe. Thus, a stripe is a logical entity, comprising a specific portion of a user file, that is distinct from the data file (also called a data stream file) or data files that are used to store the stripe.

Stripe-Mirror Instance. A "stripe-mirror instance" is an instance (i.e., a copy) of a data file that contains a portion of a user file on a particular file server. There is one distinct stripe-mirror instance for each stripe-mirror combination of the user file. For example, if a user file has ten stripes and two mirrors, there will be twenty distinct stripe-mirror instances for that file. For files that are not striped, each stripe-mirror instance contains a complete copy of the user file.

Subset. A subset is a portion of thing, and may include all of the thing. Thus a subset of a file may include a portion of the file that is less than the entire file, or is may include the entire file.

User File. A "user file" is the file or file object that a client computer works with, and is also herein called the "aggregated file." A user file may be divided into portions and stored in multiple data files by the switched file system of the present invention.

File Switch and Switched File System

Figure 2:
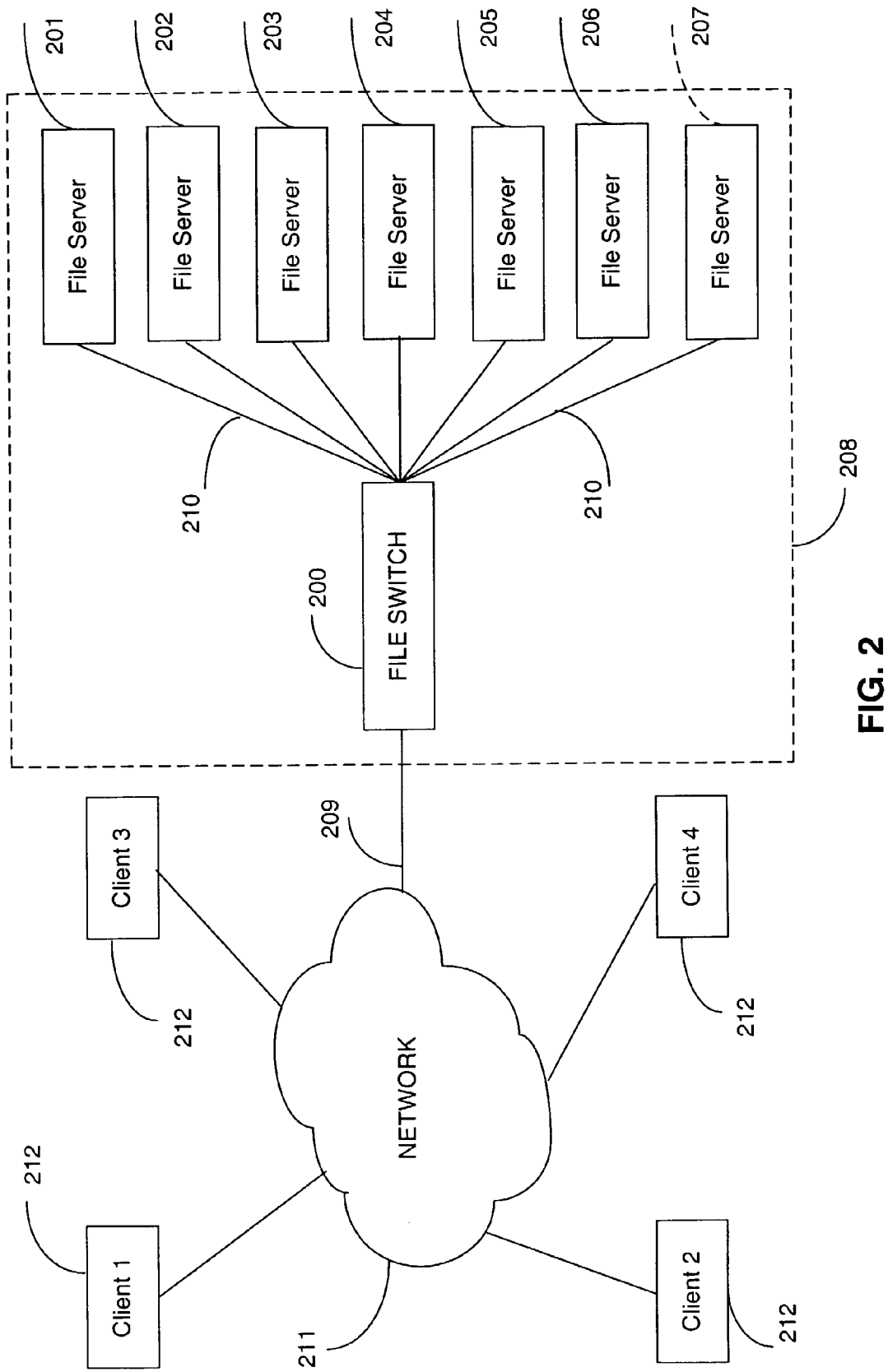
FIG. 2 illustrates a file switch in a computer network.

FIG. 2 illustrates an inventive network configuration including a file switch 200. In this configuration, the file switch 200 is implemented with two different network interfaces: one for connecting to the client network 211 through connection 209, and the other for connecting to a file server network through connections 210 and other similar connections as shown. For simplicity, the file switch 200 is shown in this Figure as being directly connected to each of the file servers 201 through 207. In practice, one or more commonly available layer 2 switches are preferably used to implement these connections.

Since most popular network file protocols are based on the IP standard, the file switch preferably supports TCP/IP network protocols, as well as other protocols of the IP stack (e.g., ARP), as appropriate. The file switch preferably supports multiple industry standard network file protocols, such as NFS and CIFS.

Clients, such as workstations and application servers 212 request file services by communicating to the file switch 200 using the NFS or CIFS protocols. File switch 200 preferably implements the server side of the appropriate network file protocol on the connection 209. The switch further interacts with the file servers 201 through 207 by implementing the client side of preferably the same network file protocol. The presence of file switch 200 is thereby preferably transparent to both the clients and the servers.

Additionally, the file switch may implement other IP protocols, such as DHCP, DNS or WINS, either as a client or as a server for purpose of configuring file servers 201 through 207, self-configuration of the file switch, and others that will be described herein.

The file switch 200 implements industry standard protocols both on the client side (via connection 209) and on the server side (via connections 210). This implementation allows the file switch 200 to function in an environment where the file servers 201 through 207 are standard, commercially available file servers or NAS appliances, and clients 212 are standard commercially available computers. In this manner, the benefits of the file switch can be utilized without requiring any proprietary software to be installed and maintained on any other network node.

The primary functionality of the file switch can be divided into three broad categories: 1) transaction handling; 2) file system aggregation; and 3) switch aggregation. Transaction handling includes transaction switching and transaction aggregation. File system aggregation includes aggregating file system objects and data file. Switch aggregation includes various mechanisms for combining multiple file switches together, which includes load balancing, configuration sharing, fail-over and management aggregation. The functionality of the file switch may be implemented in software, in hardware or any combination of software and hardware, as appropriate.

A switched file system is a distributed file system as it aggregates the namespaces of multiple file servers. It is also a parallel file system, as it can utilize multiple file servers in parallel to satisfy the request of a single network file client. Therefore, the switched file system is a new type of distributed, parallel network file system.

Figure 3:
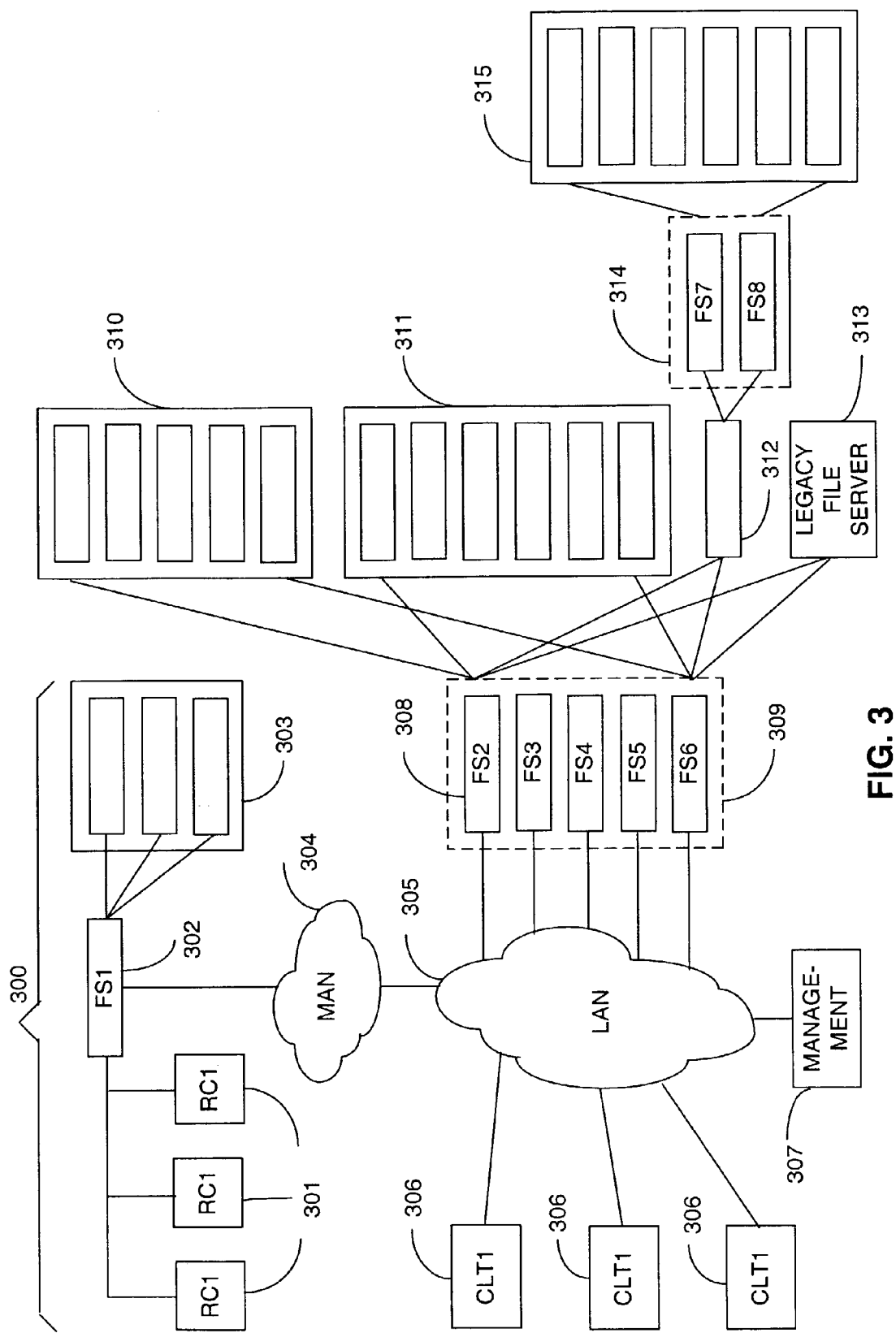
FIG. 3 illustrates a switched file system.

FIG. 3 illustrates a switched file system, including its configurations and applications. The exemplary switched file system consists of the following elements. A set of file switches 308 are aggregated in a group 309, and are connected to two arrays of file servers 310 and 311, which are called NAS arrays. The file switches 308 are also connected to a legacy file server 313, typically containing archive and other pre-file switch content, which is aggregated only by namespace (i.e., the file switches 308 do not perform file aggregation for the files stored by the legacy file server 313). In addition, the file switch group 309 aggregates the namespace of another switched file system provided by the file switch group 314 connected to NAS array 315 and connected to the group 309 through a layer 2 switch 312.

The services of the group 309 are provided to a network 305 that includes clients 306, a management workstation 307 and a connection to a metro-area network 304. The metro-area network 304 provides the remote LAN 300 and its clients 301 with file services made available by group 309. In order to improve the access to these services, the remote LAN 300 also includes a file switch 302, which acts as a gateway to the group 309 and caches files locally to the NAS array 303.

Topologies

The switched file system provides many combinations of file system aggregation and supports different topologies.

One of the available topologies is virtualization. In virtualization, the switched file system aggregates the namespace exposed by a single file server (e.g., legacy file server 313) without further aggregating its files on other servers. One of the mechanisms available for this is the namespace aggregation technique described herein. The virtualization allows pre-existing file servers to be made available to clients of the switched file system and included in its logical namespace. This functionality facilitates the adoption of the switched file system and provides an incremental approach to adoption.

Another available topology is NAS array. The switched file system can have a set of file servers (e.g., the servers in array 310), preferably with similar capacity and performance characteristics, designated as a NAS array. The file switches participating in the switched file system distribute files across the file servers in the NAS array, by using the directory, and data aggregation mechanisms described herein. NAS arrays provide high performance and high availability. Multiple NAS arrays can be configured in the same switched file system, and their namespaces can be aggregated with virtualized file servers to present a unified namespace.

Yet another available topology is cascading. In a cascaded configuration, one or more switched file systems can be connected within another switched file system, effectively playing the role of a file server in that other switched file system. In our example, the file switches 314 and the NAS array 315 comprise a small switched file system, which is aggregated in the namespace of the switched file system presented by the group 309. Since the file switches 314 appear as a file server to the file switches 309, the latter can aggregate the namespace provided by the former the same way as the virtualized server 313. One skilled in the art will easily recognize that multiple instances of the switched file system comprising the file switches 314 and the NAS array 315 may exist, and may be aggregated by the switches in the group 309 in any and all ways in which the latter may aggregate regular file servers, including data aggregation, directory aggregation, and so on.

Another topology is the gateway topology. A file switch 302, preferably having its own NAS array 303, acts as a gateway to clients locally connected to it, and provides access to the file services made available by the file switch group 309. An advantage of this topology is that the connection between group 309 and file switch 302, such as the MAN 304, may have lower bandwidth than the local networks 305. The gateway topology allows the gateway file switch 302 to cache locally on the NAS array 303 files normally residing on the file system exposed by the group 309. Since the file switch 302 appears as just another client to the file switch group 309, all locking and other client semantics are available to the file switch 302 to provide caching.

Basics of Transaction Aggregation By a File Switch

The typical operation of the file switch involves receiving file protocol requests, such as login, tree connect/mount, file open, file read/write, etc., from clients and forwarding, or switching these requests to one or more of the file servers.

Figure 4:
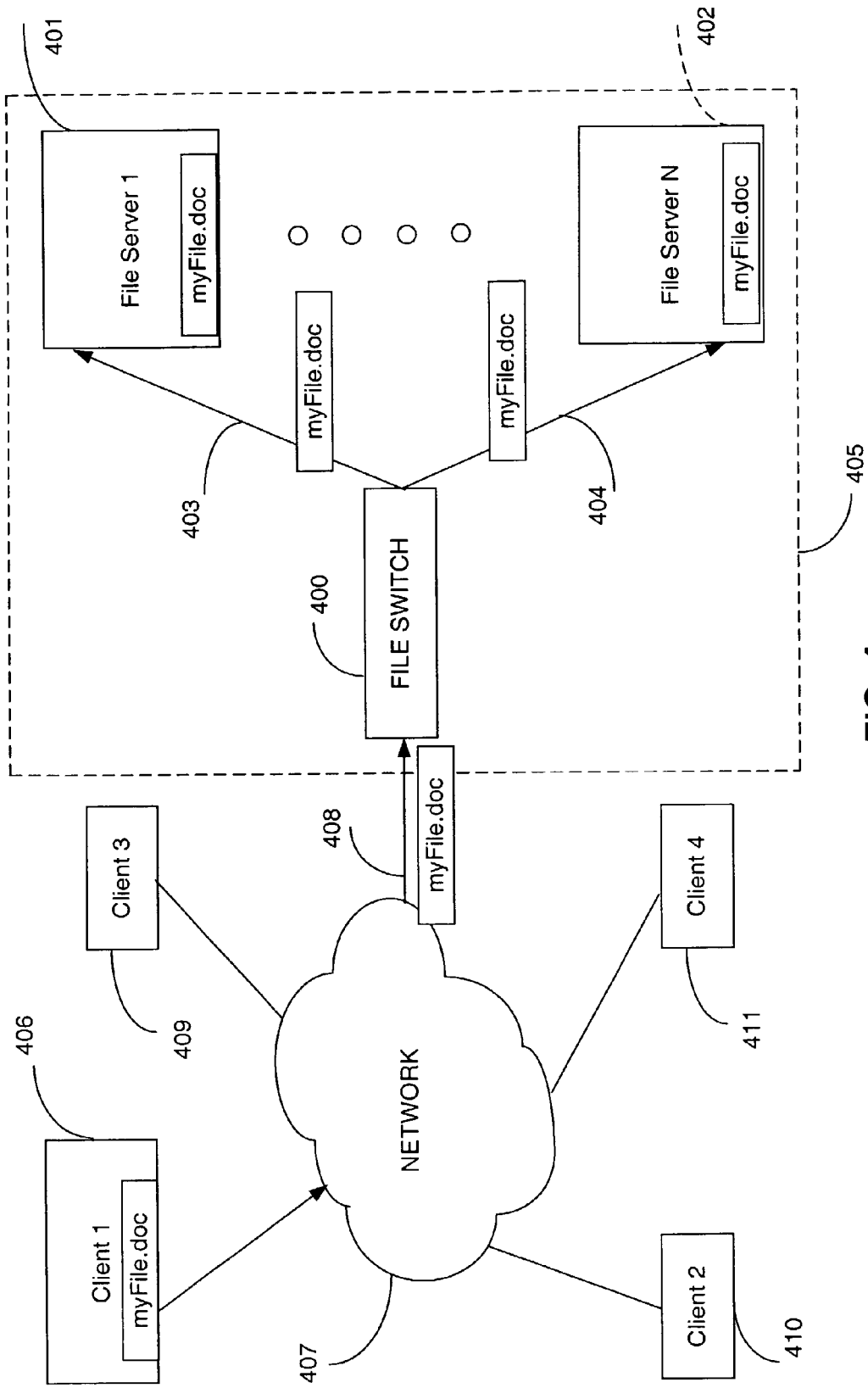
FIG. 4 illustrates transaction aggregation by a file switch.

FIG. 4 illustrates a preferred process by which a file switch can delegate a single transaction received from a client to more than one file server and therefore aggregate the behavior of those servers in handling the transaction. The behavior of the file switch is presented to the original client as the behavior of a single file server.

Consider the case in which a file switch 400 stripes the data of a file among file server 401, connected to the file switch through connection 403, and file server 402, connected to the file switch through connection 404, in order to deliver higher aggregate performance to clients by making these two file servers handle requests in parallel.

In this example, a client 406 is connected through a computer network 407 to the file switch 400 through connection 408. The client 406 has established preferably a TCP connection to the file switch 400, and believes the file switch 400 to be a file server. The client 406, therefore, initiates a file write transaction of a file named myFile.doc by issuing a write request message to the file switch 400. After receiving the write request message, the file switch is in a position to decide how to handle the transaction.

In this example, the switch handles the transaction by splitting it into two transactions targeted to two separate file servers 401 and 402. Upon examining the write request, the file switch updates its state (as discussed in more detail below) in a manner sufficient to accomplish the goal, and forwards the write request to the file servers 401 and 402 via the connections 403 and 404, respectively. The two file servers 401 and 402 receive separate file write requests, each for its appropriate file and each with the appropriate portion of the data to be written. The file servers execute the requested write operations in parallel and submit their respective responses to the file switch, which they believe to be the originator of the write requests. It should be noted that this process does not require in any way that servers 401 and 402 interact with one another or even be aware of the other's existence.

Upon receipt of responses from file servers 401 and 402, respectively, the file switch 400 knows the results of both write requests submitted by it and is, therefore, in a position to form a response to the original client containing the aggregate result of the transaction. The switch achieves this by sending an acknowledgement to the original client. The client receives the response and sends the file myFile.doc to the file switch. The file switch in turn sends the file myFile.doc to the appropriate directory in servers 401 and 402. The transaction is now complete.

The mechanism described above enables two innovative results. First, the file switch can aggregate a set of file system entities, such as files or directories that reside on different file servers and present this set to the clients as a single cohesive entity, thereby forming the foundation for aggregating complete file systems.

Second, this mechanism allows the switch to split or replicate individual read and write network file transactions among multiple file servers, which execute the requested operations in parallel. In this manner, the present invention sets the foundation for forming the equivalent of a parallel file system on a network including file switches and file servers. The file switch has the ability to deliver aggregate performance to each client that is many times higher than the performance of the individual file servers available to it.

Client's View of the Switched File System

Figure 5:
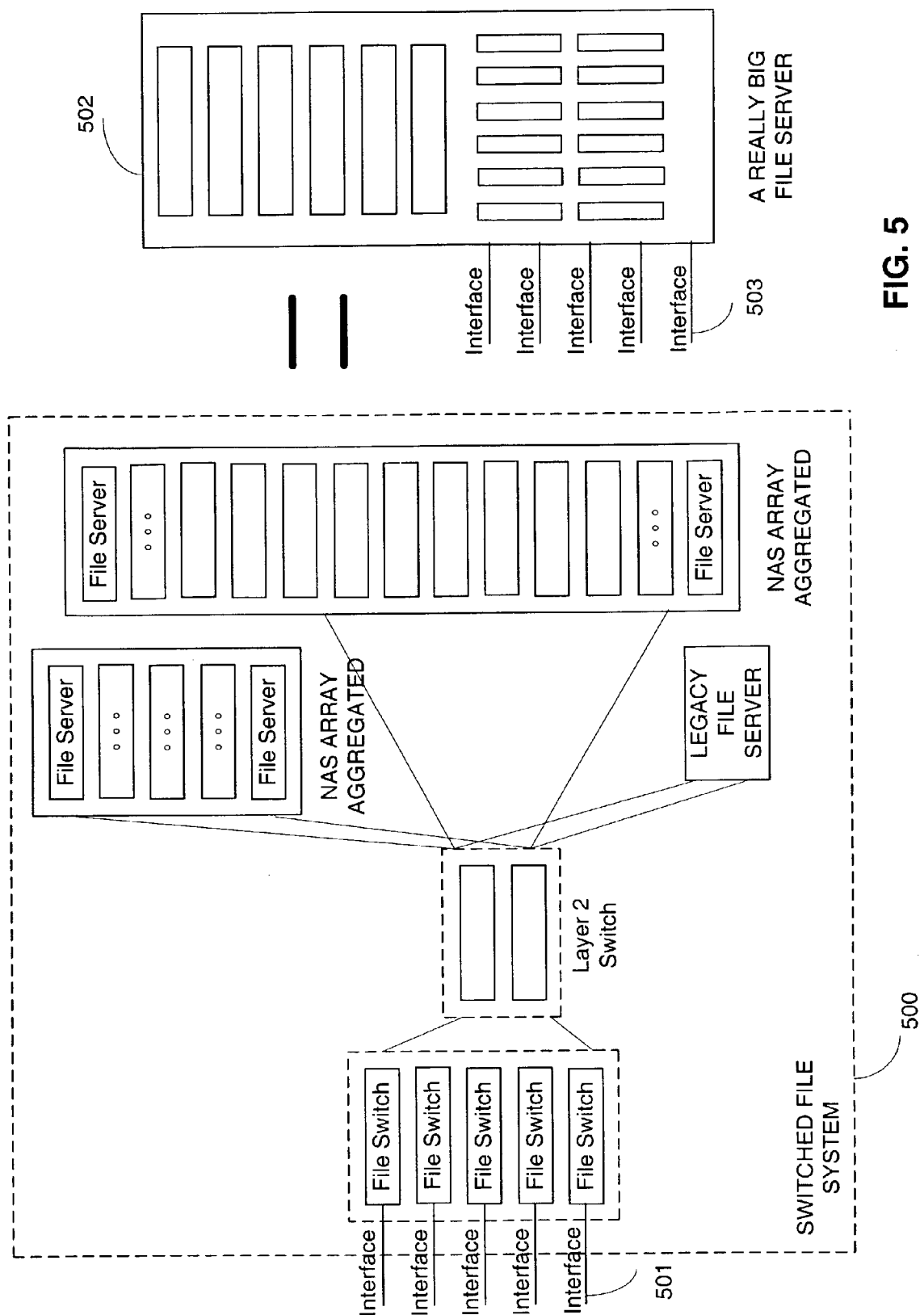
FIG. 5 illustrates the client's view of a switched file system.

From the standpoint of a network file client, such as 406, the switched file system appears as a single file server with multiple network interfaces. FIG. 5 illustrates the similarity between a switched file system and a single file server. Network clients connect to the switched file system 500 through the interfaces 501 as they would connect to the single file server 502 though its interfaces 503.

The switched file system 500 preferably provides a single namespace. It allows network file clients to use standard client software using widely standardized network file protocols for accessing file servers, such as the CIFS and NFS protocols. The ability of standard file client software to access the switched file system simplifies adoption and also allows changes to the switched file system mechanisms and topologies to be performed transparently to all clients.

Administrator's View of the Switched File System

An administrator's view of the switched file system 500 is to a degree similar to the client's view. For most operations, the administrator views the switched file system 500 as if it were a single, high-capacity, high-performance, and highly available file server 502. For the purposes of management and reconfiguration it preferably appears as a single file server. The file switches preferably support the same file server management protocols (such as MSRAP) as single CIFS or NFS file servers do. The switched file system can be configured to expose shares/mount points in the aggregated namespace to their clients.

Administrators can add individual file servers (using the virtualization topology) and new NAS arrays to the switched file system 500, and can also add or remove file servers to or from existing NAS arrays in the switched file system. In the event the administrator adds one or more file servers to an existing NAS array, the file switch can discover the newly added servers (or automatically have access to the added servers). And preferably on administrator's request, the file switches redistribute the files and their data across all file servers, including the newly added ones, thus extending both the capacity and the performance of the file system. In case the administrator wishes to remove one or more file servers from a NAS array, the administrator can request that a file switch free up specified servers (by redistributing the files to the file servers that remain in the NAS array). Upon completion of that process, the file switches notifies the administrator that the selected file servers are free and can be removed without data loss.

The switched file system 500 provides high availability by distributing the work among many file switches and file servers. Failure of a file server or a file switch typically does not cause loss of data or loss of access. The administrator can be notified of the failure and replace or repair the failed component.

The switched file system preferably tracks access patterns and can report statistical information to the administrator. Based on this information, the administrator can tune the performance and storage capacity utilization of the switched file system 500, for instance by adding or reconfiguring NAS arrays, file switches and by changing aggregation rules (discussed below) on the file switches.

Scaling in Switched File System

The switched file system scales capacity and performance by adding more file servers to a NAS array and distributing files across all file servers. It scales access bandwidth by adding more file switches to a connected group and accesses the same set of file servers, providing a wider access path (multiple network connections). Unlike prior art solutions, the switched file system scales independently in multiple directions (or dimensions) without inherent limitations.

The switched file system also scales in geographical distribution by adding cascaded file switches (or switched file system) and gateway file switches.

Metadata Based Switched File System

Hardware Architecture

Figure 6:
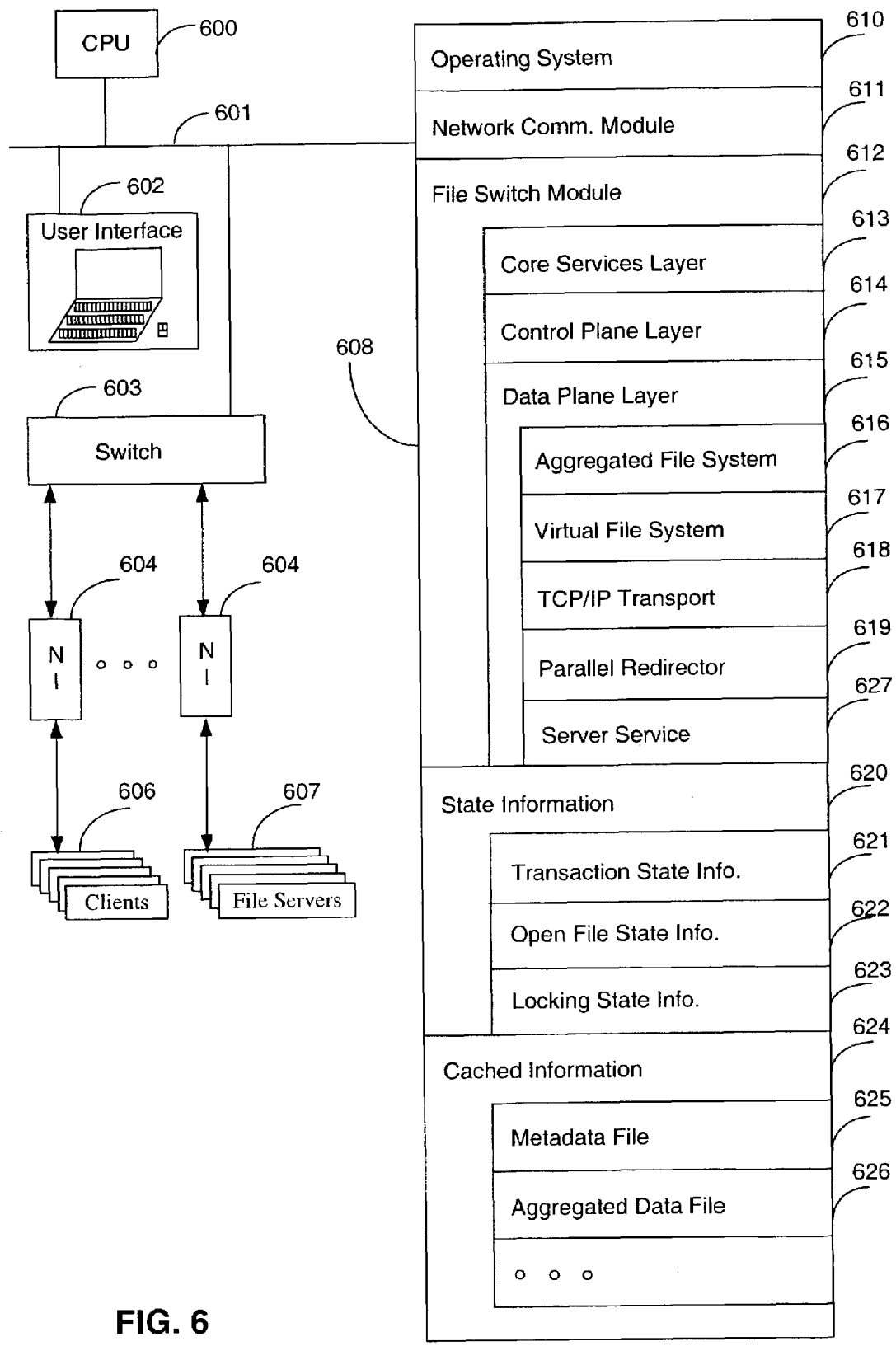
FIG. 6 illustrates the hardware architecture and memory structure of a file switch.

In a preferred embodiment, each file switch 400 (FIG. 4) of the metadata based switched file system is implemented using a computer system schematically shown in FIG. 6. The computer system (i.e., the file switch) one or more processing units (CPU's) 600, at least one network or other communications interface 604, a switch 603 or bus interface for connecting the network interfaces to the system busses 601, a memory device 608, and one or more communication busses 601 for interconnecting these components. The file switch may optionally have a user interface 602, although in some embodiments the file switch is managed using a workstation connected to the file switch via one of the network interfaces 604. In alternate embodiments, much of the functionality of the file switch may be implemented in one or more application specific integrated circuits (ASIC's), thereby either eliminating the need for a CPU, or reducing the role of the CPU in the handling file access requests by client computers.

The memory 608 may include high speed random access memory and may also include non-volatile memory, such as one or more magnetic disk storage devices. The memory 608 may include mass storage that is remotely located from the central processing unit(s) 600. The memory 608 preferably stores:

an operating system 610 that includes procedures for handling various basic system services and for performing hardware dependent tasks;

a network communication module 611 that is used for controlling the communication between the system and various clients 606 and file servers via the network interface(s) 604 and one or more communication networks, such as the Internet, other wide are networks, local area networks, metropolitan area networks, and so on;

a file switch module 612, for implementing many of the main aspects of the present invention;

state information 620, including transaction state 621, open file state 622 and locking state 623; and cached information 624, including cached (and aggregated) data file 626 and corresponding metadata files 625.

The file switch module 612, the state information 620 and the cached information 624 may include executable procedures, sub-modules, tables and other data structures.

In other embodiments, additional or different modules and data structures may be used, and some of the modules and/or data structures listed above may not be used.

Software Architecture

Layering Model

FIG. 6 also illustrates the preferred software architecture for a metadata based switched file system. The software architecture of the switched file system is preferably divided in three planes: the core services plane 613, the control plane 614, and the data plane 615.

The core services layer 613 provides basic services to all components in the remaining layers. These services include services provided by the operating system (memory management, component model, threading), as well as services developed specifically for the file switch as an unattended and always-on device (configuration database, event manager, etc.). These services are general, low-level computer services, and are minimally dependent on the particular functions of a file switch.

The control plane layer 614 is responsible for maintaining the operation of the data plane 615. It sets up the configuration of the data plane, controls the life cycle of the file switch, such as start, stop, and restart, and implements various management protocols. In addition, it includes additional services that provide features like clustering of file switches, load balancing, failover, backup, file system check and repair, and automated management. These functions don't participate directly in serving client-originated file requests, but are essential for the existence and continued operation of the file switch. These functions may also include value-adding services, such as data migration and accounting.

The data plane layer 615 is responsible for file switching and aggregation. It provides all protocol layers through which file requests pass as well as the switching logic that distributes these requests to the file servers and aggregates the responses. All requests to access files and user file directories go through the data plane 615 and are served by it.

The Data Plane

Figure 7:
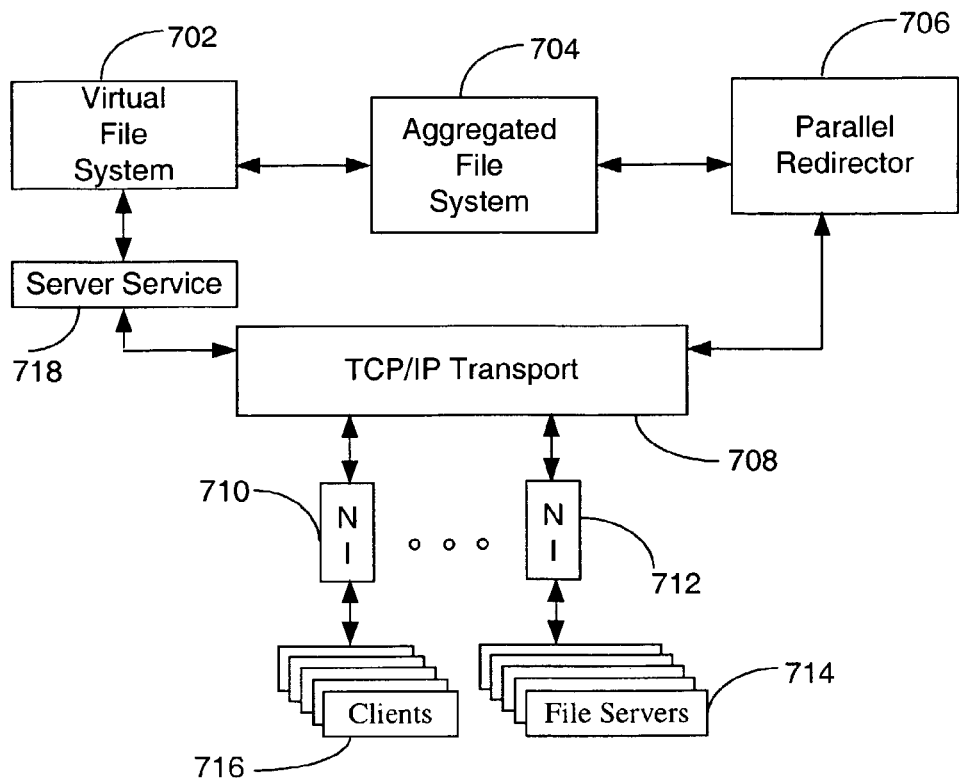
FIG. 7 illustrates the data plane of a file switch.

In the preferred embodiment illustrated in FIG. 7, the data plane consists of the following key components.

The TCP/IP Transport 708 includes the NetBT (NETBIOS over TCP/IP) sub-layer used by the Server Service (SRV) 718 and Parallel Redirector 706 (RDR) components. This includes the entire transport layer from the TCP or NetBT session layer down to the physical Ethernet interface. For fast operation and minimum load on the CPU, the file switch uses a hardware-implemented or hardware-assisted extension of the TCP/IP implementation. However, the use of hardware-assisted TCP is not required for the file switch to operate because the components that interface with TCP, such as SRV 718 and RDR 706, use the standard transport protocol interface provided by the TCP/IP transport.

The Server Service 718 (SRV) is the CIFS file server service. It interprets the clients' requests for operations on files sent as CIFS commands and translates them to NT/WDM file I/O requests (IRPs). SRV 718 handles the entire process of authenticating clients. Other file protocol servers can be used instead of or along with the CIFS file server (e.g., NFS).

The Virtual File System 702 (VFS) is a file system driver, an Installable File System, in WDM terms. VFS 702 provides the common name space of the File Switch, which makes multiple NAS Arrays combined into aggregated file systems along with legacy single-server NAS file systems appear as a single file system to the client. In addition, VFS serves as a "security context gateway", working in the context of the connected client on its front side and providing the mandated access control checks, while operating in the "local system" context when accessing the constituent file systems that make up the "virtual" namespace. Finally, VFS implements the local caching of open files to provide low latency to the clients and optimize access to the constituent server file systems by consolidating small I/O requests ("lazy write", "read ahead").

The Aggregated File System 704 (AFS) is a file system driver. It implements the "Switched File System" aggregation mechanisms. It presents an array of file servers as a single file system by distributing the metafiles and the data files stored among the file servers. It also performs the function of aggregating data files and load balancing accesses between clients and the array of file servers. AFS further provides advanced NTFS-style features including Unicode names, extended attributes and security descriptors, even if the file systems that it aggregates do not have this support.

The Parallel Redirector 706 (RDR) is a file system driver. It is similar to the Windows Workstation service, which exposes a file I/O interface and converts it to network file I/O requests sent to a remote server. It uses multiple concurrent connections to the same network server in order to alleviate the inability of some CIFS implementations to handle multiple pending client read and write requests on the same network connection. In addition, the RDR is used to access the virtualized "legacy" servers and to perform operations on aggregated data files of the file system.

The data plane also includes a front-side network interface 710 and a back-side network interface 712. A front-side and a back-side TCP/IP protocol stack reside within the TCP/IP transport 708.

Various other services, such as DHCP, DNS, load-balancing, command-line and/or web-based management, SNMP, etc., may be included in or added to the architecture described above.

The implementation of the architecture described above can be arranged in many possible ways. For example, the network interfaces may be implemented in hardware, while the rest of the data plane and the two remaining planes are fully implemented in software. Alternatively, additional portions of the data plane may be implemented in hardware (e.g., by using Field-Programmable Gate Arrays, Application-Specific Integrated Circuits, switch fabrics, network processors, etc.), while the control plane 614 may be implemented in software. In addition, the control plane 614 may be further implemented or accelerated in hardware. Moreover, it may be advantageous to implement portions of a certain plane (e.g., the data plane or the control plane) by providing accelerated functions in hardware while maintaining the rest of the plane's functionality (such as setup, initialization and other slow functions) in software. In other embodiment, the Aggregated File System 704 is provided, but the Virtual File System 702 is not provided. In yet another embodiment one or more of the modules of the file switch are implemented on the file servers of a NAS array.

One skilled in the art will easily recognize that various other architectures for implementing a file switch are possible. In addition, while most of the particular choices made in implementing the file switch (such as those described above) are preferably driven by the performance and cost targets of the file switch, all various implementations fall within the spirit of the present invention.

Operation of the Data Plane

In normal operation, the components in the data plane interact with each other and with the Ethernet interfaces of the File Switch. The following steps illustrate the interactions between the components for an exemplary client session.

Exemplary Client Session

1. Client connects to the file switch via the network interface 710.
    The TCP connection request is forwarded to SRV 718 via the TCP/IP transport.
2. Client logs in and attaches to a shared mount point exposed by the switch.
    The client's request arrives as a series of CIFS commands. SRV 718 performs authentication of these requests without involving any other data plane components.
3. Client opens a file.
    As the shared mount point exposed by SRV 718 is associated with the file system owned by VFS 702, SRV 718 translates the request to a file system operation on VFS 702.
    Next, VFS 702 consults a virtualization table stored in the configuration database and finds the translated path for the file. This path may point to a file on a "legacy" file system handled by RDR 706 or to a file on an aggregated file system handled by AFS 704.
    Next, VFS 702 retrieves the security descriptor for the file and performs a security check to verify the client's right to open the file. If the check passes, the open request is forwarded to AFS 704 or RDR 706 using the translated file path. Upon successful completion of the "open", VFS 702 will request an opportunistic lock (op-lock) on the file in order to enable local caching of the file.
    If the file is on a "legacy" file system, RDR 706 completes the open operation through its CIFS connection to the NAS sever.
    If the file is on an aggregated file system, the "open" request is handled by AFS 704. Then, AFS 704 begins processing of the "open" request by issuing an "open" request to all mirror copies of the metadata file that represents the client's aggregated data files through RDR 706. If at least one mirror copy is opened successfully, AFS 704 completes the client's open request and starts calling RDR 706 to open the data files that hold the client's data.
    For each of the data files, RDR 706 picks one of its "trunked" connections to the corresponding NAS server to use for that file and sends a CIFS open request to that connection. Following an analogy from the telecom world, the use of multiple connections to the same target in order to increase throughput is referred to in this specification as a "trunked" connection.
4. Client reads metadata (e.g., directory information).
    A client request to read file attributes, file size and similar requests not related to data read/write are forwarded to SRV 718 and are converted to file system operations on the metadata file corresponding to the specified user file. All of these requests go through the same path as follows:
    the VFS 702 forwards the requests directly to the same file system on which the file was originally opened.
    if file is found on the AFS 704, the AFS 704 forwards the requests to RDR 706 as an operation on one of the mirror copies of the metadata file or to all mirror copies, if the operation involves a modification of the metadata file.
    the RDR 706 converts the requests to CIFS requests and sends them to the NAS server.
5. Client requests a data operation.
    Client's data requests are converted by SRV 718 into "read", "write" and "lock control" file I/O requests sent to VFS 702. Data operations on aggregated files are forwarded from VFS 702 to AFS 704. AFS 704 consults its aggregation table, compiled from data in the configuration database, computes how to distribute the requests among the data files that hold the client's data and forwards those requests to the data files open on RDR 706.
6. Client disconnects.
    When the client disconnects, SRV 718 closes any files that were left open, thus providing proper closing of files on the servers, even if the client does not close its file before disconnecting.

One skilled in the relevant art will easily recognize that various modifications of this architecture can work well for the inventive file switch while preserving the spirit of the present invention. For example, more network interfaces 710 and 712 can be added, and the two network interfaces can be replaced by a single network interface wherein the client traffic and the server traffic can be separated by the TCP protocol stack. The TCP protocol stacks can be merged together (in many conventional computer architectures there is a single TCP/IP protocol stack that handles multiple network adapters) or separated per network adapter.

In addition, multiple server-side SRV's 718 can be added in order to process multiple network file protocols or different versions thereof. Similarly, multiple client-side RDR's 706 can be added in order to support multiple network protocols or multiple versions of such network protocol in interacting with the file servers.

Metadata File

A metadata file based switched file system aggregates files across multiple file servers of a NAS array in order to increase performance and to aggregate storage capacity. The subset of file servers of a NAS array that are used to represent a single user file is known as a file array. Every file contained in the aggregated file system has a corresponding file array.

The model of metadata file aggregation is based on the file array. From the point of view of the client, an aggregated file is seen as a single file. However, the switched file system views the file as multiple metafiles and data files stored on multiple file servers in the file array. "Metafile based aggregation" refers to aggregating the metafiles and data files that together store the metadata and data file of a specified user file.

There are two classes of properties of an aggregated file: state and metadata. The state properties are managed internally by the file switch in memory. These properties are used to describe the current state of a file such as current oplock level, access mode, and cache mode. The metadata in general is shared between all clients of a single file. Each property has an associated aggregation class. The aggregation class describes how a specific property is aggregated in relation to the elements of a file array.

Primary and Secondary Metadata File

The switched file system metadata for each aggregated file (also called the user file) consists of two separate metadata files: a primary metadata file and a secondary metadata file. The Primary metadata file contains various properties about a specific aggregated file, such as the aggregation parameters, file paths to the data files that store the contents of the aggregated file, and file attributes. The metadata file attributes represent the aggregated file attributes (file attributes, creation date and time, etc.). The primary metadata filename is the same as the aggregated filename except it is prefixed with the letter 'P'.

The secondary metadata file is used only (or primarily) to store the aggregated size of the file. The size of the file is encoded in the file's date/time attribute fields, which are retrieved through a file get information request. The secondary metadata file contains no data. The secondary metadata filename is the same as the aggregated filename except it is prefixed with the letter 'S'. For file systems that do not support date/time attribute fields large enough to store the file size, the file size may be stored in the primary or secondary file's data.

In an alternative embodiment, only the primary metadata file is created and there is no secondary metadata file. In this alternative implementation, the aggregated file size is encoded directly in one of the primary metadata file's date/time attributes fields (e.g., the creation date/time field).

Figure 8:
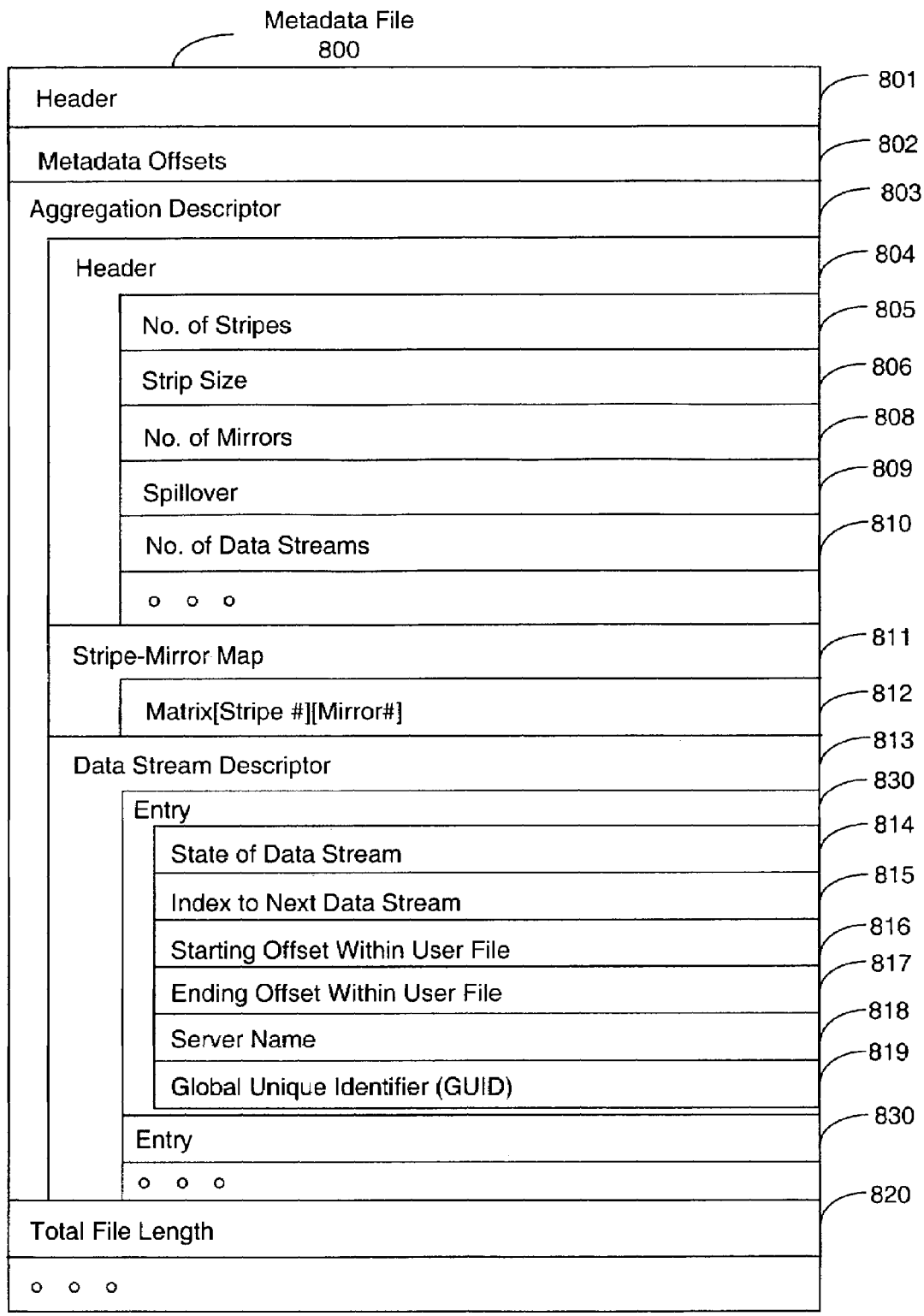
FIG. 8 illustrates an exemplary metafile.

FIG. 8 illustrates the contents of the primary metadata file 800 in a preferred embodiment. At a minimum, the primary metadata file 800 contains the following elements:

- A header 801 field for storing genuine file attributes that are exposed to the user, such as creation, last access, and last written dates and times. The header 801 is optional since much or all of the header information may be stored in the directory entry for the metafile.
- A metadata offsets field 802 for pointing to various portions of the metadata contained in the metadata file. This is used by the aggregated file system for quickly accessing the portions of the metadata. In alternate embodiments, the offsets field 802 can be eliminated if fixed sized fields or fixed position fields are used in the metadata file.
- An aggregation descriptor field 803 that contains a header of the descriptor 804, a stripe-mirror map 811, and a data stream descriptor 813. The header of the descriptor 804 further contains a flag that indicates whether the metafile is valid. If the metafile is not valid, it should be ignored or updated to become valid.
- A number of stripes field 805 for indicating the number of stripes into which the corresponding user file has been divided.
- A strip size field 806 for indicating the size (in number of bytes) of each strip.
- A number of mirror field 808, which indicates the number of copies (also called mirrors) of each stripe that are stored in a file array.
- A spillover field 809 for indicating whether there is any spillover of the user file.
- A number of data streams field 810 for indicating the total number of data streams for the user file.
- A matrix 812 of pointers to entries 830 in the data stream descriptor. The size of the matrix is determined by the number of stripes 805 and the number of mirrors 808 of the user file. The matrix 812 contains an array of pointers (e.g., indexes into the data stream descriptor), one for each distinct stripe-mirror of the user file, to entries 830 in the data stream descriptor 813. For example, if a file has ten stripes and two mirrors, there will be twenty distinct stripe-mirrors for that file. Each instance of a stripe is sometimes called a stripe-mirror instance, to emphasize that the data file containing that stripe instance is for a particular mirror of the stripe. Each entry 830 in the data stream descriptor 813 includes, in turn, the name 818 of (or a pointer to, or an identifier of) a file server in which a stripe-mirror instance of the user file is stored. If the stripe-mirror instance overflowed the file server, then the entry 830 also identifies a spillover segment with a pointer (index to next data stream) 815 to a next entry 830 that describes the spillover segment.
- A total file length field 820 for indicating the total aggregated size of the user file. This field is optional, although frequently helpful.

The entries 830 of the data stream descriptor array each include the following fields:

- A state of data stream field 814 for indicating whether the stripe-mirror instance identified by an entry 830 is valid (containing correct data), invalid (e.g., containing out of date data) or does not exist.
- An index to next data stream field 815 for linking to the entry 830 for a spillover segment. The index 815 is null when there is no spillover segment.
- A starting offset 816 within the aggregated user file for indicating the starting location of the segment or segment portion represented by the entry 830. When the entry 830 represents a stripe-mirror instance (i.e., a segment of the user file) without a spillover segment, then the starting and ending offsets 816, 817 are determined solely on the strip size and the stripe number of the stripe represented by the entry 830. When a stripe-mirror instance has one or more spillover segments, the starting and ending offsets represent the starting and ending positions of each of the segments that forms the stripe-mirror instance. In an alternate embodiment, when a stripe-mirror has not spilled over, the field 816 is set to 0 and the field 817 is set to a special value (e.g., −1) to indicate a maximum value, which allows the system to avoid modifying the metadata every time data is written to the end of the file, and allows multiple openers of the file to work more efficiently together.
- An ending offset 817 within the aggregated user file for indicating the ending location of the segment represented by the entry 830.
- A server name field 818 for indicating the name (or some other identifier) of file server in the file array that stores the file segment represented by the entry 830.
- A global unique identifier field 819, containing a global unique identifier (GUID) for the data stream of a stripe-mirror instance corresponding to the entry 830. The GUID is used for determining the directory structure in which the file segment corresponding to the entry 830 is stored within a file server in the file array. The GUID, in ASCII representation, is also used as the file name of the data file(s) that stores the stripe-mirror instance.

The metafile described above can be extended according to the needs of the switched file system. For example, in an alternative embodiment, a deleted file path field is included in the metadata file for indicating the location of a user file that has been deleted, but not yet removed from the file server. Saving the state of the deleted file path enables the trash bin functionality (which allows-deleted files to be recovered). In addition, a security descriptor field may be included in the metafile for indicating the access permission of a user file. Other types of metadata that are not described above may also be extended according to the needs of the particular file aggregation and the particular file system. The layout, structure and usage of the metadata are entirely up to the particular implementation of the switched file system.

Aggregation with Metadata File

One objective of the present invention is to aggregate file system services provided by conventional file servers and present them to network clients as a single, large, very high performance network file system, the availability of which is many times higher than the availability of each individual file server.

To achieve this objective, the file switch preferably aggregates all operations of one or more network file protocols in such a way that clients connected to the switch will not be able to distinguish its operation from the operation of a single network file server. This requires the switch to aggregate all entities exposed by a typical network file protocol, in particular, the file system namespace, directories, and files. Clients connected to the file switch cannot observe metafiles and data files separately. Rather, clients interact with files, the files having both data (an array of bytes) and metadata (date, size, attributes, security descriptor, etc).

Rule-based Aggregation

The mechanisms that the file switch uses to achieve file system aggregation are preferably implemented such that they can be driven from a set of rules and policies defined on the file switch.

There are several attributes that make rule-based aggregation desirable. First, it allows a storage administrator to specify different ways of aggregation for different sets and/or types of files, thereby easily tuning the characteristics of the system to the intended use and the specific access patterns for different data. Second, it allows the file switch to operate with more deterministic timing by eliminating the need to consult external devices during normal operation.

In addition, rule-based operation allows multiple file switches to aggregate and be put in front of the same set of servers without the file switches having to interact with each other, except to synchronize the set of rules and policies whenever they are changed. This loose coupling between file switches that aggregate the same set of file servers makes it possible to scale access bandwidth by orders of magnitude, simply by adding file switches whenever needed.

Finally, since file switches are in an excellent position to track usage patterns internally, they can be configured to adjust the aggregation rules (discussed below) automatically in accordance with policies specified by the system administrator and observed usage patterns. As a result, the file switches can optimize in wide margins the distribution of files and data among the file servers to achieve smooth and adaptive behavior of the network storage system as a whole.

Namespace Aggregation

Namespace Rules

In order for a file aggregator to redirect a file operation to the appropriate NAS array, it uses a set of namespace rules (also called the namespace aggregation rules) to generate the corresponding NAS array file path. Using the given file path accessed by a client and matching namespace rule, the NAS array file path can be generated by using a path replacement process. Before using path replacement, the aggregator must select the matching namespace rule for the given file path. Once the rule is selected, the aggregator uses a path replacement process to generate the proper NAS array file path. The path replacement process replaces the client's file path with the NAS array file path.

Figure 9:
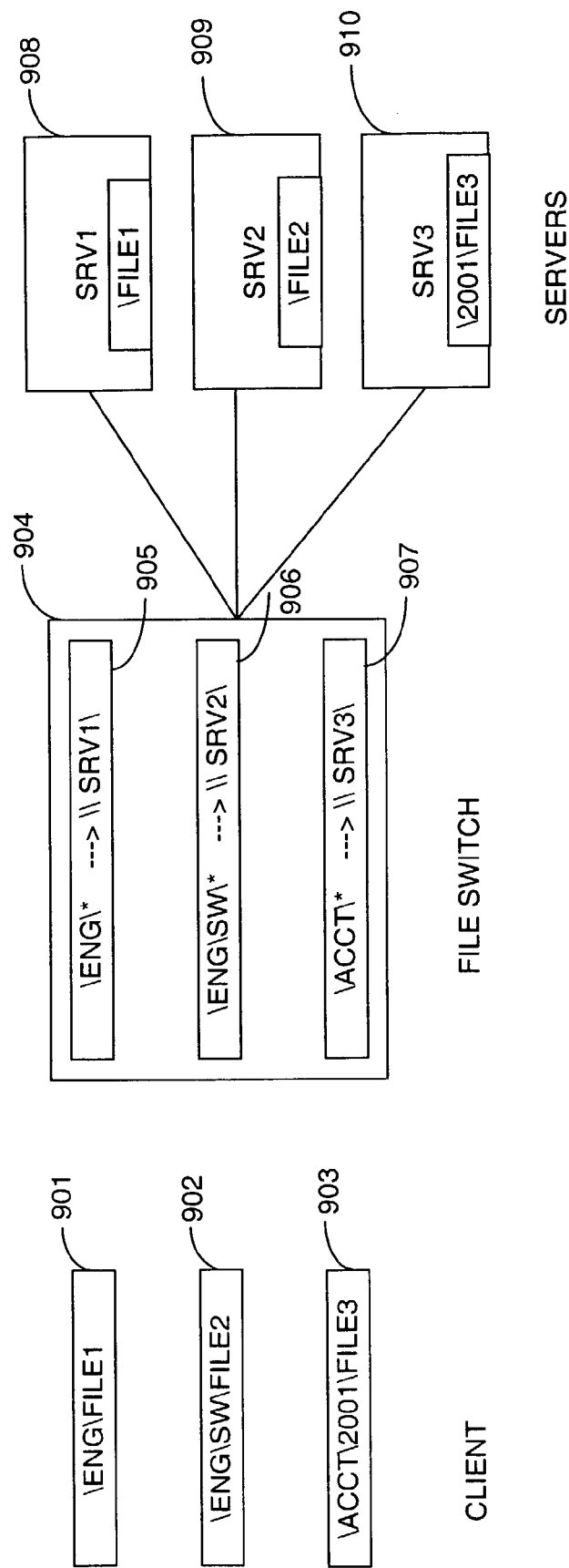
FIG. 9 illustrates namespace aggregation by a file switch.

FIG. 9 illustrates a rule-based namespace aggregation by the inventive file switch to aggregate multiple file servers under a common file system namespace. The rules for namespace aggregation are preferably defined as a table of path correspondences. The first column specifies the names visible to the clients, the second column specifies the name of the file server and, optionally a shared mount point on that server, in which the files actually reside. A file switch is shown connected to three file servers 908, 909 and 910. Loaded within (or otherwise accessible by) the file switch is a rule table 904 that specifies three rules 905, 906 and 907. The path names 901, 902 and 903 of incoming file requests, such as file open requests, initiated by a network client are compared to the name-mapping rules in the first column (preferably the comparison is done either by matching longest prefixes first, or by applying the rules in a predefined order of priority, so that overlapping pathnames can be specified). If a match is found, the matching portion of the file base path is replaced with the name from the second column and the request is forwarded to the new path for processing. Once a file is open on the target server, all further transactions related to this file are switched to that server.

For example, rule 905 specifies that the \ENG subtree of the common namespace is to be mapped to the server 908. File 901 will match this rule and therefore will be switched to the server 908 where it will arrive with a modified path. However, rule 906 specifies that a subtree within the \ENG subtree, namely \ENG\SW, is to be mapped to a different server, server 909. File 902 satisfies this rule and will therefore be switched to server 909, where it will arrive with a modified path. In addition, rule 907 specifies that the \ACCT subtree is to be mapped to server 910. This rule will drive the switching of file 903 even though this file resides in a subdirectory of the \ACCT subtree (because of the prefix match).

In addition to base path, other namespace mapping rules are contemplated. For example, a rule may specify that all files with a given extension (and, optionally also under a given subtree) are switched to a specific server. For example, a rule (*.mpeg→\\srv3\dir6) will cause all MPEG files to be sent to the subdirectory dir6 on server SRV3 910, no matter where in the logical namespace these files reside.

One skilled in the art will recognize that although the above example illustrates a method for mapping a particular file type to a particular directory of a specific server, this method can be generalized to include a "file system name" plus a "target directory". For example, the file system name may identify a NAS array 310 or a legacy server 313. This generalized method is used in the determination of NAS array as described below in FIG. 14.

It should be noted that the new path created by the application of the namespace aggregation rules is the file path for the metadata file corresponding to the specified user file. Access to data within the user file is redirected to other file servers, and to specific directories and data files within those directories, in accordance with the metadata in the metadata file. This will be explained in more detail below.

Note that by aggregating the namespace of multiple file servers into a common namespace, the file switch achieves a function similar to what available distributed file systems do without requiring any proprietary client-side software.

Name of a Data Stream

Each aggregated file consists of one or more data streams that contain the file's data. The number of data streams depends upon the number of stripes and mirrors for the specific data file, as well as the number of spillover fragments (as explained in more detail below). The name of a data stream is the ASCII code (i.e., the ASCII representation) of the global unique identifier (GUID) stored in the corresponding entry 830 of each data stream. This ensures the name for each data stream is unique because of the uniqueness of the GUID.

Figure 15:
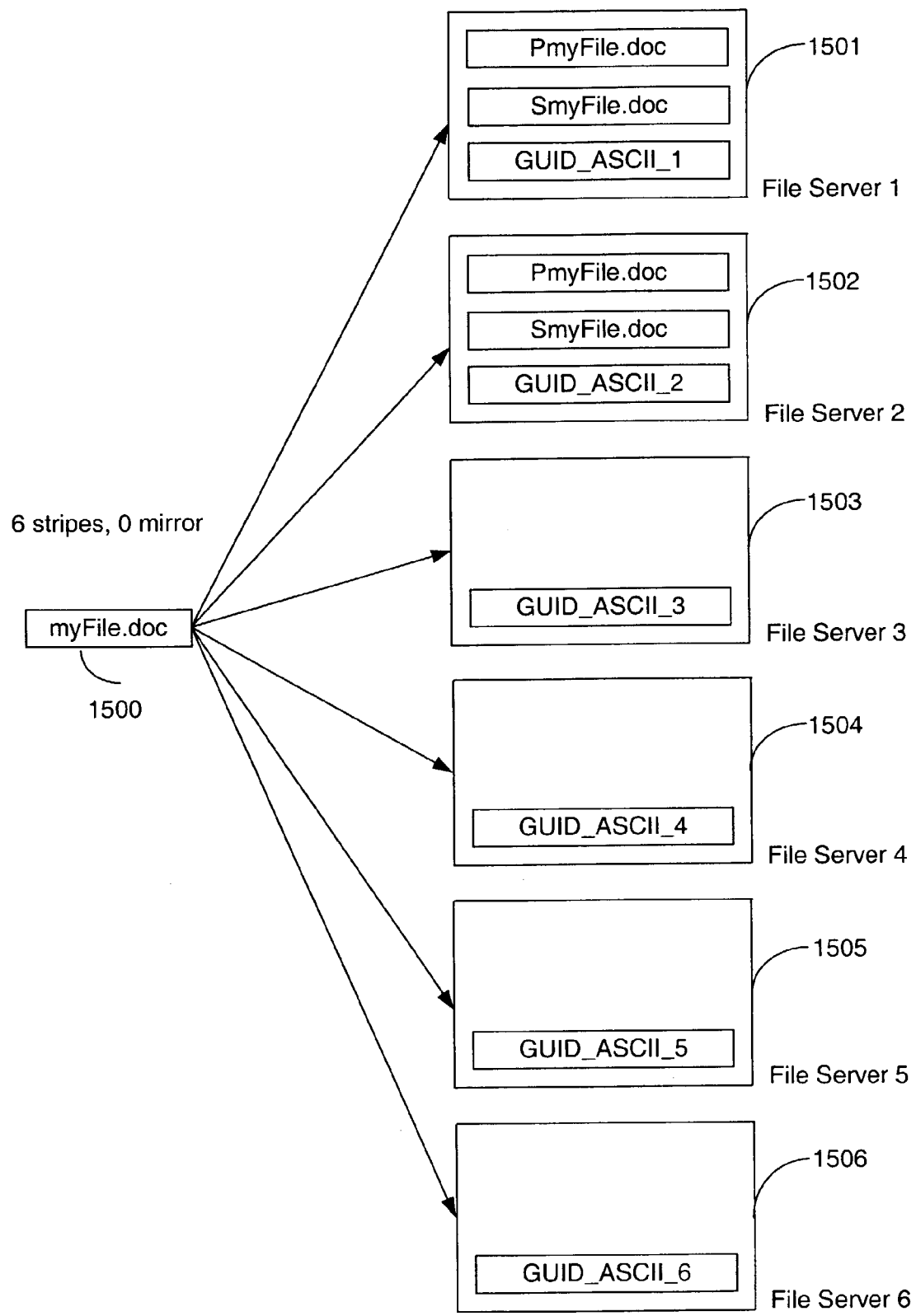
FIG. 15 illustrates the storage of metafile and user file.

FIG. 15 illustrates an example where the above naming methodology is observed. The data stream names for the document myFile.doc 1500 are formed using the ASCII code of the GUID of the corresponding data stream. For example, the name for the first data stream on file server 1501 is the ASCII code of the GUID for this entry (namely GUID_ASCI_1) and similarly, the names for the first data stream on file servers 1502 to 1506 are the ASCII codes of the GUID for the respective entries, namely GUID_ASCII_2, GUID_ASCII_3, GUID_ASCII_4, GUID_ASCII_5 and GUID_ASCII_6. Note that the mapping is configured and performed on the file switch. The clients don't need to know, and in fact have no way of knowing, the mapping and do not need to be reconfigured if the mapping is changed.

Data Aggregation Rules

The ability to aggregate data files among multiple servers and to do so safely in a concurrent environment enables the file switch to distribute the data of the aggregated file on multiple servers, thereby achieving both parallel operation and high availability. The same process can be viewed as the file switch aggregating the contents of the member files into a single file that it presents to its network clients.

Most network file protocols represent data file as contiguous arrays of bytes. This means that the techniques required to distribute the data for each individual file are not different from the techniques required to distribute the data for an array of hard disks. In accordance with the present invention, the methods for doing so, including striping, mirroring and other variations of RAID, are applied to distributing data of individual files across a set of file servers.

Figure 10:
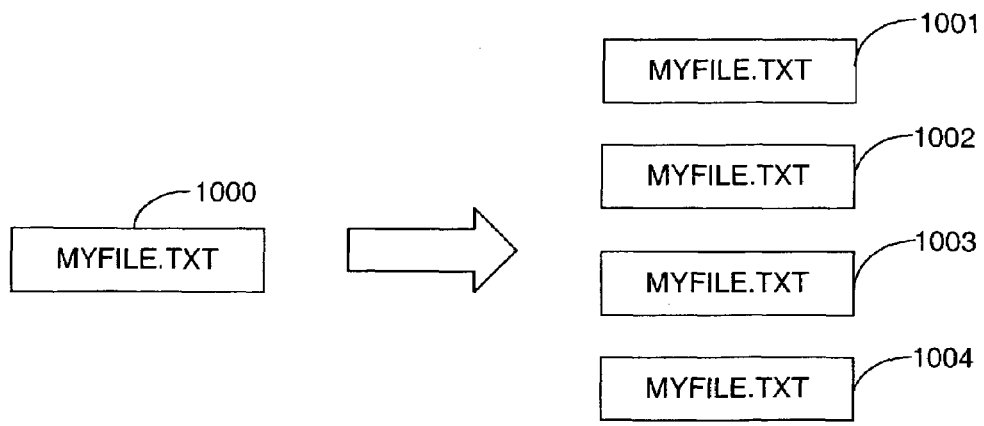
FIG. 10 illustrates data aggregation through mirroring.
Figure 11:
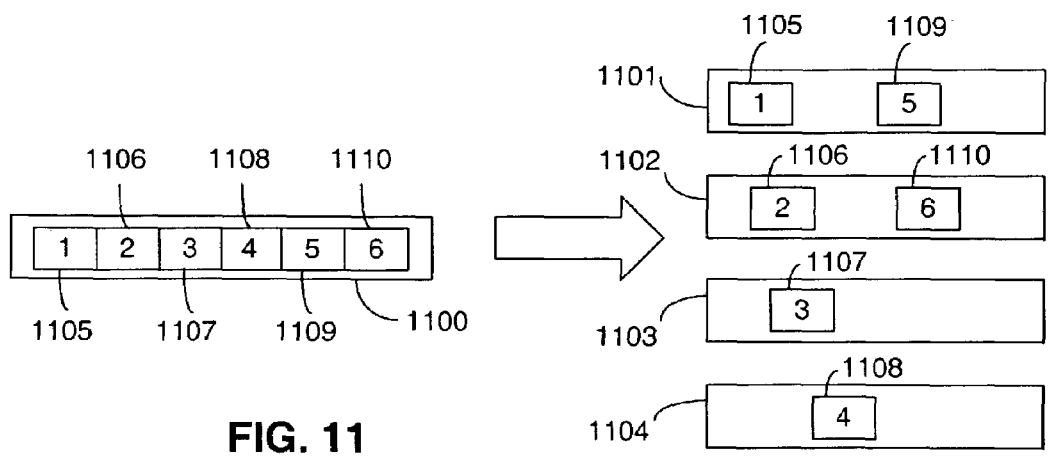
FIG. 11 illustrates data aggregation through striping.
Figure 12:
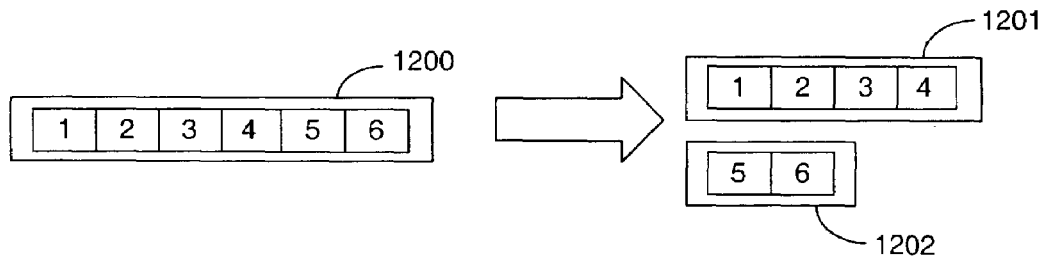
FIG. 12 illustrates data aggregation through spillover.

FIGS. 10-12, described hereinafter, respectively illustrate mirroring, striping, and spillover as implemented by the present invention. As these mechanisms exist conventionally, a representation of the clients and servers is not believed necessary. It is noted, however, that these mechanisms are performed by the present invention based on switching file protocol transactions that take place in the file switch (represented by the arrow in each of these figures), rather than API functions that take place on a local machine, typically the client.

Mirroring

FIG. 10 illustrates data aggregation through mirroring in a switched file system. In this example, the file switch (not shown) aggregates member files 1001, 1002, 1003 and 1004, all preferably residing on different file servers, into a single aggregated file 1000, presented to the clients. The member files 1001 through 1004 contain identical data, which the switch presents as contents of the aggregated file 1000.

When the client initiates a file open transaction, the switch aggregates that transaction (as shown in FIG. 10) and opens either one or all of the member files 1001 through 1004, depending on the type of operation that is to be performed subsequent to the file open. When the client initiates a file open and a file read transaction, the file switch selects, preferably randomly, one of the file servers on which the member files reside and switches the open and read transactions to it. That server executes the open and read transactions and returns the response to the switch; the switch forwards the response to the client, thus completing the read transaction requested by the client. With this mechanism, if multiple clients try to read the same file 1000, the file switch will direct their transactions to different member servers at random (or in accordance with predefined criteria, such as load balancing criteria). The switch thus balances the load among these file servers. In addition, the clients can experience up to four times increase in performance compared to a situation where the file 1000 is stored on a single server.

When a client initiates a file write transaction, the switch aggregates the transaction by replicating the user data into all of the member transactions. As a result, all member files 1001 through 1004 are updated synchronously with the same data. Since all member transactions execute in parallel, this does not significantly degrade the performance of write transaction on the aggregated file compared to write transactions on a file stored on a single server.

Finally, when a client initiates a close transaction, the switch aggregates it in a manner similar to the open transaction and closes all member files.

One other significant advantage of file mirroring is that the above transactions can be completed successfully even if one or more of the member file servers become unavailable. Open, write and close transactions are switched to all available servers; read transactions are switched to any one of the available servers. This way, as long as at least one of the member files is online, the file system as a whole and the aggregated file 1000 in particular remain available to all clients.

Striping

FIG. 11 illustrates data aggregation in a switched file system through striping by a file switch. In this example, a user file 1100 contains 6 file strips 1105 through 1110. The file switch (not shown) distributes the user file into 4 stripes 1101 through 1104, all preferably residing on different file servers, according to a predetermined number of stripes 805. The stripes 1101 through 1104 in this case contain different, non-overlapping strips 1105 through 1110, which the file switch presents as a contiguous aggregated user file 1100.

When a file switch receives a file open transaction from a client, it aggregates that transaction (as shown in FIG. 11) and opens the corresponding metadata file. From the metadata file, the file switch determines the number of stripes and the file server locations of the data files containing the stripes. By placing an appropriate lock on the metadata file, the file switch can furthermore prevent other client requests from interfering with the operation of the current client request.

When the client initiates a file read transaction, the switch aggregates this transaction by executing the following steps. First, determining based on the strip size and the requested starting offset and the requested transaction size, which of the member servers will be involved in the transaction, and at what starting offset and what amount of data each of them must read. The switch then issues the member transactions to the selected servers and aggregates the results by ensuring that data arrives at the client in the right reconstructed order. The client receives the aggregated header for the response, followed by all of the data requested, in the correct order.

One skilled in the art will recognize that the write transaction in this case is executed in a manner similar to the read transaction described above, except that the data is distributed as illustrated in FIG. 11, instead of being assembled as was the case with the read transaction. Finally, when a client initiates a close transaction, the switch aggregates it in a manner similar to the open transaction and closes the corresponding metadata file, as well as any of the stripe data files that have been opened.

In the case of data aggregation through striping, both read and write transactions are aggregated by submitting corresponding read and write transactions for smaller amounts of data to multiple member servers in parallel. This results in a respective increase of performance, which the file switch can deliver to each individual client, as well as to an excellent load balancing in the case of multiple clients accessing the same file. In addition, as multiple studies have shown, striping tends to resolve the problem of hotspotting.

Spillover

FIG. 12 illustrates data aggregation through spillover. The spillover mechanism is preferably used to aggregate storage capacity, preferably in conjunction with one or more of the other mechanisms described herein. The spillover is especially useful in cases where one or more of the member servers for an aggregated file unexpectedly run out of disk space while the file is open. The figure illustrates an aggregated file 1200, comprising two member files 1201 and 1202, preferably residing on different file servers. As seen from the figure, sections 1, 2, 3, and 4 of the aggregated file 1200 reside in member file 1201, while the remaining sections 5 and 6 reside in member file 1202.

Spillover happens when the file switch, in the process of writing data into a file unexpectedly discovers that the target file server is about to run or has run out of disk space. In such case, rather than failing the write transaction, the switch may elect to open a new member file on another server and continue writing into it. The contents of the two files are concatenated to present a common contiguous byte array in an obvious way. One skilled in the art will recognize that the spillover mechanism can be applied to the second file as well, creating an arbitrarily long chain of member files, so that all disk capacity in the system can be fully utilized if needed.

The file switch switches file transactions to spilled-over files as follows. For read and write transactions, the file switch looks at the starting offset and the length of the payload to be read/written and switches the transactions as follows:

(a) if the payload fits completely within the first member file (e.g., segments 1 and 2 from file 1200), the file switch switches the transaction to the first server.

(b) if the payload fits completely within one of the spillover (second and further) member files (e.g., segment 5 from file 1200, which is stored in the beginning of the member file 1202), the file switch switches the transaction to the server on which that member file resides. The switch also modifies the parameters of the transaction by subtracting from the starting offset for the transaction the starting offset of the member file within the aggregated file. In our example, segment 5 is at offset 0 in file 1202, so four segments should be subtracted from the request, resulting in a request to read the first segment from file 1202.

(c) if the payload spans multiple member files (e.g., segments 4 and 5 from file 1200), the file switch replicates the transaction to all servers on which portions of the request reside, modifying the starting offset and length of each transaction. Upon receiving the responses, the file switch reconstructs the data in the correct order (similar to the way this is done for striping) and sends it back to the client.

In order for the spillover mechanism to function, the metadata file stores the range of data file and the location of the member files in the file system (i.e., the server on which each member file resides and the file name and file path of the member file). This same information is obtained from the metadata file during read and write or update operations.

According to the present invention, the file switch aggregates data file on a file-per-file basis. In this way, different files can be aggregated in different ways using different combinations of striping, mirroring and other data aggregation techniques to achieve optimal balance between performance, storage utilization and the desired level of data availability.

It is well known that the effectiveness of striping, mirroring and other data aggregation techniques when applied to block devices, such as in RAID or parallel file systems, can be greatly diminished by the fact that no single solution can fit all types of files and access patterns. By way of example, streaming video can be striped very effectively over a large number of devices, since streaming data is usually being read in large segments. On the opposite side of the spectrum, HTML files are typically only a few kilobytes large and not a good target for striping. Therefore, the present invention utilizes aggregation rules (also called the data aggregation rules) to configure the file switch with different data aggregation parameters for different types and/or sets of files.

Syntax of Data Aggregation Rules

Figure 13:
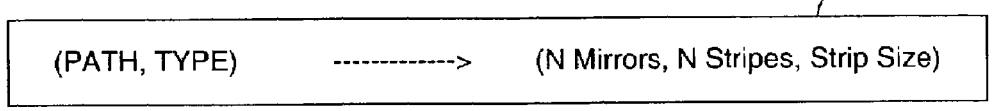
FIG. 13 illustrates the syntax of data aggregation rules.
Figure 13:
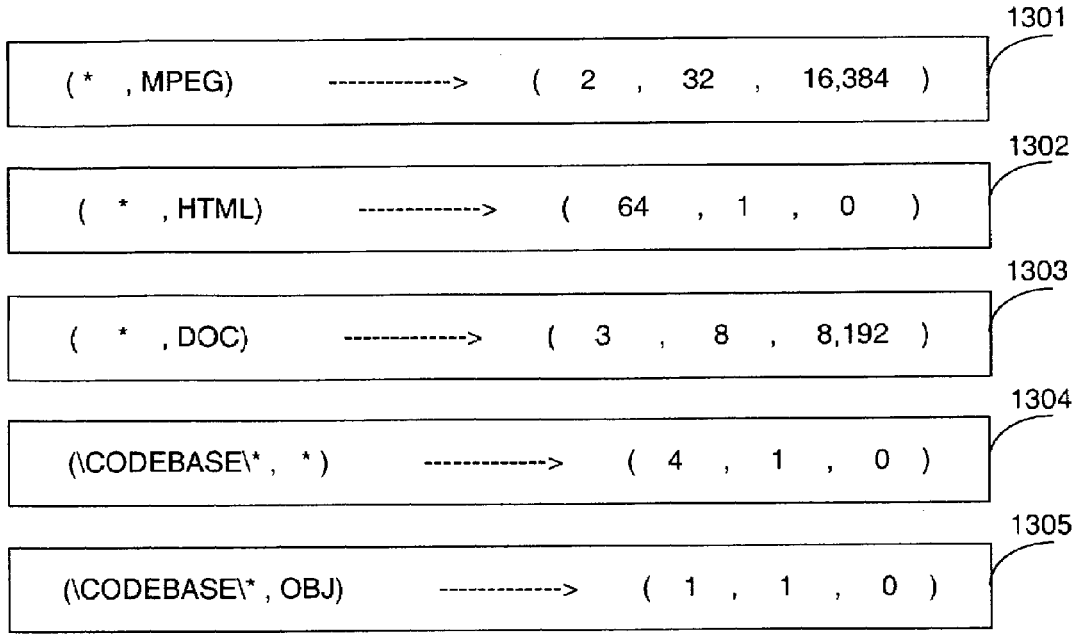

FIG. 13 illustrates the syntax of data aggregation rules and provides examples of such rules. The preferred syntax 1300 defines a set of aggregation parameters, namely, number of mirrors, number of stripes (i.e., the preferred number of file servers across which the stripes are stored) and strip size, which are selected for a given set of files based on each file's path (location in the aggregated namespace) and type (recognized by the file extension/suffix).

Rule 1301 shows typical parameters for MPEG files located anywhere in the file system. The rule is selected for any file path, but only for files whose filename extension is MPEG, and it defines mirroring by 2, striping by 32 and a strip size of 16 KB. With this rule, any MPEG file will be mirrored once (two copies of the data will exist in the system) and striped across 32 file servers, with a file strip size of 16 kilobytes.

Rule 1302 shows typical parameters for HTML files located anywhere in the file system. The rule is selected for any file path and only for files whose filename extension is HTML, and it defines mirroring by 64 and no striping. With this rule, any HTML file will be mirrored on 64 file servers, which allows load balancing when read by large number of clients simultaneously (which is the typical access pattern for HTML files on a HTTP server).

Rule 1303 shows typical parameters for Microsoft Word document files located anywhere in the file system. The rule is selected for any file path and only for files whose filename extension is DOC, and it defines mirroring by 3, striping by 8 and a strip size of 8 KB. With this rule, any document file will be mirrored twice (three copies of the data will exist in the system for higher availability) and striped across 8 file servers, with a file strip size of 8 kilobytes. Since most such documents typically have file sizes between 32 KB and 100 KB, this rule provides moderate (e.g., 4×) improvement in performance for each individual client, and lowers the probability of hotspotting significantly since each file is spread across a total of 24 file servers (if that many file servers are available) without wasting too much storage space.

Rule 1304 shows a desired set of aggregation parameters for software source code files that contain valuable intellectual property while being each small in size. The rule applies to any file in the \CODEBASE subtree of the aggregated namespace, and defines mirroring by 4 and no striping. This provides moderate performance increase (e.g., 4×) during program compilation and build, which is the usage pattern where hundreds of files are being read in a batch process and provides excellent protection from data loss due to server failure.

Finally, rule 1305 is a modification of rule 1304 that optimizes the use of storage space in the \CODEBASE subtree. This rule recognizes the fact that source code directories often contain intermediate object code files (with file extension of OBJ) which are a byproduct of the compilation process and can easily be reconstructed if lost. The rule defines an exception from rule 1304, namely that any file in the \CODEBASE subtree that has a filename extension of OBJ will be neither mirrored nor striped. When used together, rules 1304 and 1305 can easily provide optimal storage characteristics for a software engineering department.

In another embodiment, the data aggregation rules contain additional parameters. In particular, the syntax of the data aggregation rules in this embodiment is:

(Path, Type)→(N Mirrors, N Stripes, Strip Size, operational parameters, caching parameters)

The operational parameters may include, for example, a lock redundancy parameter that specifies the number of file servers on which file lock are to be replicated. The caching parameters may include a "read ahead enabled" parameter, which indicates whether read ahead caching (i.e., retrieving and caching data from a file before it has been requested by an application running on the client computer) is enabled for the files to which the aggregation rule applies. The caching parameters may include a "write behind/write through" parameter, which indicates (for the files to which the rule is applicable) whether new and updated data is lazily written back to the file servers, or is written back immediately. The caching parameters may also include caching parameters that specify one or more of a maximum cache size, a maximum caching time, a maximum amount of dirty data that can be cached without writeback to the file server (if write behind is enabled), and so on.

Summary of Data Aggregation Rules

This section has described the various mechanisms, algorithms and other elements of the present invention used to achieve the desired behavior of the file switch, namely the ability to aggregate multiple independent file servers into a single, highly scalable switched file system.

One skilled in the art will easily recognize that the mechanisms described in this section can be beneficially applied simultaneously to the same file. For example, mirroring and striping can be combined to increase both performance and availability of a single file; further, spillover can be added to the same file in case some of the file servers run out of storage space. Moreover, one skilled in the art will recognize that other data aggregation techniques, for example RAID4 and RAID5, can be implemented in a file switch in addition to or instead of the mechanisms described herein.

Directory Aggregation

Namespace aggregation as described above is an easy way to distribute files among different servers, and also to add a new server to an existing system. However, this technique alone may not be sufficient to aggregate seamlessly the storage capacity of multiple file servers. For example, with namespace aggregation alone it may not be possible to tell how much free disk-space is available on the aggregated file system.

Since different directories are mapped to different servers, a file that cannot be stored under the \ENG subtree for lack of room may be successfully stored under the \ENG\SW subtree, which resides on a different server. Thus, even when the system as a whole has plenty of available storage space, particular file operations in particular places in the namespace may not be able to execute successfully without extensive human intervention.

Directory aggregation resolves the above issues by making it possible to distribute files that reside in the same aggregated directory among different servers. This ensures that the files from all directories of the combined namespace can share all of the available free disk space.

Directory Structure of Metadata File

In order to determine the directory structure for storing the metafile of a user file in the group of file servers, the file switch needs to construct the following:

[NAS array][file server][directory path][filename]

Figure 14:
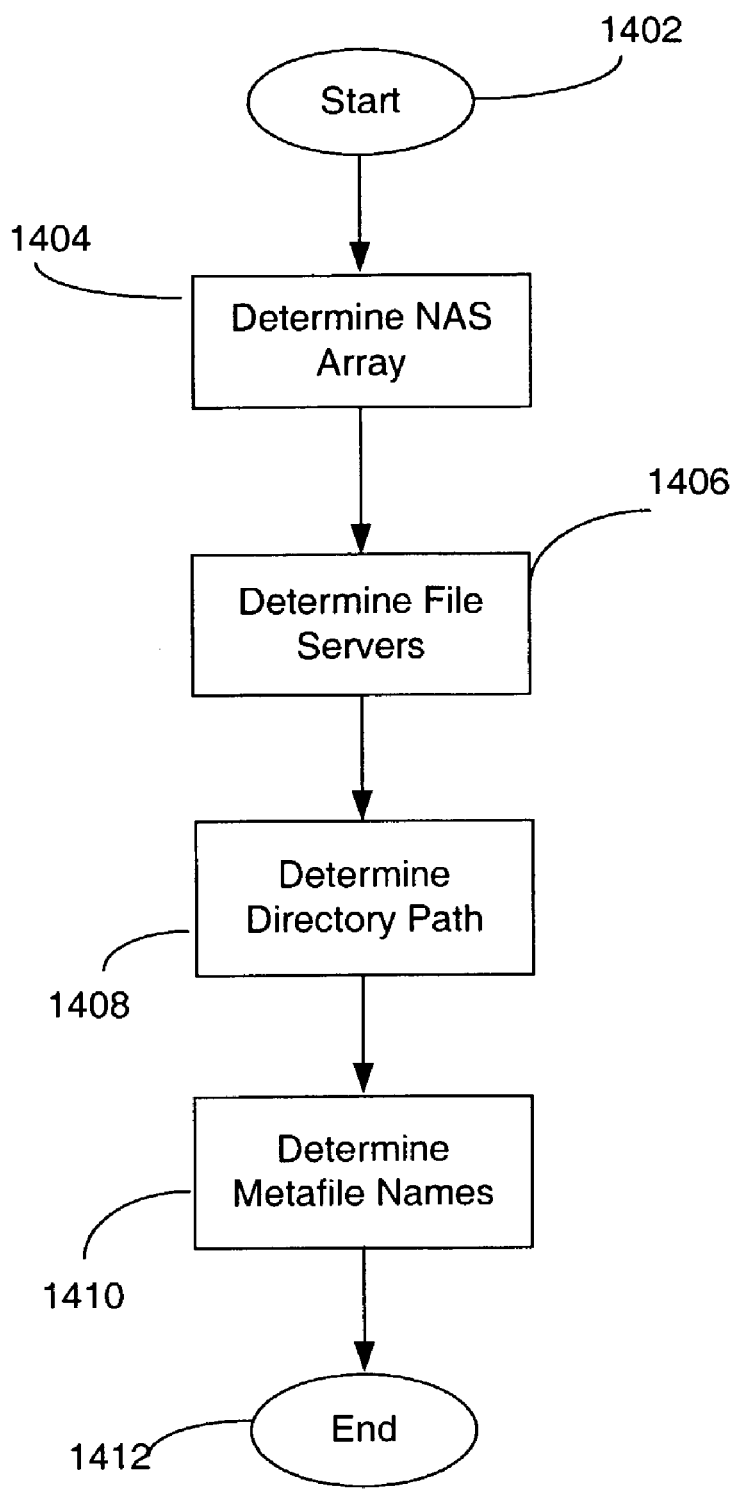
FIG. 14 illustrates a method for creating directory structure for a metafile.

FIG. 14 illustrates a method for constructing the directory structure of a metafile. The method consists of the following key steps:

1. Determine NAS array 1404: The aggregator needs to first determine which NAS array should be used. This determination is based on the namespace rules. The file path being accessed is mapped to a specific NAS array and directory path in accordance with the namespace rules, as described above.

2. Determine File Servers 1406: The file server (more specifically the set of file servers) that contains the metadata file is determined by using a hash function (e.g., by applying it to the user file name) to identify a first file server. The set of additional file servers for storing redundant copies of the metadata file is determined simply by selecting the "next" N−1 file servers in the NAS array, when a total of N file servers are needed. If the number of servers in the array is reached, the counting wraps around to the first server. The metadata redundancy N is independent of the number of stripes and number of mirrors. N can be set as a constant on the NAS array, or be set per subtree in the namespace aggregation rules (e.g., by adding a metadata_redundancy field to each aggregation rule.

3. Determine Directory Path 1408: The directory path for a metafile is calculated using the namespace aggregation rules and the file path (of the associated user file) provided with the request. Parts of the file path may need to be replaced depending on the namespace aggregation rules. The constructed directory path is replicated according to the number of redundant metafiles, which in some embodiments is defined by the namespace aggregation rules.

4. Determine Metafile Names 1410: The file names of the primary and secondary metafile stored on the file server are the same as the user file name, with a prefix of "P" for the primary metafile and a prefix of "S" for the secondary metafile respectively.

The NAS array in which the metafile is to be stored is identified by the namespace aggregation rules. There may be multiple NAS arrays in a given file system. Each NAS array is responsible for specific directories and files as described by the rules. Directory aggregation applies to a specific NAS array; not all NAS arrays as a whole. The full set of file servers that makes up the NAS array must be known to the file switch (e.g., a background service may keep track of this information). Each file server in the array is identified by its computer name on the network and a share (server's file system mount point) in which files should be stored. In order to access a file stored on a given server, the pair <server, share> is needed. Since every server preferably participates with a single share in the NAS array, the pair <NAS array, server> is sufficient to identify <server, share>. The <server, share> pair for each server that participates in the NAS array is listed in the configuration of the NAS array.

A hash function is used to determine the first file server in the NAS array that contains a specific metafile. The hash function is applied to the name of the file (preferably not including the file path). The value of the hash is used to determine which file server contains the first occurrence of the metafile. The hash function is configured to produce a value in a range of numbers equal to the number of file servers in the NAS array, where each value in this range represents one of the file servers in the array. This mechanism evenly distributes metafiles across the NAS array. The hash function, used in conjunction with the namespace aggregation rules, determines the exact subset of file servers containing the specific metafile.

To one skilled in the art, it will be apparent that it is possible to set the metadata redundancy N to 1, in which case the directory aggregation achieves only distribution without redundancy. It is also possible to set the hash function to always return the value associated with the first server in the NAS array, thereby achieving only metadata redundancy. However, it is highly beneficial to use both redundancy and distribution of the metafile, to improve data security and availability.

The components of the array configuration are used to aggregate files and directories across the NAS array. Below is a simple example:
  Namespace rule: \ENG\DOCS\*.*>NAS3\DIR4\DATA
  Client requested file: \ENG\DOCS\JOHN\myFile.doc
  Value of file hash: second server in NAS array
  Configuration entry for the second server in the NAS array
    NAS3: server SRV2, share SH1

Using the above information, the client file path "\ENG\DOCS\myFile.doc" is translated into "\\SRV2\SH1\DIR4\DATA\JOHN\myFile.doc" on the third NAS array, NAS3 ("SRV2" is the name of the second server in the NAS array NAS3). The directory "\DIR4\DATA\JOHN", if it doesn't already exist, is created on all members of the NAS array, not just the members containing the metafile for file "myFile.doc", to support directory enumeration and metafile redundancy.

This example pertains to both opening and creating files. When accessing the file on the NAS array, the metadata files involved are:
  NAS3\DIR4\DATA\JOHN\PmyFile.doc—primary metadata file
  NAS3\DIR4\DATA\JOHN\SmyFile.doc—secondary metadata file FIG. 15 illustrates a graphical representation of the storage of the user file and metadata files for an aggregated user file named "myFile.doc". There are six file servers 1501 to 1506 in the file array. The user file is divided into six stripes. In this example, no mirrors of the user file are shown.

The primary and secondary metadata files (PmyFile.doc and SmyFile.doc) are stored in the first file server 1501 of the array. The metadata files are replicated one time in file server 1502 to provide redundancy.

Directory Structure of a Data File

The data files are preferably stored on servers of the same NAS array as the metadata files but in a different directory sub-tree, separate from the metafiles. A "file array" is the subset of file servers in a single NAS array that stores the contents of a specific file. This section describes how to create the directory structure of data files within a file array.

User File Data Distribution Mechanism

Figure 16:
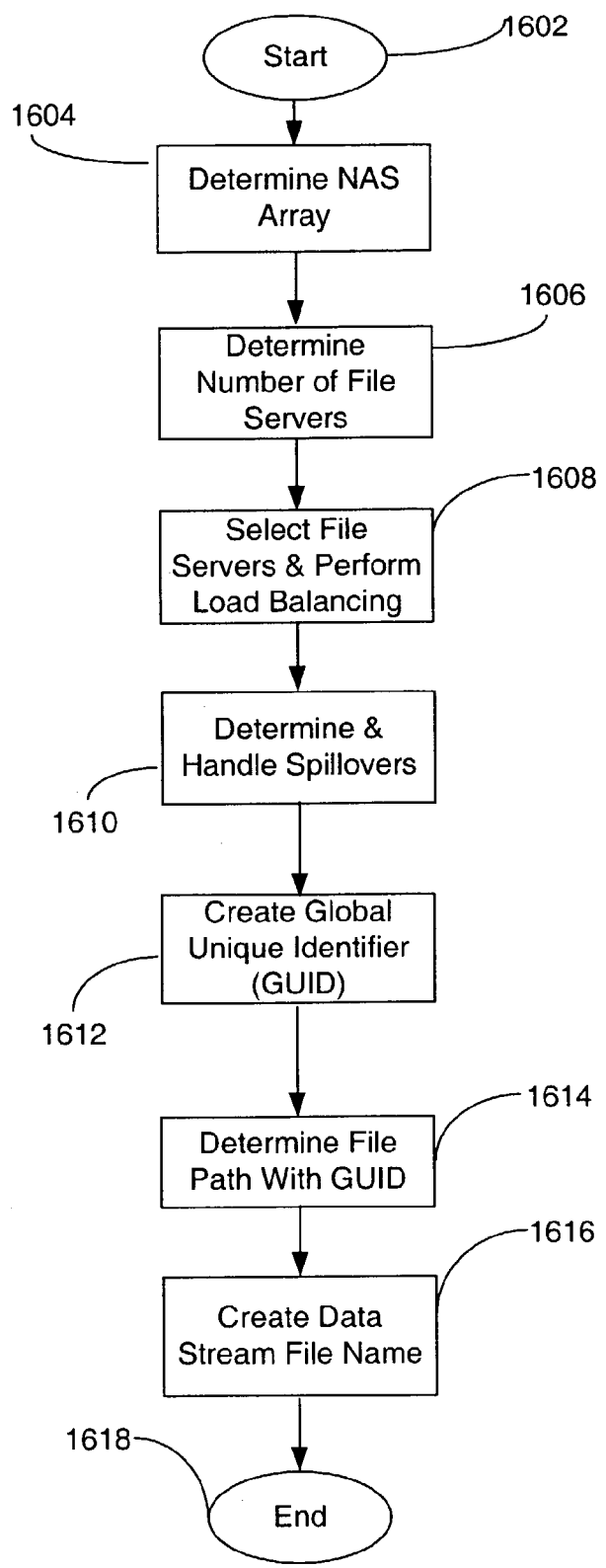
FIG. 16 illustrates a method for creating directory structure for a data stream file.

FIG. 16 illustrates a preferred embodiment for distributing the data of user files in a NAS array. The method consists of the following steps:
  1. Determine NAS array 1604;
  2. Determine the number of file servers 1606;
  3. Select File Servers and Perform Load Balancing 1608;
  4. Determine and Handle Spillovers 1610;
  5. Create Global Unique Identifiers (GUID) 1612;
  6. Determine File Path with GUID 1614;
  7. Create Data Stream Filename 1616;

The method starts in block 1602 and moves to block 1604 where mapping of a user file to the proper NAS array is performed. The method uses the namespace rules described above. This method is the same as for determining the NAS array for storing the metafile.

In block 1606, the number of file servers to be used to store the data of the user file is determined. The method applies the aggregation rules, which specify the number of stripes and the number of mirrors. In one approach, the number of servers is computed by multiplying the number of stripes by the number of mirrors. However, in the event that there is an insufficient number of file servers to store each mirrored stripe of the user file, multiple stripes (i.e., stripe instances) can be stored in a single file server.

In block 1608, the number of file servers computed in block 1606 is selected from the NAS array. There are numerous selection methods that can be applied to select the file servers for achieving the goal of load balancing in storing the user file. In one selection method, called the round robin method, each file server within the NAS array is selected sequentially for storing a mirror-stripe file for the user file. When multiple copies of each stripe are to be stored, each instance or copy of the stripe must be stored on a different file server. In other selection method, based on the available disk space on the file servers, the file server with the largest available disk space is selected first, and then the file server with the next largest available disk space is selected second. The process continues until all the stripes of the user file are stored. Yet another method for selecting the file servers can be based on the historical load statistics of a particular file server. Yet another method for selecting the file servers can be based on the response time of the file servers.

In block 1610, the method determines and handles any spillover fragments of the stripes that form the user file. While aggregating files to multiple devices, over time some of the device's storage capacity may become exhausted. As a result, the file aggregation may fail and cause disruptions in the systems network. To avoid such failures, file aggregation includes spillover. This is a mechanism that allows the aggregator to use a different storage device (i.e., file server) when one or more of the devices run out of storage space. Each file server's storage capacity must be monitored using a specific threshold. The threshold varies depending on the storage capacity of the file server. The threshold is needed so a portion of the storage is preferably reserved for file spillover information and metafiles. Note that when the user file is first created, the determination step will show that no spillover fragment exists, and hence the handling spillover step will not be performed.

When the file aggregator detects that a particular file server has reached its threshold (i.e., the file server's disks are full), a different file server is designated for all subsequent data belonging to the accessed data file. One approach to storing the spillover fragments of a user file is to store the spillover data file in the subsequent file server, in a predefined sequence of the file servers with the NAS array. The sequence of the file servers wraps around when the last file server is reached. Whenever possible, the aggregator preferably avoids storing a spillover fragment of a given stripe's mirror on the same server where another mirror (or fragment thereof) of the same stripe is already stored; this allows the aggregator to preserve data redundancy.

By allowing directories and their contents to spillover on the servers, the capacity of the entire NAS array can be used for file storage.

For a given file, there is either spillover or no spillover, as indicated by the spillover flag 809 in the metafile for the user file. If there is no spillover, the flag indicates that there is no spillover and that each stripe-mirror instance is represented by a single data stream. If there is spillover, the flag indicates so, and the spillover contents of a stripe are stored on another server using a new GUID (see GUIDs below); the determination of the file path of the new data stream is described below, with reference to FIG. 17. As long as at least one stripe-mirror instance has been spilled over, the spillover flag is set (in some embodiments, however, the spillover flag may be eliminated). The primary metadata file is updated to include pointers to the full set of spillover fragments. In addition, all redundant metafiles must be updated to include entries 830 for each spillover fragment.

To indicate that an aggregated file has spillover, its primary metafile is updated with the following information:

Spillover flag 809 is set, to indicate that the file has at least one spillover.

Total number of data streams, which is stored in field 810 of the metadata file, as shown in FIG. 8. This parameter indicates the total number of data streams for the aggregated file, including the first fragments of each stripe-mirror instance and any spillover fragments of any stripe-mirror instance.

List of all data streams which include (<stripe #>, <mirror #>, <start offset>, <end offset>, <logical device name>). More particularly, each data stream is represented by an entry 830 of the data stream descriptor 813 in the metadata file, as shown in FIG. 8. The entry 830 for the initial fragment of a stripe-mirror instance is identified in the stripe-mirror map 811, more specifically by a data stream index value stored in the matrix 812 by stripe number and mirror number. Once the first data stream has been spilled over, the first spillover fragment is linked to by the "index to next data stream" 815, and if there are any additional spillover fragments for the same stripe-mirror instance, these are found by following the links in the index field 815 of successive entries 830.

The spillover information in the metafile is preferably stored in the order that the spillovers occur. A full stripe of a file is a concatenation of all of the stripe fragments, including an initial fragment file and zero of more spillover fragment files, in the order that they are listed in the metafile. Each fragment file is stored on one of the NAS devices, as indicated by the server name 818 in the entry 830 representing the fragment file. The file name for the fragment is indicated by the GUID field 819 in the entry 830 for that fragment file.

When accessing a file contains spillover data, the file switch checks if the needed data is on the regular file server for a particular stripe, or a spillover file server, or both. The file's metadata is used to determine which file servers contain the spillover data. There may be any number of spillover file servers in the NAS array.

Figure 17:
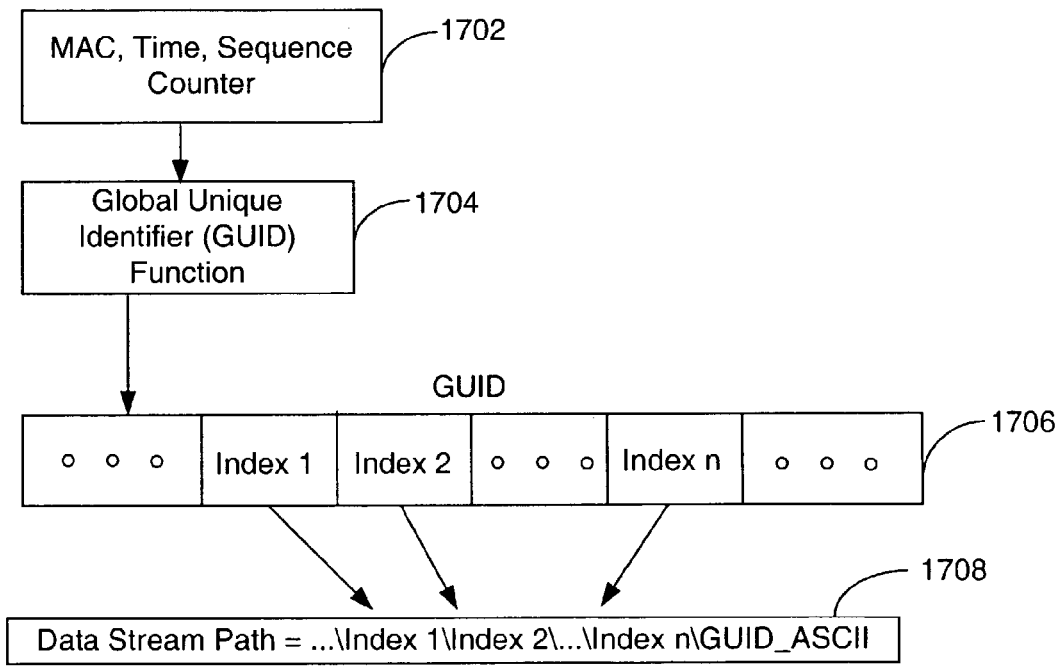
FIG. 17 illustrates a method for creating directory path with global unique identifier.

In block 1612, the global unique identifier (GUID), a value that is 16 bytes long in a preferred embodiment, is created for each distinct fragment (data stream file) of the user file. The length of the GUID may be different in other implementations. The GUID for each data stream file is stored in a descriptor field 819 of the corresponding entry 830 in the metadata file. FIG. 17 illustrates a method for creating the GUID. The inputs 1702 for creating the GUID consist of a unique MAC address of a network interface, a time stamp and a sequence counter number. In other embodiments, other information or additional information (e.g., the filename) could be used as input to the GUID function 1704. The MAC is the unique network address of one of the file switch's network interfaces (and uniquely identifies the file switch among all other file switches); the time stamp indicates the time of the user file creation and the sequence counter counts the number of files created by the file switch. The GUID function 1704 combines the inputs to create a unique bit stream that is written into the GUID 1706. The GUID is preferably unique among all the GUIDs generated by any file switch, on any NAS array, on any server.

In block 1614, the file path, within a file server, for each data file (i.e., each stripe-mirror instance file and spillover file) is determined using the GUID for that data file. FIG. 17 illustrates one approach to implement this step. In block 1706, the GUID is divided into multiple bitfield segments, herein called indexes, namely index 1, index 2 and up to index n. The directory path to the data stream file is formed by concatenating a subset of the indices to form a file path, with each utilized index comprising a directory name in the file path. For example, the GUID of a data file may contain indices A, B, C, D and E, as well as other portions not used in the file path. In one embodiment, each index from the GUID comprises one or two ASCII characters. The file path for the data file is then \A\B\C\D\E\filename. As shown in 1708, each index from the GUID forms the name of a directory in the file path of the data stream. By forming the file path of each of the data streams in this way, the data streams are automatically and randomly (or pseudo-randomly) spread over a large number of distinct directories, thereby preventing large numbers of data streams from being stored in a single directory. Having large numbers of data streams in the same directory could have an adverse impact on system performance, and this file path forming mechanism avoids that potential problem.

In block 1616, the file names of all the data streams of each stripe-mirror instance of the user file in the file array are determined. In normal operations, each aggregated file consists of one or more stripe-mirror instances. The number of stripe-mirror instances depends on the number of stripes and mirrors for the specific user file. The number of data streams for each stripe-mirror instance depends on the number of spillovers for the specific stripe-mirror instance. The data streams are named using the ASCII code of the GUID associated with each corresponding data stream, with two ASCII characters for each byte of the GUID. This was described above in detail with reference to FIG. 15. Other methods can be used to convert the GUID into valid filenames using characters allowed by the file servers; one such method is to convert the number in a base-62 system, where the digits are 0-9, followed by all uppercase letters of the English alphabet, followed by all lowercase letters (10+26+26).

Note that the mapping of the data files (that together form the data for an aggregated file) to file servers, and to specific directories on the file servers is performed by the file switch. The clients don't need to know, and in fact have no way of knowing, the mapping and do not need to be reconfigured if the mapping is changed.

After the step of determining data stream file names in block 1616, the method ends at block 1618.

It should be pointed out that in other embodiments, the steps of FIG. 16 may be performed in a different order. Further, many of these steps may be performed or re-executed each time the user file increases in size sufficiently to require that addition of a new data stream for the user file.

EXAMPLE

The following example illustrates how the directory structure for the user file is determined. This example assumes the following:

One file aggregator (i.e., file switch) and 2 different NAS arrays NAS1 and NAS2. Each NAS array contains 8 file servers. The names of the file servers in NAS1 are NAS1_SRV1, NAS1_SRV2, NAS1_SRV3, etc. The names of the file servers in NAS2 are NAS2_SRV1, NAS2_SRV2, NAS2_SRV3, etc.

The following namespace rules are defined:

| | |
|---|---|
| Rule 1: \ZF\ENG\DOC\*.* | → NAS1\DOC_DIR |
| Rule 2: \ZF\ENG\DESIGN\*.* | → NAS2\DESIGN_DIR |
| Rule 3: \ZF\ENG\TRAINING\*.MPG | → NAS2\MOVIES |

The following aggregation rules are defined for NAS1:

| | |
|---|---|
| Rule 1: \DOC_DIR\*.* | → { stripe (4, 8192), mirror (1) } |

The following aggregation rules are defined for NAS2:

| | |
|---|---|
| Rule 1: \DESIGN_DIR\*.* | → { stripe (4, 8192), mirror (1) } |
| Rule 2: \MOVIES\*.* | → { stripe (8, 16384), mirror (0) } |

Assuming the client requests to access the file "\ZF\ENG\DOC\GEARS.DOC":

According to namespace rule 1, this path is mapped to the first NAS array NAS1 to the directory "DOC_DIR". The application of this namespace rule identifies the location where the metadata file for the user file is located.

According to the aggregation rule 1 for NAS1, "DOC_DIR" is striped over 4 servers, each stripe is 8K and each stripe is mirrored 1 time on the other 4 servers in the NAS array.

Let HashFunction(GEARS.DOC)=0. In this case, the first server containing the file "GEARS.DOC" is NAS1_SRV1. Additional file servers, for additional stripes and mirrors are identified using this first server as a starting point. Alternately, the file servers to be used to store the data files are identified using a load balancing function. Further, each copy of a stripe data file must be stored on a different file server than the other copies of the same stripe, in order to provide protection against file server failures, and to provide parallel data paths for improved throughput.

A separate GUID is computed for each distinct data stream of a user file. Thus, a respective GUID is computed for each data stream of a stripe-mirror instance, and if there are spillovers, a separate GUID is computed for each spillover segment. From the GUID for each data stream, a file path is generated, and each data stream is stored in the determined file server at the file path determined from its GUID.

Isomorphic Trees

In order to implement directory aggregation, described below, the aggregated directory structure is preferably present on all servers of the NAS array. Each file server preferably has the same directory structure (also called a directory tree) under the share exposed for this server in the NAS array. Having isomorphic directory trees enables metafiles to be stored on any server in the NAS array. Each file server need not have the same metafiles.

In order to ensure that each file server has the exact same directory structure, for each directory create request received from the client, the aggregator must create the specified directories on all the file servers. The aggregator (i.e., the file switch) extracts the directory portion of the file path and creates the same directory structure on all file servers in parallel.

In case the network file system semantics allows creating files without having to pre-create their directories, the file switch creates the directories on all servers (at least all servers that can be used to store metafiles), regardless of where the metafile is created. As an example, if the file path being created is "\eng\doc\archive\mydoc.doc", the aggregator must create the parent directory "\eng\doc\archive" on every file server in the appropriate NAS array where the file "mydoc.doc" is to be stored.

Load Balancing at the File Switch Level

Figure 18:
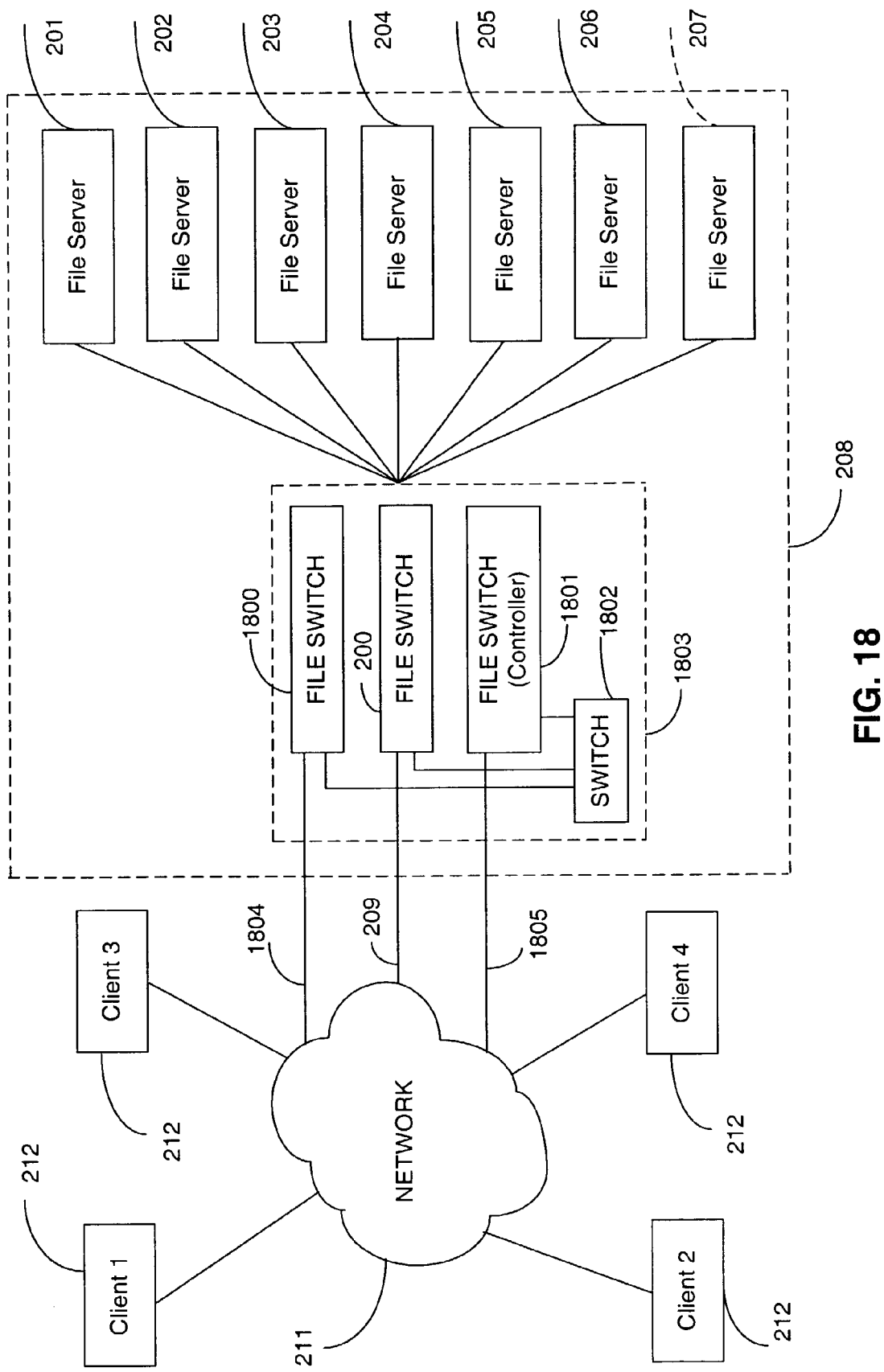
FIG. 18 illustrates a method for balancing load at the file switch level.

FIG. 18 illustrates a mechanism provided by the present invention for load balancing at the file switch level. Since all file switches within an aggregated file switch provide access to the same set of files, any client may be connected to any of the file switches. This allows clients to be distributed among the file switches so that not all clients are connected to the same file switch. This can be achieved by manually configuring each client to use a particular file switch or by automatically distributing the clients when they try to connect to the aggregated file switch 1803.

The selection of which particular file switch is going to serve a given client happens when the client connects to the file switch. This association preferably does not change for the duration of the client connection.

The load distribution is preferably done through a name resolution service, such as DNS or WINS, that provides a mapping between a name (configured as server name for the clients) and the IP address of a particular file switch.

One possible mechanism is to have the group 1803 be assigned a separate DNS subdomain (e.g., zx1.z-force.com). File switch 1801, which is configured as a group controller also acts as a DNS server for that subdomain. The subdomain preferably contains two host names, such as admin.zx1.z-force.com and zx1.z-force.com. The name admin.zx1.z-force.com is used for management, the host name zx1.z-force.com is used for file serving (i.e., this is the name to which clients connect). The group controller always resolves the admin.zx1.z-force.com host to itself. It resolves the zx1.z-force.com host name dynamically. In different embodiments, the zx1.z-force.com host name is resolved to a respective file switch on a rotating basis, a random basis, on the basis of the number of users connected to each of the file switches, or on the basis of the current transactional loads being handled by the file switches in the group (the file switches may report their load factor periodically to the group controller 1801). As a result, different clients end up on different switches. Each of the switches may also have a unique name in the subdomain (e.g., switch3.zx1.z-force.com).

In an alternative embodiment, the group controller can be a dedicated device instead of the file switch 1801.

Another mechanism for load balancing is for each file switch to have a different server name and IP address. The system administrator can configure different groups of clients to connect to different file switches (e.g., based on company structure), or use a third-party load balancer or round-robin DNS such as RRDNS.

Yet another mechanism that can be used by the file switches belonging to the same group is to configure the switches with the same server name (e.g., the CIFS server name), and have that name registered as a group name instead of an individual host name. When a client tries to establish a connection to that name, the first switch able to respond will get the client connection. Since typically this will be the least-loaded switch, this mechanism can also be used for load balancing.

One skilled in the art will recognize that other mechanisms can be used to achieve load balancing. One skilled in the art will also recognize that combining a load-balanced front end with independent connections on the back end of the file switch allows practically unlimited scaling up of the bandwidth of the network file system, simply by adding file switches to the group 1803. In such case, one may also increase the number of file servers to which the file switches connect as needed to achieve the desired aggregate performance.

Transaction Aggregation

Figure 19:
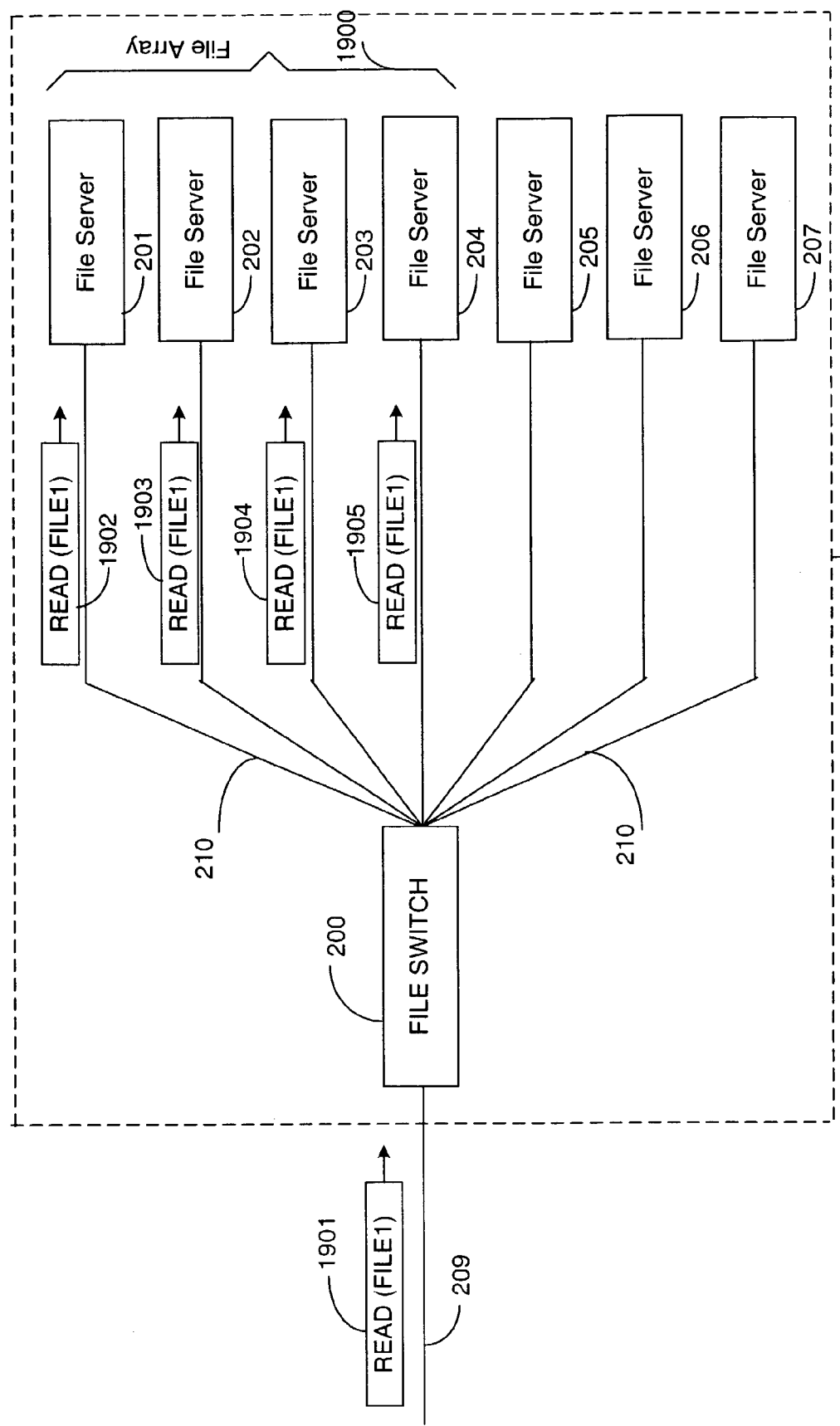
FIG. 19 illustrates a method for transaction aggregation.

FIG. 19 illustrates transaction aggregation by a file switch. File switch 200 receives a file read request 1901 from a client connected through connection 209. The switch determines the subset of file servers on which instances of the aggregated file reside, preferably by using the aggregation descriptor 803 for that file (as described in the following section); in this example, servers 201, 202, 203 and 204, collectively identified as the file array 1900. The switch then submits appropriately modified file read requests 1902, 1903, 1904 and 1905 to servers of the file array 1900, in parallel. The servers 201 through 204 receive their respective file read requests 1902 through 1905, execute them in parallel and respond according to protocol back to the switch, each believing that the switch is its client for the individual file that resides on that server. The file switch 200 collects all responses from the file servers. Next, it updates its state with information regarding the member files that comprise the aggregated file, each residing on one of the servers 201 through 204 of the file array 1900. Then it aggregates the transaction result and submits it back to the original client.

As a result, the client can now initiate various file transactions on the file (in this example, FILE1), as if it were a single file residing on a single file server. The switch aggregates different transactions differently. Its operation on read and write transactions is described elsewhere in this document. The operation of the file switch with respect to concurrency-related requests and issues is described in the following section.

Accessing an Aggregated User File Through the Metafile

Figure 20:
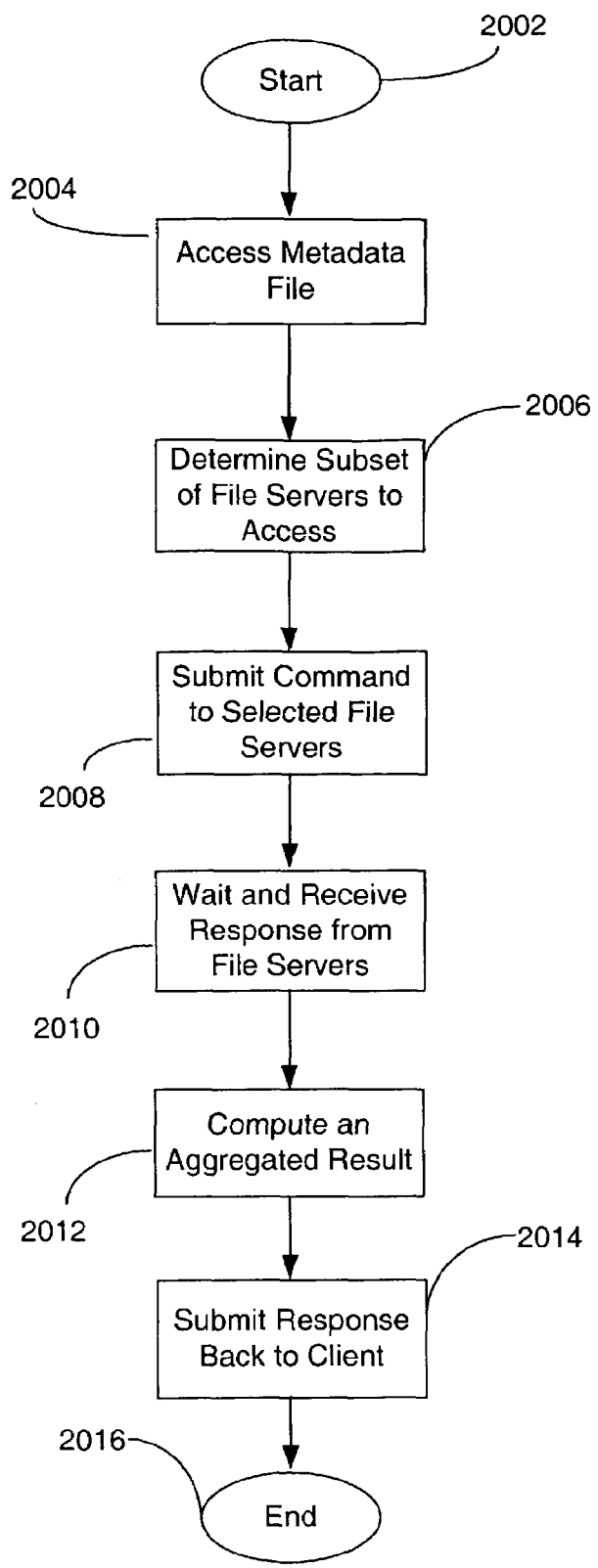
FIG. 20 illustrates a method for accessing an aggregated user file through the metafile.

FIG. 20 illustrates the preferred method for accessing an aggregated user file through the metafile. Upon receiving a file operation request from a client, the file switch follows similar patterns without regard to the actual command being processed. The method starts in block 2002 and goes through the following steps.

In step 2004, the metafile is accessed to fetch the metadata of the user file. The location of the metafile is determined by applying a namespace rule to identify a NAS array (i.e., a group of file servers) and by applying a hash function to the given user file name and the given file path to identify a particular file server within the identified NAS array.

In step 2006, the file server that stores each individual data file of the user file is determined from the metadata of the user file. Treating the set of file servers in which the data files are stored as a "file array," each file access operation is executed over a specific set of data files in the file array.

In step 2008, the file aggregator submits the file access command(s) to the selected file array (or a subset thereof). The commands are preferably submitted to the different file array members simultaneously (or in quick succession), so that all members will receive them practically at the same time.

In step 2010, the file aggregator (i.e., the file switch) waits and receives response(s) from the selected array of file servers. After all operations are submitted to their recipients, the file aggregator waits for a response from each of the array elements participating in the command. The responses may come in any order at any time. It is not necessary for the file aggregator to wait until the entire and complete response is received from a file array member. Once the file aggregator receives enough of the response in order to make a decision about the submitted command, it may stop waiting for the response from that member.

In step 2012, the file aggregator computes the aggregated result. When all the file array member responses are received, the file aggregator combines them in an aggregate response.

In step 2014, the file aggregator submits a response back to the client. After all responses are received from the file array members and the aggregate result is calculated, the final response is sent back to the client. Each of the client's operations are preferably executed asynchronously due to the fact that the file aggregator preferably submits each command to the file array members across a network. Finally, the method ends in block 2016.

General Algorithm for Handling Client Accesses

This section presents the general aggregation algorithms used to aggregate operations over metafiles in an aggregated file system. There are two general algorithms: 1) perform operation over all metafiles for the user file, and 2) perform operation on a single metafile. Which algorithm is used is mostly dependent upon the type of file operation executed.

Perform Operation Over All Metafiles

In this algorithm, operations are executed over all metafiles for a given user file. One case this algorithm is used is for all operations that modify the metadata stored in the metafiles. For example, this algorithm is used when creating files for access, and when deleting files. The operation is repeated over all metafiles in parallel for highest performance.

Note that the operations are performed only over metafiles that reside on currently available servers. If one of the copies of the metadata is not available, the modifications are stored in the others; at least one copy must exist in order for access to be provided.

Perform Operation Over a Single Metafile

This algorithm is preferably used for non-destructive file operations that retrieve but not modify data in the metafile, such as getting the last modified time of the file. In this algorithm, an operation is performed over the metafile stored in the metaserver with the lowest ordinal number. Alternatively, the operation may be performed over the metafile stored in a randomly or pseudo-randomly selected metaserver, from among the metaservers currently believed to be available.

Handling Concurrent Accesses

Since file servers and network file protocols are designed for accessing by multiple clients simultaneously, they typically provide excellent support for concurrency handling. For example, the CIFS network file protocol provides the ability to request an exclusive file open, meaning that if two clients request open at the same time, only one of the requests is going to succeed.

In the case of a single file server, this support is often implemented inside the file server by using operating system synchronization objects. This works well for a single server in which access from multiple clients can be serialized within the same computer. However, as the background discussion explains, extending this approach to multiple servers in a clustered configuration creates a bottleneck. For this reason, the present invention preferably uses a different mechanism for handling concurrency.

An Exemplary Concurrency Problem

Figure 21:
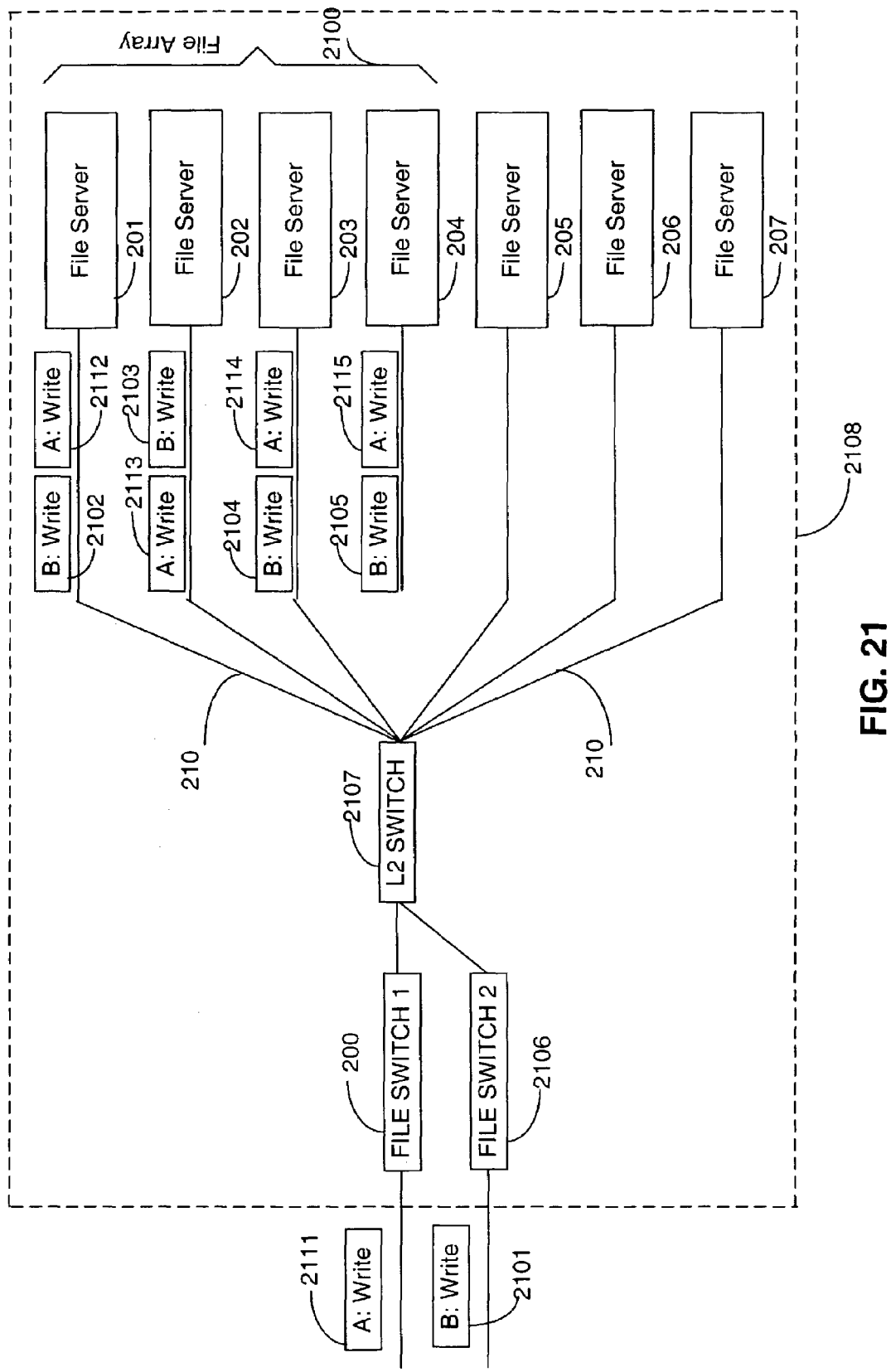
FIG. 21 illustrates an exemplary concurrency problem.

FIG. 21 illustrates an exemplary concurrency problem when two clients trying to access the same resources simultaneously. The system 2108 consists of two file switches 200 and 2106, file servers 201 through 207, and a layer 2 switch 2107, which is used to connect the file servers and the file switches.

In this example, two clients send requests for a file write simultaneously. A first client, client A is connected to file switch 200 and sends its file write request 2111 to it; a second client, client B is connected to the file switch 2106 and sends its file write request 2101 to it. In this example, the requested file is aggregated from four data streams (e.g., four mirrors), each residing on one of the servers 201 through 204 (the four servers forming the file array 2100 for this file).

Both file switches process the request at the same time and try to process it by switching the incoming requests 2111 and 2101 to each of the four servers of the file array 2100. File switch 200 sends requests 2112 through 2115 to the file servers 201 through 204, respectively. File switch 2106 sends requests 2102 through 2105 to the file servers 201 through 204, respectively. While the two switches may have issued the requests at the same time, the requests arrive at each of the file servers in some order. In this example, the file servers 201, 203 and 204 receive the requests 2112, 2114 and 2115, respectively, before they receive the corresponding requests from the file switch 2106, namely the requests 2102, 2104 and 2105. However, the file server 202 receives the request 2103 from the file switch 2106 before it receives the request 2113 from the file switch 200. One skilled in the art will easily recognize that several other orders are possible, as well as similar situations with more than two clients, more than two switches and another number of file servers.

Based on the above-described order of arrival of requests, the file servers 201, 203 and 204 satisfy the write requests 2112, 2114 and 2115 coming from file switch 200 (data A) while the file server 202 satisfies the request 2103 from the file switch 2106 (data B). The mirrors of the file contain inconsistent data as a result of the concurrent accesses by both client A and client B without proper locking mechanism. From the standpoint of a file switch, both aggregated transactions will fail, since neither of them would succeed in writing all four of the member files. This scenario is clearly in violation of the semantics of the write request, which requires that one client should succeed and all others should fail.

One skilled in the art will recognize that this situation can occur with other operations. For example with a lock request, this situation leads to the classic deadlock problem. Although the resource that both clients requested (i.e., the aggregated file) is available and can be granted to one of the clients easily, none of the clients is able to acquire it (i.e., write to the file). The concurrent access problem described above, with respect to write operations, can be solved using implicit locking, as described next. Concurrency problems associated with the open-exclusive operation and with lock requests are solved using mechanisms described below with reference to FIG. 24.

Implicit Locking

Network file protocols typically provide file-level locking and byte-range locking in order to synchronize multiple clients that try to write to the same file and the same area within a file. When locking is used consistently by all clients, there is no need for additional synchronization in order to avoid inconsistent data being written to different mirrors of the same file; however, not all file client applications use the locking mechanism consistently.

Implicit locking allows a client to write data into a locked byte range while sharing the same file with other clients. While a client holds a lock on a byte range in a file, it is the only client that is allowed to write data into that portion of the file. Other clients can not read or write data in the locked range area. This gives a client an exclusive access to a specific portion of the file but not to the entire file. If byte range locking is used consistently by all clients, there is no need for additional synchronization in order to avoid inconsistent data being written to different mirrors of the same file. However, not all client applications use the locking mechanism consistently, which can result in data corruption in an aggregated file system.

Another application of implicit locking is when the file aggregator needs to lock a portion of the file if a client is trying to write data to the file and does not have exclusive access to the target area of the file. The file aggregator (i.e., the file switch) is configured to lock the corresponding byte range of a file if the client attempts to write data into the file without first locking the range itself; the aggregator locks the byte range on behalf of the client. The aggregator preferably locks the byte range if the client does not have exclusive access to the whole file or exclusive access to the accessed portion of the file in which it intends to write. When the write operation is complete, the file aggregator unlocks the previously locked byte region of the file (if it had locked it implicitly).

Figure 22:
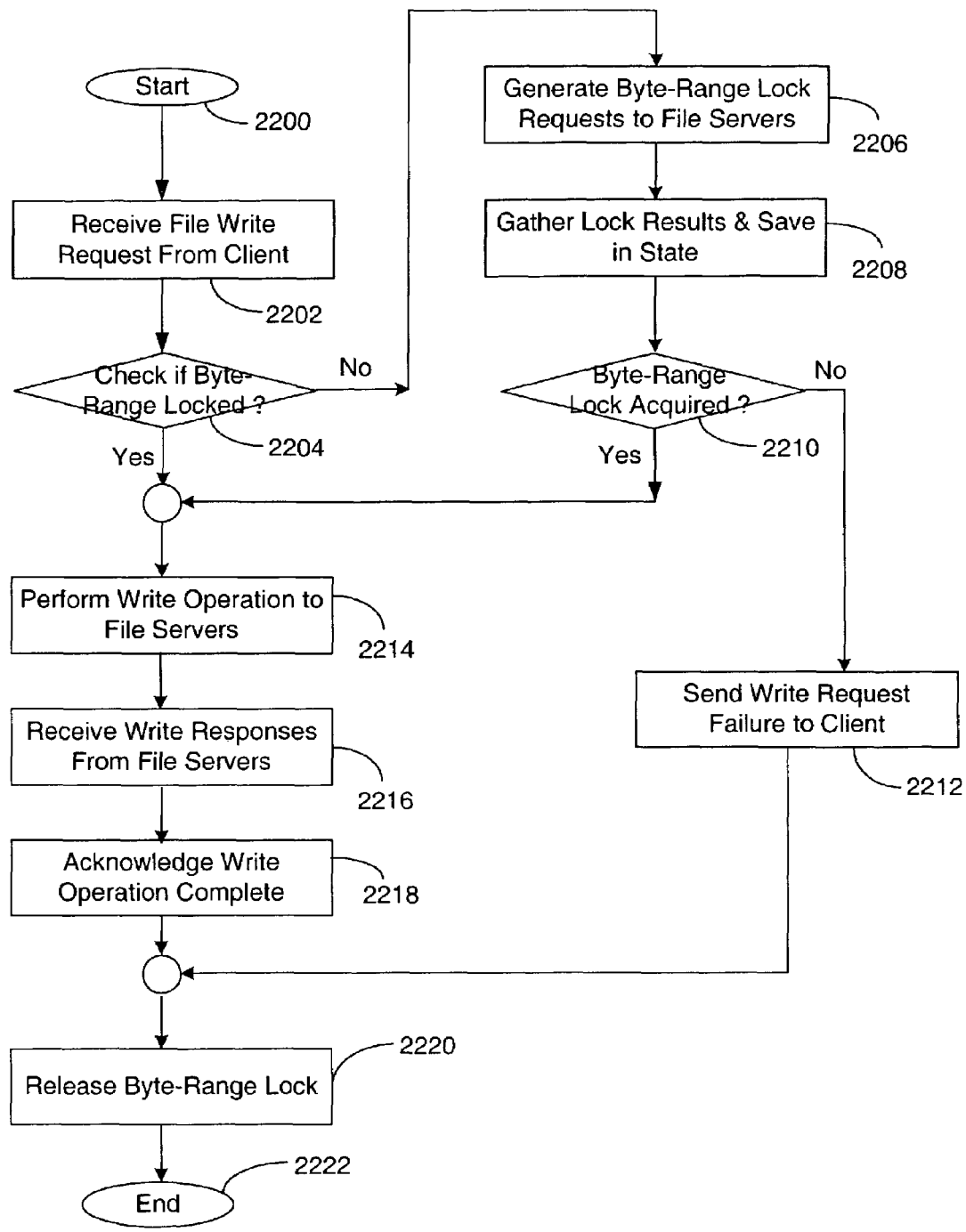
FIG. 22 illustrates a method for implementing an implicit locking mechanism.

FIG. 22 illustrates a method for implementing implicit locking with metafiles that ensures that a client writing to a file has exclusive access to that portion of the file and keeps all mirrored copies of the file properly synchronized with the correct data. The method starts in block 2200 and then moves through the following steps.

In step 2202, the file aggregator receives a file write request from a client. Typically before issuing a write request, a client preferably requests, through the file aggregator, a byte range lock of the section of the aggregated file to be modified. Next, the file aggregator forwards the client's byte range lock request to the appropriate file servers in the correct NAS array. Then, the file aggregator gathers the byte range lock results from the file servers, forwards the aggregated result back to the client, and saves the state of the specific byte range that has been locked by the client. However, the procedure shown here does not assume that a byte range lock has already been obtained.

Upon receiving the client's write request, the file aggregator first determines, in step 2204, whether the byte range of the write operation has been locked by the requesting client. If the byte range is locked, the method moves on to step 2214.

In the alternative, if the byte range is not locked, then the method moves to step 2206 where the file aggregator generates byte range lock requests to each of the file servers that contain a copy of the file on behalf of the client. In one implementation, the byte range lock request is forwarded to the appropriate file servers so as to request locks on the data files containing the data in the specified byte range. To do this, the primary metafile for the specified user file is first accessed to determine the identities and locations of the data files for the stripes containing the specified byte range. Then the lock requests, for locks on the required portions of those data files, are forwarded to the appropriate file servers.

In a second preferred implementation, the byte range locks are obtained on the primary metadata file and its copies; no locks are obtained on the underlying data files. In particular, a byte range lock may be obtained on a file, such as a metafile, even when the byte range specified in the lock request is partially or even completely outside the range of data actually stored in the file. Thus, in this implementation, the byte range lock requests are directed to all the copies of the primary metadata file, corresponding to the user file on which the lock has been requested (whether explicitly or implicitly). To prevent deadlocks, the byte range lock request is first directed to the primary file server for the metafile (as determined, for example, by a hash function or other selection function); and after the lock request is granted by the primary file server, the same lock request is then directed to the other file servers on which copies of the metafile are stored.

Both implementations utilize the lock management capabilities of the file servers, with the primary roles of the file switch being the application of the namespace rules to determine the file servers to which the lock request should be directed, replication of the lock request to those file servers, and aggregation of the lock request results. In yet another implementation, the aggregation rule applicable to the user file includes a lock redundancy parameter P that specifies the number of primary metafile copies on which the lock is obtained. In this implementation, the lock request is directed to a primary file server for the metafile, and then to P−1 other file servers, selected in a predefined manner (e.g., based on ordinal numbers associated with the file servers, using a round robin selection function).

In step 2208, the file aggregator gathers the byte range lock results from the file servers and save the state of the specific byte range that was locked. In step 2210, a determination is made as to whether the byte range lock has been acquired by the file aggregator. If the byte range lock has been acquired, the method continues in step 2214. If the byte range lock has not been acquired, then the file aggregator fails the write request and sends a notice to the client in step 2212.

In step 2214, after confirming the client has secured the byte range lock either in step 2204 or step 2210, the file aggregator performs the write operation to all file servers that contain the aggregated file. In step 2216, the file aggregator receives and aggregates write responses from the file servers. The method then moves to step 2218 where the file aggregator sends an acknowledgement to the client when the write operations have successfully completed.

In step 2220, the file aggregator releases the byte range lock. This step is performed regardless of whether the write operations have completed successfully as in step 2218 or the write request has failed as in step 2212. After releasing the byte range lock, the method ends in block 2222.

When this mechanism is consistently used by the file switch, and in the case of multiple file switches accessing the same set of file servers by all file switches, it ensures consistency of the data file at a level comparable to that maintained by any single file server.

Opportunistic Locks and Caching

Another mechanism frequently deployed with network protocols is Opportunistic Locks ("oplocks"; also known as callbacks). Oplocks allow clients to cache the data file locally to increase performance while keeping the files synchronized and consistent. Depending on the network file system that is used, oplocks may or may not be supported and the different types of oplocks may vary. Most existing operating systems, including Microsoft Windows and LINUX (e.g., SAMBA), support oplocks.

Oplocks are usually only requested by a client when the client opens a file on a network file server. When requesting an oplock, a client always requests an oplock. If the oplock is granted to a client, the client may then cache data file locally to increase performance. If an oplock is not granted, the client must send all network file requests over the network and it can not cache any data from the file. A server does not have to grant the oplock specified by the client; it may grant the client a different level of oplock than the one requested.

Figure 23A:
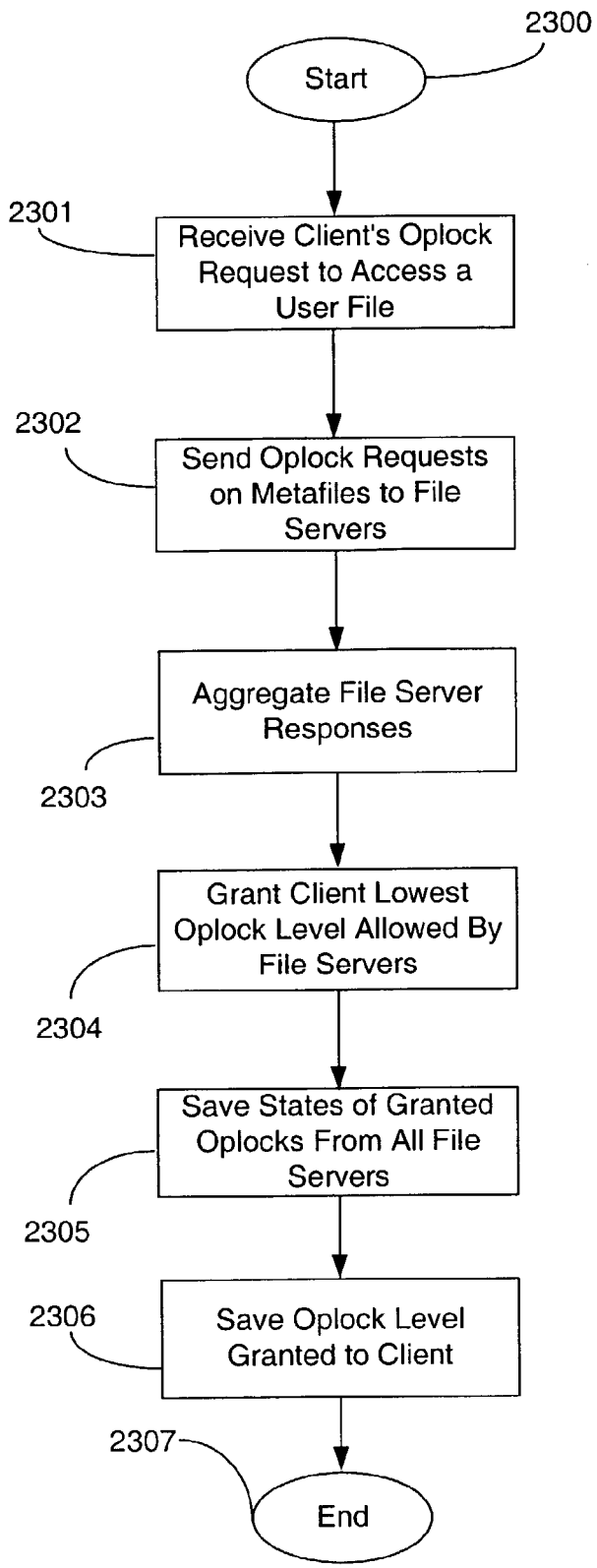
FIG. 23a illustrates a method for handling an opportunity locking request.

FIG. 23a illustrates a method for handling an oplock request by a client. The method starts at step 2300 and continues to step 2301 where the file aggregator (i.e., a file switch) receives the client's request of an oplock to a user file. In step 2302, the aggregator sends oplock requests on the metafiles corresponding to the specified user file to a predetermined array of file servers. Next, the aggregator waits and aggregates the responses from the file servers (step 2303) and grants the client the lowest level oplock that was granted by the servers for the metafiles (step 2304). Note that oplocks are used on metafiles only, not on data files. Then, in step 2305, the aggregator saves the state of all the granted oplocks from the file servers. In step 2306, the oplock level granted to the client is also saved as the current oplock level for the file aggregator. The method ends at block 2307.

Oplocks can be "broken" at any time. This means that after a server grants a specific oplock to a client, the server can send a notification that tells the client that it no longer has the right to hold its current oplock. This usually occurs when a second client tries to open the same file. The server may downgrade the current oplock to a different oplock or may remove the oplock completely from the client. Depending on the new oplock granted by the server, the client may have to flush any cached data file back to the server to keep the file synchronized with other clients. If the client no longer holds an oplock on the file, all cached data file must be flushed and all subsequent file operations must be sent over the network to the file server.

Figure 23B:
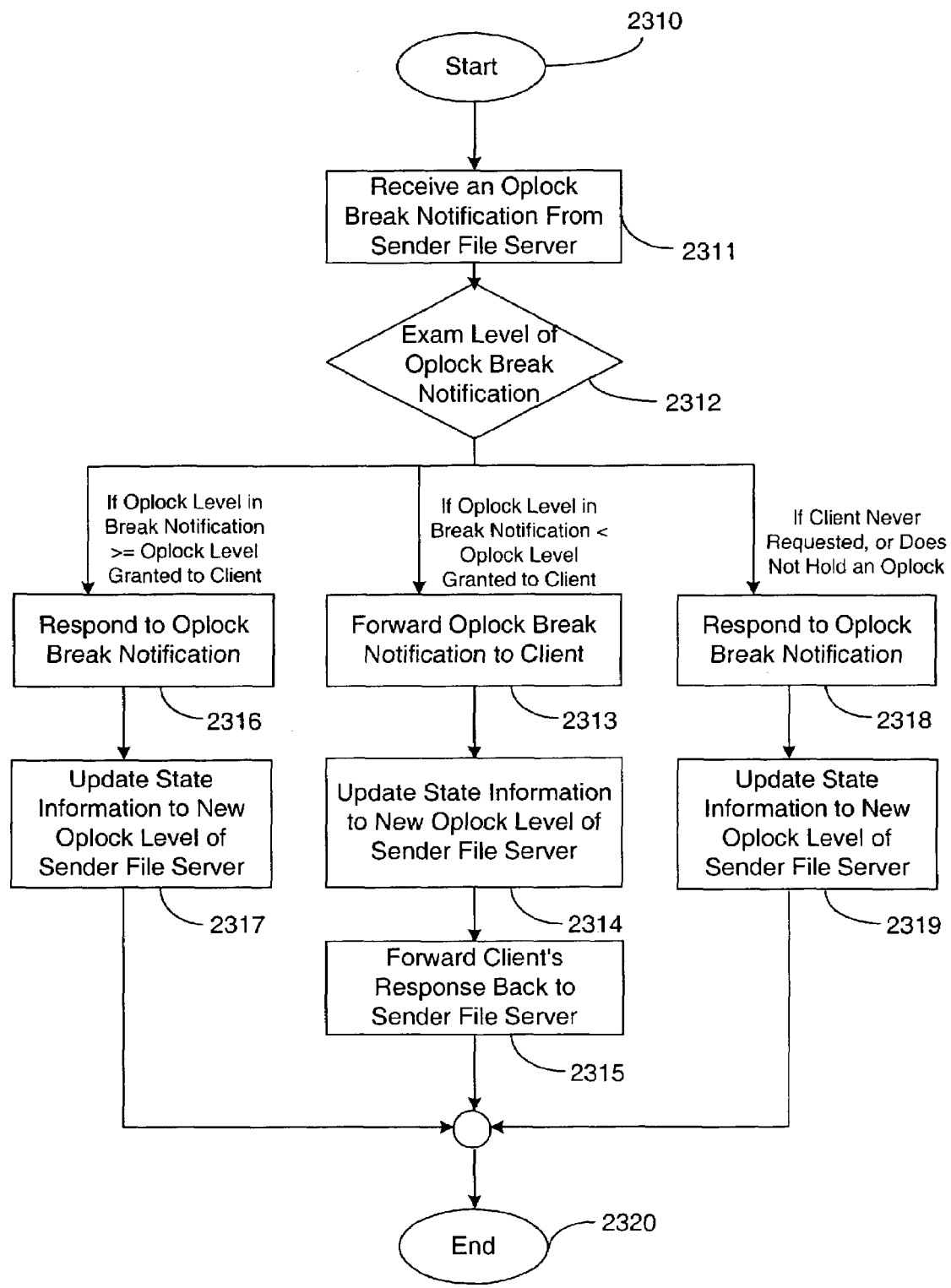
FIG. 23b illustrates a method for handling an opportunity locking break notification.

FIG. 23b illustrates a method for handling oplock break notifications from a file server. The method starts at step 2310 and continues at step 2311 where an oplock break notification from a sender file server is received. Then, in step 2312, the file aggregator (i.e., the file switch) compares the level of oplock break notification from the file server versus the oplock level granted to the client.

In step 2313, if the level of oplock break notification is lower than the oplock level granted to the client, the forwards the oplock break notification to the client. Then in step 2314, the aggregator waits for the client to respond to the oplock break notification, and updates the current oplock level to the new oplock level. In step 2315, the aggregator forwards the client's response to the file server that originated the oplock break notification.

In step 2316, if the oplock break notification specifies an oplock level that is equal to or greater than the current oplock level that was granted to the client, the aggregator responds to the oplock break notification. It then updates its state to reflect the new oplock level for this file server in step 2317. Since the client may hold an oplock that is lower than the oplock specified in the notification, there is no reason to propagate the notification to the client.

In step 2318, if the client never requested an oplock when it opened the file or does not hold an oplock associated with this file, the aggregator responds to the oplock break notification.

It then updates its state with the new oplock level in step 2319. The method ends in step 2320.

Note that, before responding to any oplock break notification received from a file server, the aggregator (i.e., file switch) must first update any oplock state as necessary. As a result, data cached within the aggregator may need to be written back to the file server, if the cached data has been modified, and cached data in the aggregator may need to be invalidated if the oplock is being totally withdrawn by the file server. If multiple oplock break notifications are received from different file servers around the same time, they are queued and handled one at a time. In addition, it is not necessary to respond to the server's oplock break notification if the client chooses to close the aggregated file when it receives the notification from the aggregator. Some network file systems accept a file close operation as a response to an oplock break notification.

Figure 23C:
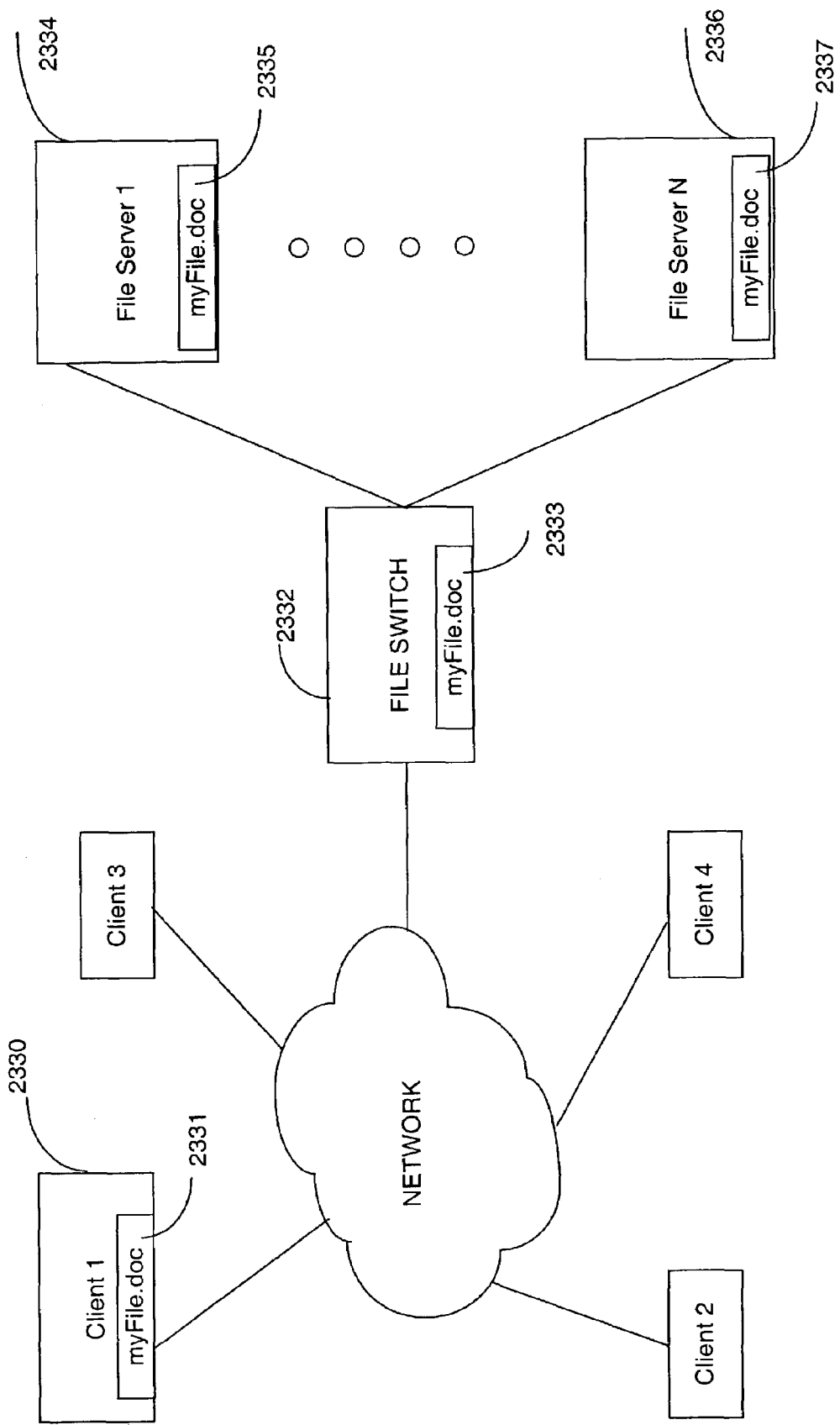
FIG. 23c illustrates a method for mapping level of exclusivity of caching to the oplock exclusivity level granted.

There are several different types of oplocks that can be granted. The types of oplocks are defined by the network file protocol that is used with the file aggregator. The type of oplock defines exactly how the client can cache data, ordered by the level of caching given to a client. FIG. 23c illustrates a method for mapping a level of exclusivity of caching to the oplock exclusivity level granted. For example, when using the CIFS file protocol, an "exclusive" oplock allows the client 2330 to cache a data file "myFile.doc" 2331 locally. Under an exclusive oplock, all read and write operations can be executed locally and therefore the file access time is reduced. A "level 2" oplock allows the data file "myFile.doc" 2333 to be cached in the file switch 2332 or in the client. A level 2 oplock allows all clients given this level of oplock to cache read data locally. (The oplock is revoked the first time someone writes to the file). Note that the file switch can also use the oplock level in order to determine whether it can cache read data, in addition to or instead of the clients. This file is shared among clients supported by the file switch 2332. "No Oplock" is the lowest level, where the client is not allowed to cache the file "myFile.doc". Under "no oplock", mirrors of this file 2335 and 2337 are stored in the file servers 2334 and 2336 respectively.

In an alternate embodiment, oplocks requests are directed to and handled by the file servers that store data files for a specified user file, instead of being handled by the file servers that store the metafile for the specified user file. The file switch distributes the oplock requests to the file servers accordingly, and also aggregates the oplock responses, break messages, and so on from the same file servers. The number of file servers to which each oplock request is directed is determined by the number of stripes that are included in the subset of the file for which an oplock is being requested, and the level of lock redundancy to be used. This method allows the file switch to cache fragments of the file differently on different file servers.

In one embodiment, implicit locking is used in combination with opportunistic locking. In particular, when a client does not request an oplock in conjunction with an operation on a user file, the file switch may nevertheless request an oplock from the file servers when predefined implicit locking criteria are met (e.g., when the nature of the client request, or a usage pattern by the client, indicates continued access to the file is likely). When the implicit oplock is granted, the file switch preferably caches data from the file specified by the client, without the client having any knowledge that such caching is occurring. By opportunistically caching data in the file switch, the file switch provides faster access to data in the specified file. This can be especially helpful when the file switch is much closer to the client computer than the file servers on which the requested file resides. In addition, while the file switch caches data from a file, it can respond to requests from more than one client requesting data from that file, using the same cached data to provide fast responses to each of the clients, so long as none of the clients requests exclusive access to the file.

In some embodiments, the file switch can cache data and use the cached data to provide fast response to two or more clients or client computers, even when one or more of the clients have requested an oplock on the same file. In other words, when a second client attempts to access the same file for which an oplock has been granted, the oplock is not necessarily broken. Rather, if the accesses by all the clients are compatible, then the file switch caches the oplock state (if any) associated with each client requesting access to the same file, and sends responses to the clients using the cached data from the file. The caching of the data in the file switch ends when caching termination condition arises, such as a client requesting exclusive access to the file, or all clients closing the file.

Semaphores

A semaphore is a mechanism that allows only a certain number of entities to access a particular resource. In the context of an aggregated file system, a semaphore is used to allow only one file switch to access a specific aggregated file at a time. This includes all occurrences of the file on all file servers in the NAS array (i.e., if the file is striped or mirrored among multiple file servers). In an aggregated file system, the semaphore is achieved using the primary metadata file stored on the NAS arrays as the semaphore object. The process that obtains access to the primary metadata file also obtains access to the aggregated user file as a whole (the file may still be shared among multiple clients).

The semaphore synchronization mechanism is used mainly with destructive file operations. Destructive file operations include creating a new file, truncating an existing file, deleting an existing file and renaming or moving an existing file. The semaphore synchronization mechanism is also used with non-destructive operations, such as exclusive open.

Synchronization is needed for destructive operations since executing the operations over a specific file changes some aspect of the file; if the aggregator needs to back out and let another entity have access to the same file, it would have to restore the state of all files that it accessed. This would require keeping the states of the transactions on the file switch, which is very costly and can degrade performance. By using the semaphore synchronization mechanism, an aggregator does not execute destructive file operations over any files unless it is granted access to the files by way of a semaphore.

Figure 24:
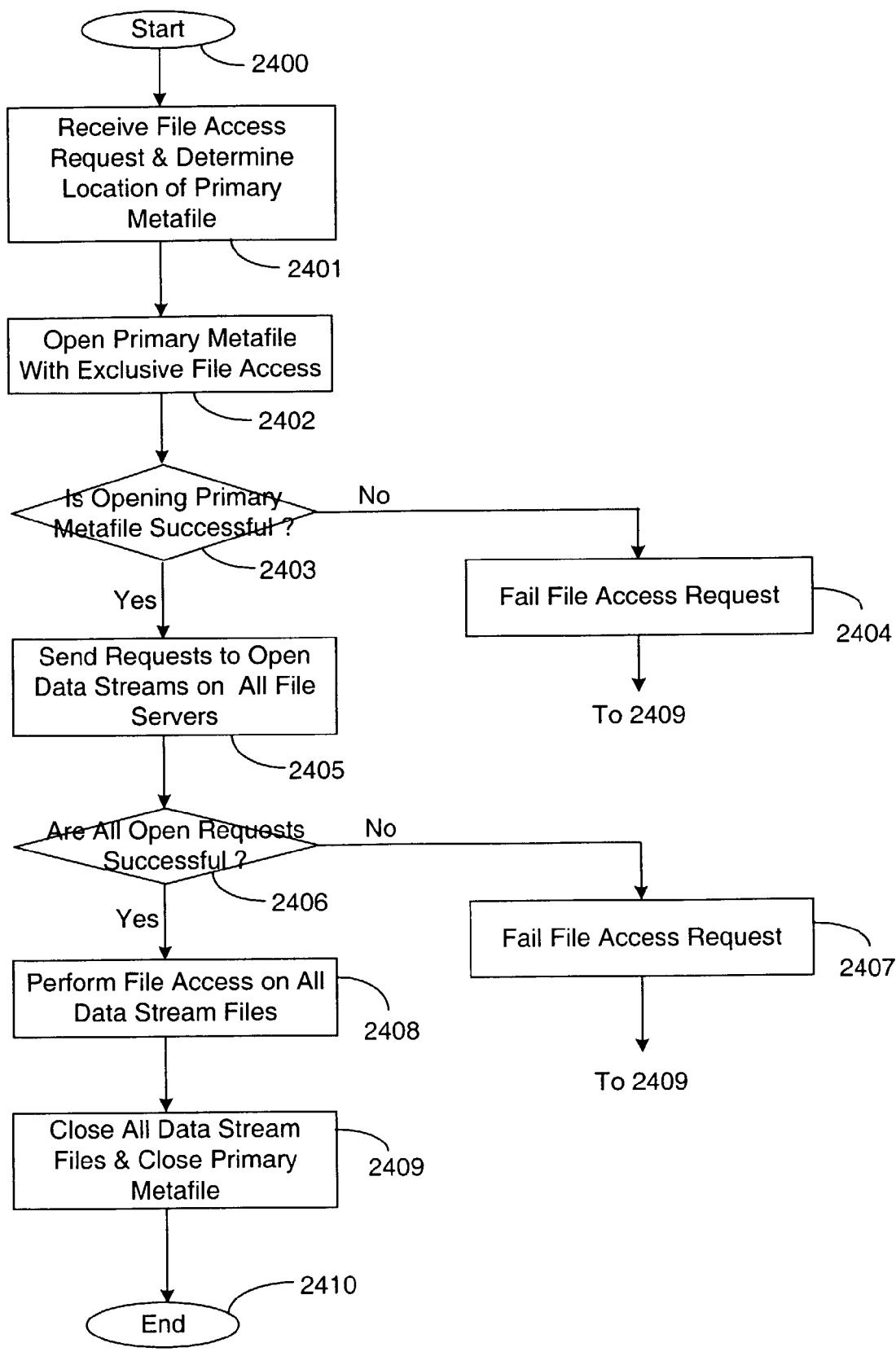
FIG. 24 illustrates a method for handling a semaphore locking mechanism.

FIG. 24 illustrates a method for handling concurrent accesses using a semaphore. The method starts in step 2400 and moves to step 2401 where the file aggregator receives a request for opening the file for exclusive access (not a destructive operation). Also in step 2401, the file aggregator determines the location of the primary metafile of the requested user files by applying a hash function on the user file name.

Next, in step 2402, the file aggregator tries to open the primary metafile with exclusive file access and no file sharing allowed. In step 2403, a first determination is made as to whether the primary metafile has been successfully opened. If the answer is positive, the method continues in step 2405. If the answer is negative, the file aggregator fails the client's file access request and moves to step 2409; or waits a random amount of time and retries to open the primary metafile again. There should be a limit on the number of retries. If opening the metafile has succeeded, the aggregator is granted access to the aggregated file. If there is more than one copy of the primary metafile, then the open is considered successful if all opens completed successfully; if at least one open failed indicating that the file is already open, the client's request for exclusive open will be denied.

In step 2405, the file aggregator opens all the data streams on all of the file servers of this user file's file array, or alternately opens all the data streams that will be needed for the destructive file operation. Step 2405 ensures that all the data streams required for the destructive file operation are available.

In step 2406, a second determination is made as to whether all open requests have been granted by the file servers. If any of the open requests fail, the file aggregator fails the client's file access request in step 2407 and moves to step 2409. In the alternative, if all open requests have been granted successfully, the method moves to step 2408 and the file aggregator performs file access on all data stream files. In step 2409, after all the file accesses have been completed, the file aggregator closes all the data files and then closes the primary metafile (s). The method ends in step 2410.

With each aggregator accessing the files using this methodology, it can be guaranteed that the access to the file will be properly synchronized.

Summary of Aggregation of Concurrent Accesses

One skilled in the art will recognize that other algorithms may be employed to achieve the same results and ensure consistent and atomic behavior for aggregated transactions. Similarly, one skilled in the art will recognize that the same approaches may be applied to other file transaction types, such as locking, creation, etc.

In effect, the present invention aggregates the existing synchronization mechanisms provided by network file protocols (and thus by the file servers in the system) to implement synchronization between the clients of multiple independent file switches without requiring direct interaction and communication, and therefore, coupling, between the file switches. In addition, each individual file switch can further use these mechanisms in order to synchronize transactions requested by multiple clients that are connected to that switch.

Directory Enumeration

When a file switch receives a directory enumeration request from a client, the request may specify to enumerate an entire directory (not including sub-directories) or it may enumerate a single file. Single file enumeration is typically used to determine whether or not a specific file exists in the file system. This section covers how to enumerate a single directory or a single file.

When a directory enumeration request is received, the aggregated file system uses the namespace aggregation rules to determine which NAS arrays need to be enumerated in order to satisfy the request. Any particular directory (i.e., an aggregated directory in the user namespace) may be distributed over multiple different NAS arrays because multiple namespace rules may apply to the files in that one directory. The file aggregator enumerates the corresponding directories on all the NAS arrays that are the target of the applicable namespace rules, combines the results, and propagates the combined result back to the client.

When enumerating the directories in an aggregated file system, all of the file servers of a specific NAS array are preferably enumerated for their directory contents. This is due to the fact that a hash function distribution function is used to distribute the metadata files among different file servers of the NAS array. Only the metafiles are enumerated; data files are ignored. The main goal of the aggregated directory enumeration mechanism is to efficiently eliminate duplicate files in the enumeration so that aggregated directory enumeration is fast and efficient.

The basic aggregated directory enumeration method is as follows. When a file switch needs to enumerate a directory on a NAS array, the client's enumeration request is replicated in parallel to all of the file servers in the NAS array. The file switch receives all of the responses from the servers and builds the enumerated directory structure entirely in memory. The file switch does not wait for the entire directory structure to be built in memory before sending enumeration results back to the client. Rather, the enumeration results are sent back to the client as soon as they are available.

The directory enumeration strategy is defined in the following two sections:
Enumeration State: Describes the internal state that the file switch needs to maintain during a directory enumeration operation.
Enumeration Algorithm: Defines the algorithm of how to enumerate a directory over a set of NAS arrays.

State Information Related to the Directory Entries

In order to enumerate the directories on a NAS array, the enumeration request is sent to all file servers of the array and the responses are collected. Since the enumerated directory structure is built entirely in memory from these responses, the file switch needs to maintain the following internal state (i.e., the enumeration state):
a list of directory entries;
additional state related to the directory entries; and
a list of pointers to the directory entries.

A List of Directory Entries

After the enumeration request is replicated to all file servers of a NAS array, the file switch collects all of the responses. These responses contain a list of files that are contained in the enumerated directory. The responses should contain only listings of primary and secondary metafiles, because data files are stored in a different sub-tree on the file servers. For each listed file, the response contains the directory information requested in the enumeration request, such as file name, file size, and other file attributes. Each file listing returned in the enumeration set is known as a directory entry.

Each file found in the enumeration response is added to a list/array of directory entries maintained in memory in the file switch. In a preferred embodiment, each directory entry is added to the list in the order in which it is received and processed. The list or array is preferably implemented as either a queue or a linked list.

Each distinct user file must appear in the final enumerated list only once. Duplicate file names refer to files with the same name that are located in the same user namespace directory. Duplicate files may appear because the file switch replicates the metadata files for redundancy.

Additional State Relate to the Directory Entries

For each directory entry, there is additional state that is tracked by the file switch during enumeration. This state includes the following:

- The number of times the file was found in the enumeration (duplicate files). This occurs since metadata files are replicated for redundancy. Separate counters are maintained for the primary and secondary metafiles.
- Whether or not the file has been submitted back to the client as part of the directory enumeration response.

The additional state can be kept as part of the directory entry array or can be stored in a separate array.

A List of Pointers to the Directory Entries

For each directory entry that is processed by the file switch, the file switch must search the directory entry list to see if the file is already included in the list. This can be a very time consuming process, especially if the directory entry list contains thousands of unsorted entries.

In order to speed up the enumeration process, the file switch must maintain a list or array of memory pointers that point to specific entries in the directory entry array. The pointer list contains pointers to the directory entries ordered alphabetically. Using the pointer list, the file switch can quickly search through the directory entries using a binary search to find out whether or not a file exists in the directory entry list. If a new file needs to be added to the list, the file switch only needs to update the pointer list and no entry data needs to be copied in memory.

Directory Enumeration Algorithm

Figure 25:
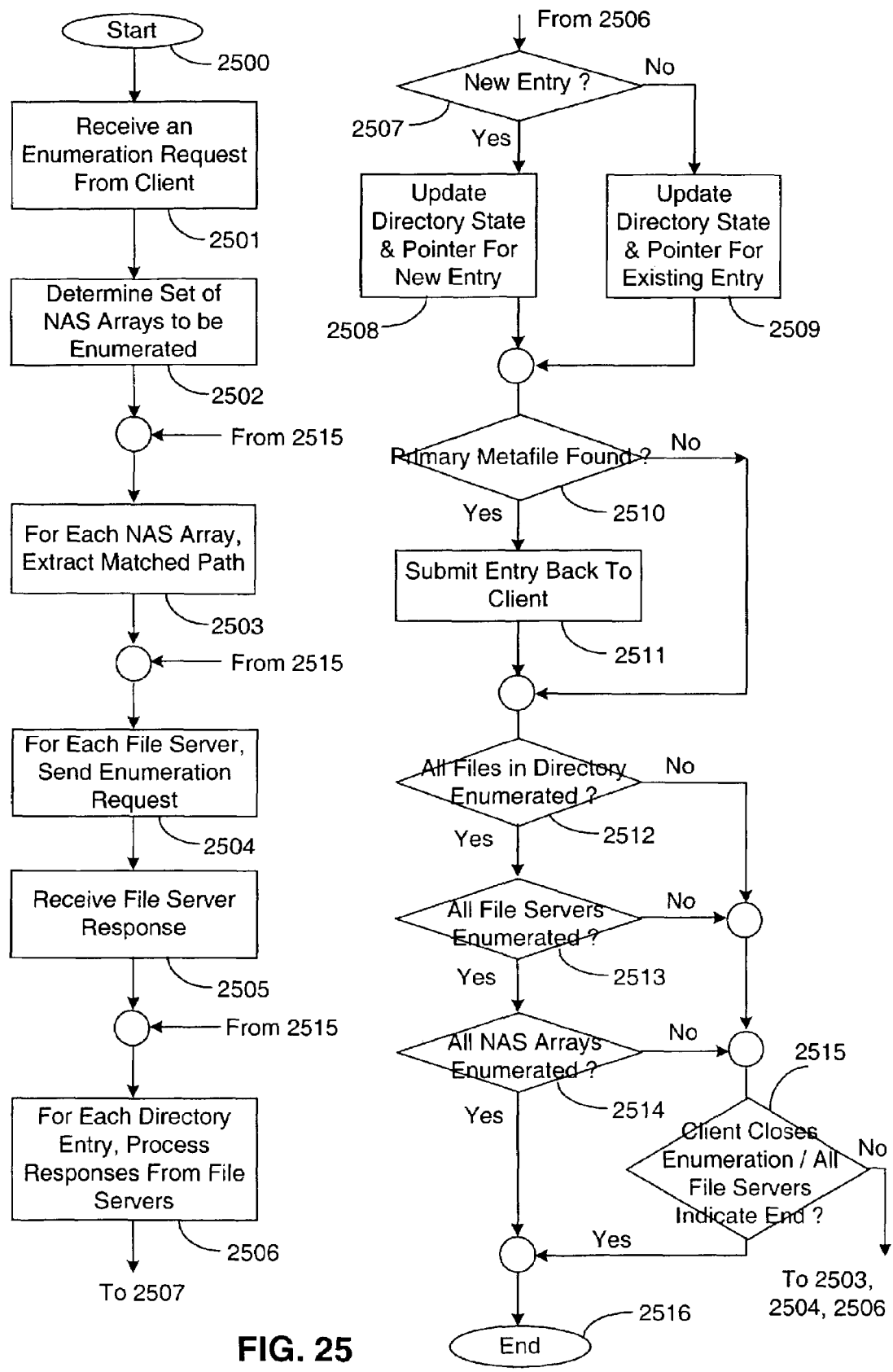
FIG. 25 illustrates a method for enumerating a directory.

FIG. 25 illustrates directory enumeration for the aggregated file system. During directory enumeration, directory requests are sent to redundant directories of metafiles and duplicate responses are filtered out. This is done to ensure that if a file server fails while processing a directory enumeration request, the directory enumeration request is processed to completion using data obtained from the other file servers. The directory enumeration request is processed just as quickly as if the file server had not failed. Thus, the directory enumeration method makes individual file server failures invisible to the client. Only if there is a failure of all the file servers on which redundant metafiles are stored will directory enumeration service to the client computers be impacted.

The method starts in step 2500 and then moves to step 2501 where the file switch receives a directory enumeration request (e.g., a command asking for a listing of all files in a particular directory) from a client.

In step 2502, given the directory to be enumerated, the file switch determines the set of NAS arrays that need to be enumerated based on the namespace aggregation rules and the directory path being enumerated. More particularly, the file switch determines, from the directory path specified in the request, all namespace rules that are applicable to the request. Those rules specify the NAS arrays that store the files in the specified directory path. Each NAS array is enumerated in exactly the same way. The file switch may enumerate the NAS arrays one at a time. When the enumeration is completed on one NAS array, the file switch moves to the next NAS array (if any) using the same internal state information.

Once the set of NAS arrays is determined, each NAS array is enumerated one at a time. Step 2503 marks the beginning of the control loop for processing directory information for each NAS array identified in step 2502. In step 2503, the file switch extracts the match path portion after the last backslash '\' of the enumeration path (e.g., "*.*", "*.doc", or "a* .doc"). If the first character of the match path is not the wildcard character "*", the single character wildcard "?" is added as a prefix to the match path. If more than one NAS array is identified in step 2502, the match path portion of the enumeration path (extracted in step 2503) is different for each identified NAS array because each stores only a portion of the files in the directory to be enumerated. For example, a first particular NAS array identified in step 2502 may only store files (in the specified directory) having a file extension of "doc". If the directory enumeration request is for files starting with the letter "a" (e.g., dir a*.*), the extracted match path portion for this first NAS array would be "?a*.doc". In other embodiments, where there is no secondary metafile, the metafile has the same name as the user file, so the extracted match path will not need the "?" prefix.

The extracted match path portion is used by the file switch in step 2504 to retrieve all of the metafiles that match the match path portion. In the simplest case, if the enumeration path specifies only a single file with no wildcards (e.g., "dir file1.doc"), the file switch simply replicates the request to the appropriate set of file servers of a single NAS array, with a "?" wildcard prefixed to the filename. The responses are collected and a consolidated response is sent back to the client. No other steps are executed. The directory entry list, pointer list and additional state information are emptied or reset to contain no entries.

More generally, in step 2504, the file switch replaces the enumeration path according to the namespace aggregation rules (i.e., as determined in step 2503) applicable to the NAS array currently being processed, and replicates the enumeration request in parallel to all of the file servers in the NAS array that are configured to store metadata files. In some embodiments, the NAS array is configured so that some of the file servers in the NAS array store metadata files, while other file servers are configured to store data files (i.e., files other than metadata files); in other embodiments, some file servers may be configured to store both metadata files and data files, while other file servers are configured to store only data files. In step 2505, the file switch waits and receives the responses to the enumeration requests from the file servers.

Step 2506 marks the beginning of the control loop for processing the response received from each file server. In step 2506 a first or next file name in the response received from a file server is processed. The file switch searches the pointer list by file name to see if the file name is already included in the directory entry list. During this step, the 'P' or 'S' prefix of the file name, which indicates whether the listed file is a primary or secondary metafile, is stripped from the file name for purposes of searching the pointer list.

In step 2507, a determination is made as to whether a new entry has been received. If the entry is not new, i.e., the file exists in the directory entry list built in memory, then the method takes the NO branch and moves to step 2509 where the file switch updates the state and pointer related to the existing directory entry. The state of the directory entry includes the directory information returned by the file server with the directory entry. In step 2509, the file switch also updates the additional state of the directory entry with the number of times the primary and secondary metafiles have been found.

In the alternative, if the entry is new, then the method takes the YES branch and moves to step 2508 where the file switch adds the directory entry to the directory entry list and initializes the state of the new directory entry. The filename used in the directory entry does not include the 'P' or 'S' prefix of the primary or secondary metafile represented by the received filename. The file switch also updates the pointer list with a pointer to the new directory entry in the proper alphabetical order and initializes any other additional state needed for the new entry.

In step 2510, a determination is made as to whether both the primary and secondary metafiles for a user file have been found. If the primary and secondary metafiles have not been found according to the file aggregation rules, the file switch does not send the directory entry back to the client that requested the directory enumeration, because it does not yet have sufficient information to send back to the client. Instead, the method moves to step 2512 and continues with the next entry returned by the file servers (at step 2506). In the alternative, if both the primary and secondary metafiles have been found, the directory entry contains all the requested directory information for the corresponding user file, and this directory entry is sent back to the client. The directory information for the secondary metafile contains the aggregated file size and allocation size of the user file. The directory information for the primary metafile contains all other file information, including access/creation dates and times, file attributes and so on. (An alternate embodiment that changes the operation of step 2510 is discussed below.)

In step 2511, the file switch submits the entry back to the client as part of the enumeration response. The file switch preferably uses a different thread to submit an entry back to the client. This thread runs in parallel with the threads that are enumerating the directories on the file servers. If the entry has already been submitted back to the client, the file switch does not return the entry to the client in step 2511, and instead skips over to step 2512.

In step 2512, a determination is made as to whether all files in the directory has been enumerated. If the answer is negative, the NO path is taken and the method moves to step 2515 before it continues with the next entry returned by the file server (step 2506). The directory enumeration continues until all of the files are enumerated and stored in memory. In the alternative, the YES path is taken and the method moves to step 2513. Note that if there are any directory enumeration errors, but at least one of the enumeration requests to the file servers is successful, a positive enumeration response is sent back to the client with the collected enumeration results. If all of the enumeration requests fail, the client's enumeration request fails and a failure response is returned to the client.

In step 2513, a determination is made as to whether all file servers have been enumerated. If the answer is negative, the NO path is taken and the method moves to step 2515 before it continues with the next file server in the file array (at step 2504). In the alternative, the YES path is taken and the method moves to step 2514 where another determination is made as to whether all NAS arrays have been enumerated. If the answer is negative, the NO path is taken and the method moves to step 2515 before it continues with the next NAS array in the switched file system (at step 2503). In the alternative, the YES path is taken and the method ends in step 2516.

In step 2515, a termination condition is checked as to whether the client has closed the enumeration. If the termination condition has not occurred, the method continues at step 2503, 2504 or 2506, depending on the iteration loop the method is in, as indicated by which step was performed (namely 2512, 2513 or 2514) prior to step 2515. In the alternative, if the termination condition has occurred, the YES path is taken and the method ends in step 2516.

Note that when enumerating directories, the total number of entries that are in the enumeration set may exceed the number of entries that can be returned back to the client due to limitations of the client's response receive buffer. If this situation occurs, the file switch sends an enumeration response containing a subset of the entries with an indicator that indicates there are more entries in the enumeration. This enables the client to send another enumeration request to retrieve the remaining entries.

When updating the directory entry list of an existing entry, several entry attributes need to be updated (see step 2509 above). The most important attribute is the size or allocation size of the file. For each aggregated file, the size of the file is stored in the secondary metafile encoded in one of the time/date fields associated with the file. The allocation size is determined by taking the aggregated file size and multiplying it by the number of mirrors. All other file attributes are retrieved from the primary metafile. These attributes include last accessed date and time, creation date and time, last written date and time, and so on.

If after a directory entry is submitted back to the client, the file switch receives another occurrence of the same file listing on one of the other file servers, this is not considered an error—because metafiles are purposely replicated. In this case, the file listing received from the file server is ignored.

In an alternate embodiment, directory entries are not submitted back to the client at step 2511, but instead a sorted list of directory entries is built at step 2511. The resulting sorted list is returned to the client when the building of the list is complete, just before step 2516.

In another alternate embodiment, only a primary metafile is provided for each user file, and no secondary metafile is used. As explained above, one of the directory fields of the primary metafile is used to store the aggregated file size for the corresponding user file. In this embodiment, step 2510 can be eliminated. Instead, step 2508 is followed by step 2511, but step 2509 is followed by step 2512. In other words, whenever a new metafile is found, its entry is submitted to the client, but when a redundant metafile is found the directory enumeration procedure skips over it, except for bookkeeping (step 2509).

The directory enumeration method shown in FIG. 25 can also be used, with minor modifications, to perform other directory operations (sometimes called file commands), such as changing a specified file attribute for a specified set of files (e.g., "attrib+r c:\x\y\ab*.doc") or deleting a specified set of files (e.g., "del c:\x\y\abcd*.doc"). In step 2504, the file command is sent to the applicable file servers of NAS server identified in step 2502. Steps 2506 to 2510 are replaced by similar steps for aggregating the responses obtained from the file servers, and in step 2511 or 2516 the aggregated responses are returned to the client.

Redundant Metavolume Controller

A collection of user files is referred to as a "volume" of data files. A volume of data files may be stored on one or more file servers, and a file server may host one or more logical volumes. In the context of the metadata based file switch and switched file system, a collection of metafiles corresponding to the collection of user files is called a "metavolume". It is desirable to replicate metavolumes over multiple file servers to provide backup of the metafiles and to provide continue operation of the switched file system in event of a failure of one of the file servers used to store the metafiles.

A group of file servers in a NAS array can be designated to store metafiles. Each such file server is called a metaserver. In some implementations, all metaservers in a NAS array have identical metafile content (i.e., they all store copies of the same metafiles). In other implementations, while each metafile is replicated N times on a set of metaservers selected using a distribution function, the number of metaservers is greater than N, and therefore the metaservers do not have identical content. Once a metavolume is created, its configuration (with respect to the metaserver and directories in which the metafiles are stored) does not change. Each metaserver within the redundant metavolume is assigned an ordinal number. This ordinal number also does not change once a metavolume assigned to the metaserver is created.

Accessing Redundant Metavolumes

In general, there are three types of redundant metavolume operations: destructive operations, non-destructive operations and creating new file or lock acquisition. A non-destructive operation, such as a read operation, does not change the content or attributes of the metavolume, so this operation is performed on any one of the metaservers. On the other hand, a destructive operation, such as a delete operation, does change the content or attributes of the metavolume, and this operation is performed on all the metaservers of the NAS array to which the metavolume has been mapped. For creating new file or lock acquisition, the operation is performed first on the primary metaserver to obtain the exclusive access to the metavolume, and then the operation is performed on all other metaservers of the metavolume.

Figure 26:
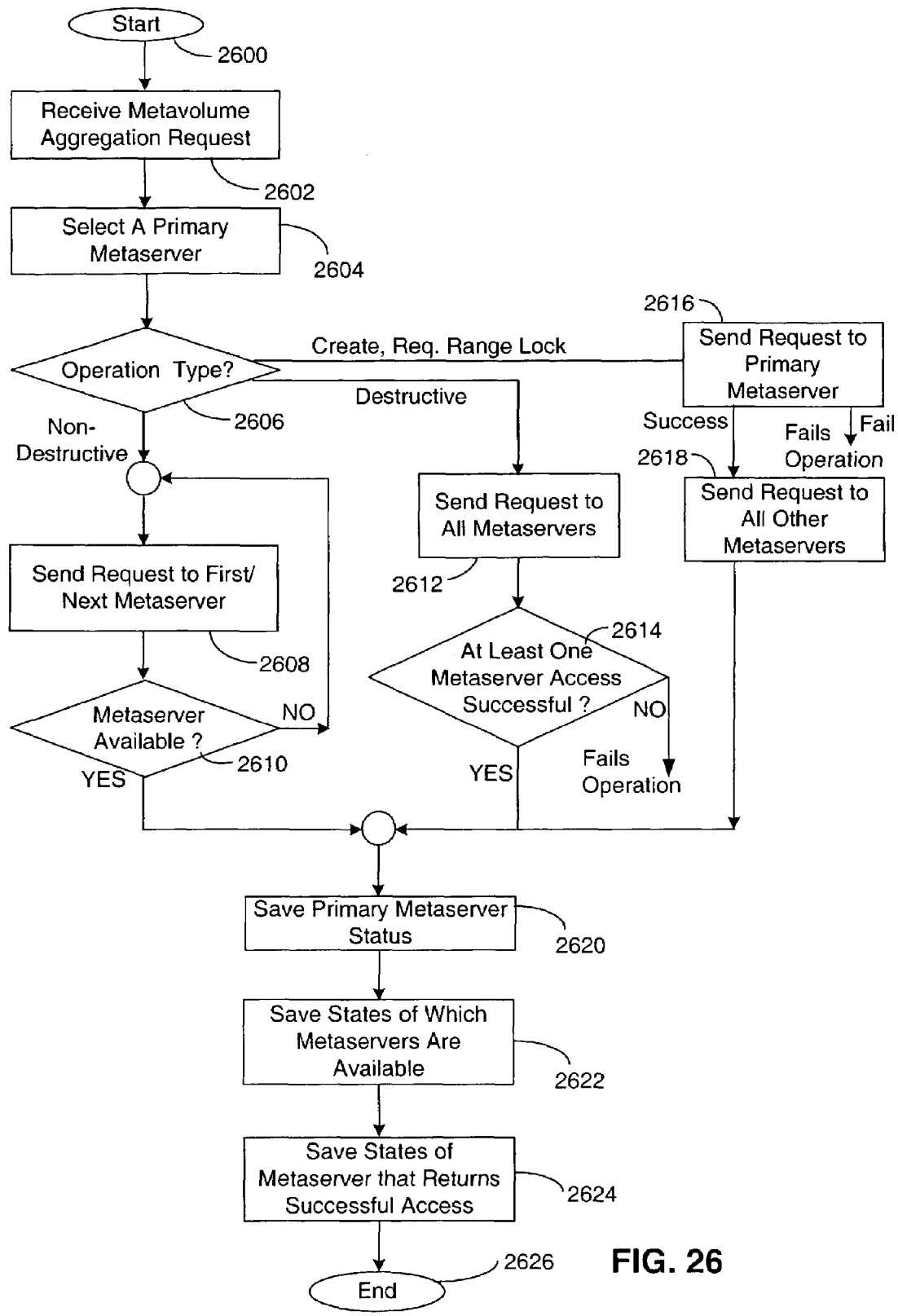
FIG. 26 illustrates a method for implementing a redundant metavolume controller.

FIG. 26 illustrates a method for accessing redundant metavolumes. The method starts in block 2600 and thereafter moves to block 2602. At block 2602, the redundant metavolume controller (RMC) receives a request from a file aggregator to access the redundant metavolumes stored in a group of metaservers. In a preferred embodiment, the RMC is implemented as a software module within the aggregated file system 616 (FIG. 6). In another embodiment, the RMC may be implemented using one or more application specific integrated circuits (ASIC's), or a combination of ASIC's and software.

At block 2604, the RMC selects a primary metaserver. The primary metaserver is selected based on the name of the metafile. In one embodiment, the RMC selects the primary metaserver by computing a sum S of all character values of the metafile name and then computer S modulo M, where M is the number of metaservers. The resultant number is used by the file switch as the ordinal number of the primary metaserver. In another embodiment of the present invention, the primary metaserver is selected by computing a hash function of the name of the metafile. The resultant number of the hash function is the ordinal number of the selected primary metaserver. Both of these methods distribute the primary metafiles evenly across the available metaservers, and hence improve the performance of the overall system. In yet another implementation, the primary metaserver is a predefined one of the metaservers, such as the metaserver having the lowest ordinal number.

At block 2606, a determination is made as to the type of the requested operation. If a destructive operation is requested, the path to 2612 is taken; if a non-destructive operation is requested, the path to block 2608 is taken; and otherwise the path to block 2616 is taken for handling operations such as creating a new file, lock acquisition, rename, and the like.

At block 2608, the RMC sends the non-destructive operation request to the available metaserver with the lowest ordinal number. Alternately, the RMC sends the operation to a randomly or psuedo-randomly selected metaserver, from among the metaservers currently believed to be available. Next, the method moves to block 2610 where a determination is made as to whether the metaserver to which the request is sent is available. If the metaserver is unavailable, the NO path is taken and the RMC retries the operation to the next available metaserver (by the next lowest ordinal number) by repeating the steps in blocks 2608 and 2610. In the alternative, if the metaserver is available, the method moves to block 2620.

At block 2612, the RMC sends the destructive operation request to all metaservers and aggregates the responses from all the metaservers. Next, the method moves to block 2614 where a determination is made as to whether at least one of the accesses to the metaservers is successful. If none of the accesses to the metaservers is successful, the NO path is taken and the RMC fails the destructive operation request. If the access to at least one, but not all of the metaservers is available and returns success, the operation is considered to have been successfully complete, and the YES path is taken to block 2620. If the destructive operation fails on a particular metaserver, the operation may be retried one or more times, and if the operation continues to fail, the metaserver may be denoted as being inoperative and in need of repair.

At block 2616, the RMC sends either the creating new file request or the range lock acquisition request to the primary metaserver. If the requested operation on the primary metaserver fails (but the primary metaserver is available), the FAIL path is taken and the RMC fails the operation request; if the primary metaserver is unavailable, another metaserver is chosen as a primary and the operation is retried. In the alternative, if the access to the primary metaserver is successful, the SUCCESS path is taken and the method moves to block 2618.

At block 2618, the RMC sends either the creating new file requests or the lock acquisition requests to all other metaservers. It is expected that the operation will succeed on those other metaservers; an unexpected failure (other than the metadata server just being unavailable) is usually an indication of inconsistency among the metadata servers.

At block 2620, based on the successful accesses to a metaserver in either block 2610, 2614 or 2618, the RMC saves a primary metaserver status in accordance with the metaserver or metaservers that successfully handled the access operation.

At block 2622, the RMC saves the states of the available metaservers and responds to the requested operation.

At block 2624, the RMC saves states information indicating which metaservers successfully handled the access operation. Preferably, these are the only metaservers to which subsequent operations for this metafile will be sent. For some operations, this step 2624 may be skipped. The method then ends in block 2626.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A file switch for use in a computer network having a group of file servers and a plurality of client computers, wherein the file switch may be logically positioned between a client computer from which a user request is received and the group of file servers, the file switch comprising: at least one processing unit; at least one port for exchanging information with the file servers and client computers, the information exchanged including information concerning a specified user file; a file aggregation module including one or more stored computer programs for execution by the at least one processing unit, the computer programs including instructions for: receiving a user request to access a subset of a specified user file; identifying a subset of file servers that store portions of the user file that together comprise the subset of the specified user file; sending an oplock request to each file server in the subset of file servers, and receiving oplock request replies from the subset of file servers; aggregating the received oplock request replies to produce an aggregated oplock reply, such that the aggregated oplock reply is an oplock grant only when all the received oplock request replies are oplock grants; and caching data from the subset of the specified user file only when the aggregate oplock reply is an oplock grant.

2. The file switch of claim 1, the file aggregation module further including instructions for: receiving an oplock break from a respective file server in the set of file servers; and disabling said caching of data from the subset of the specified user file.

3. The file switch of claim 1, the file aggregation module further including instructions for: accessing a metafile that stores information identifying a set of file servers for storing respective defined portions of the specified user file; and identifying, based on the information stored in the metafile, a subset of the file servers that store portions of the user file that together comprise the subset of the specified user file.

4. The file switch of claim 1, wherein the user request does not include an oplock request.

5. A method of caching data from user files stored in shared data computer network, where each user file of at least a plurality of the user files is divided into portions stored on a plurality of file servers, among a group of file servers in a computer network, comprising: receiving a user request to access a subset of a specified user file, wherein the request does not include a request for lock on the subset of the specified user file; identifying a subset of file servers that store portions of the user file that together comprise the subset of the specified user file; sending a lock request to each file server in the subset of file servers, and receiving lock replies from the subset of file servers; aggregating the received lock replies to produce an aggregated lock reply, such that the aggregated lock reply is a lock grant only when all the received oplock request replies are oplock grants; and only when the aggregated lock reply is a lock grant, continuing processing of the user request by performing an operation on the subset of the specified user file.

6. The method of claim 5, including: when the aggregated lock reply is not a lock grant, deferring processing of the user request and then repeating performance of the lock acquisition operation at each file server in the subset of file servers.

7. The method of claim 5, including: wherein the method is performed by a file switch logically positioned between a client computer from which the user request is received and the group of file servers.

8. The method of claim 7, wherein identifying the subset of file servers includes: accessing a metafile that stores information identifying a set of file servers for storing respective defined portions of the specified user file; and determining, based on the information stored in the metafile, a subset of the file servers that store portions of the user file that together comprise the subset of the specified user file.

9. A file switch for use in a computer network having a group of file servers and a plurality of client computers, the file switch comprising: at least one port for exchanging information with the file servers and client computers, the information exchanged including information concerning a specified user file; a file aggregation module including: means for receiving a user request to access a subset of a specified user file, wherein the request does not include a request for lock on the subset of the specified user file; means for identifying a subset of file servers that store portions of the user file that together comprise the subset of the specified user file; means for sending a lock request to each file server in the subset of file servers, and receiving lock replies from the subset of file servers; means for aggregating the received lock replies to produce an aggregated lock reply, such that the aggregated lock reply is a lock grant only when all the received oplock request replies are oplock grants; and means, operative only when the aggregated lock reply is a lock grant, for continuing processing of the user request by performing an operation on the subset of the specified user file.

10. A file switch for use in a computer network having a group of file servers and a plurality of client computers, the file switch comprising: at least one processing unit; at least one port for exchanging information with the file servers and client computers, the information exchanged including information concerning a specified user file; a file aggregation module including one or more stored computer programs for execution by the at least one processing unit, the computer programs including instructions for: receiving a user request to access a subset of a specified user file, wherein the request does not include a request for lock on the subset of the specified user file; identifying a subset of file servers that store portions of the user file that together comprise the subset of the specified user file; sending a lock request to each file server in the subset of file servers, and receiving lock replies from the subset of file servers; aggregating the received lock replies to produce an aggregated lock reply, such that the aggregated lock reply is a lock grant only when all the received oplock request replies are oplock grants; and only when the aggregated lock reply is a lock grant, continuing processing of the user request by performing an operation on the subset of the specified user file.

11. The file server of claim 10, the file aggregation module further including instructions for: when the aggregated lock reply is not a lock grant, deferring processing of the user request and then repeating performance of the lock acquisition operation at each file server in the subset of file servers.

12. The file server of claim 10, wherein the method is performed by a file switch logically positioned between a client computer from which the user request is received and the group of file servers.

13. The file server of claim 10, wherein the instructions for identifying the subset of file servers includes instructions for: accessing a metafile that stores information identifying a set of file servers for storing respective defined portions of the specified user file; and determining, based on the information stored in the metafile, a subset of the file servers that store portions of the user file that together comprise the subset of the specified user file.

14. A system for use in a computer network having a plurality of client computers, the system comprising: a group of file servers; a file switch, the file switch including: at least one port for exchanging information with the file servers and client computers, the information exchanged including information concerning a specified user file; at least one processing unit; a file aggregation module including one or more stored computer programs for execution by the at least one processing unit, the computer programs including instructions for: receiving a user request to access a subset of a specified user file, the request including a request for an opportunistic lock on the subset of the specified user file; accessing metadata identifying a set of file servers for storing respective defined portions of the specified user file; identifying, based on the metadata, a subset of the file servers that store portions of the user file that together comprise the subset of the specified user file; sending an oplock request to each file server in the subset of file servers, and receiving oplock request replies from the subset of file servers; aggregating the received oplock request replies to produce an aggregated oplock reply, such that the aggregated oplock reply is an oplock grant only when all the received oplock request replies are oplock grants; sending the aggregated oplock reply to a sender of the user request, thereby enabling the sender to cache data from the subset of the specified user file only when the aggregate oplock reply is an oplock grant.

15. The system of claim 14, the file aggregation module further including instructions for: receiving an oplock break from a respective file server in the set of file servers; forwarding the oplock break to the sender of the user request.

16. The system of claim 14, the file aggregation module further including instructions for: waiting to receive an oplock break acknowledgement from the sender of the user request, and upon receiving the oplock break acknowledgement from the sender of the user request, forwarding the oplock break acknowledgement to the respective file server in the set of file servers.

17. The system of claim 14, the file aggregation module further including instructions for: upon receiving the oplock break, disabling caching of data from the subset of the specified user file.

18. The system of claim 14, the file aggregation module further including instructions for: upon receiving the oplock break, disabling caching, within the file switch, of data from the subset of the specified user file.

19. The system of claim 14, wherein the file switch is logically positioned between a client computer from which the user request is received and the group of file servers.

20. A system for use in a computer network having a plurality of client computers, the system comprising: a group of file servers; a file switch, the file switch including: at least one port for exchanging information with the file servers and client computers, the information exchanged including information concerning a specified user file; means for receiving a user request to access a subset of a specified user file, the request including a request for an opportunistic lock on the subset of the specified user file; means for identifying a subset of file servers that store portions of the user file that together comprise the subset of the specified user file; means for sending an oplock request to each file server in the subset of file servers, and receiving oplock request replies from the subset of file servers; means for aggregating the received oplock request replies to produce an aggregated oplock reply, such that the aggregated oplock reply is a lock grant only when all the received lock request replies are oplock grants; and means for sending the aggregated oplock reply to a sender of the user request, thereby enabling the sender to cache data from the subset of the specified user file only when the aggregate lock reply is an oplock grant.

21. A system for use in a computer network having a plurality of client computers, the system comprising: a group of file servers; a file switch, the file switch including: at least one port for exchanging information with the file servers and client computers, the information exchanged including information concerning a specified user file; at least one processing unit; a file aggregation module including one or more stored computer programs for execution by the at least one processing unit, the computer programs including instructions for: receiving a user request to access a subset of a specified user file, the request including a request for an opportunistic lock on the subset of the specified user file; identifying a subset of file servers that store portions of the user file that together comprise the subset of the specified user file; sending an oplock request to each file server in the subset of file servers, and receiving oplock request replies from the subset of file servers; aggregating the received oplock request replies to produce an aggregated oplock reply, such that the aggregated oplock reply is an oplock grant only when all the received oplock request replies are oplock grants; and sending the aggregated oplock reply to a sender of the user request, thereby enabling the sender to cache data from the subset of the specified user file only when the aggregate oplock reply is an oplock grant.

22. The system of claim 21, the file aggregation module further including instructions for: receiving an oplock break from a respective file server in the set of file servers; forwarding the oplock break to the sender of the user request.

23. The system of claim 21, the file aggregation module further including instructions for: waiting to receive an oplock break acknowledgement from the sender of the user request, and upon receiving the oplock break acknowledgement from the sender of the user request, forwarding the oplock break acknowledgement to the respective file server in the set of file servers.

24. The system of claim 21, the file aggregation module further including instructions for: upon receiving the oplock break, disabling caching of data from the subset of the specified user file.

25. The system of claim 21, the file aggregation module further including instructions for: upon receiving the oplock break, disabling caching of data within the file switch from the subset of the specified user file.

26. The system of claim 21, wherein the file switch is logically positioned between a client computer from which the user request is received and the group of file servers.

* * * * *